United States Patent
Derichs

(10) Patent No.: US 12,271,550 B2
(45) Date of Patent: Apr. 8, 2025

(54) MULTI-FREQUENCY CHARACTER TRANSMISSION AND DETECTION

(71) Applicant: SIGMASENSE, LLC., Wilmington, DE (US)

(72) Inventor: Kevin Joseph Derichs, Buda, TX (US)

(73) Assignee: SIGMASENSE, LLC., Austin, TX (US)

( * ) Notice: Subject to any disclaimer, the term of this patent is extended or adjusted under 35 U.S.C. 154(b) by 33 days.

(21) Appl. No.: 18/140,002

(22) Filed: Apr. 27, 2023

(65) Prior Publication Data
US 2023/0350519 A1    Nov. 2, 2023

Related U.S. Application Data

(60) Provisional application No. 63/335,795, filed on Apr. 28, 2022.

(51) Int. Cl.
G06F 3/041 (2006.01)
G06F 3/044 (2006.01)

(52) U.S. Cl.
CPC ...... G06F 3/04166 (2019.05); G06F 3/04162 (2019.05); G06F 3/04164 (2019.05); G06F 3/0446 (2019.05)

(58) Field of Classification Search
CPC ............. G06F 3/04164; G06F 3/04162; G06F 3/04166; G06F 3/0446; G06F 3/041; G06F 3/044
See application file for complete search history.

(56) References Cited

U.S. PATENT DOCUMENTS

| 5,437,178 A | 8/1995 | Esin et al. |
| 6,218,972 B1 | 4/2001 | Groshong |

(Continued)

FOREIGN PATENT DOCUMENTS

| CN | 103995626 A | 8/2014 |
| CN | 104182105 A | 12/2014 |

(Continued)

OTHER PUBLICATIONS

European Patent Office; Extended European Search Report; Application No. 19853507.2; Jun. 13, 2023; 7 pgs.

(Continued)

*Primary Examiner* — Olga V Merkoulova
(74) *Attorney, Agent, or Firm* — Garlick & Markison; Timothy W. Markison; Shayne X. Short

(57) ABSTRACT

A touch sensor device (TSD) includes a panel that includes electrodes and drive-sense circuits (DSCs). Different electrodes may be implemented in different directions. A first DSC is operably coupled via a first single line to a first electrode, and a second DSC is operably coupled via a second single line to the panel. The DSCs operate by providing respective signals via the respective single lines and simultaneously sensing the signals. For example, sensing of a first signal of a first DSC includes detection of a first electrical characteristic of the first electrode and/or a first change of the first signal. Sensing of a second signal of the second DSC includes detection of coupling of another signal into the panel in accordance with digital data communication from another device to the TSD. The DSCs also generate respective digital signals based upon what they sense.

20 Claims, 45 Drawing Sheets
(20 of 45 Drawing Sheet(s) Filed in Color)

(56) References Cited

U.S. PATENT DOCUMENTS

| | | |
|---|---|---|
| 6,665,013 B1 | 12/2003 | Fossum et al. |
| 7,476,233 B1 | 1/2009 | Wiener et al. |
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 * | 10/2012 | Hotelling .............. G06F 3/0443 |
| | | 345/173 |
| 8,537,110 B2 | 9/2013 | Kruglick |
| 8,547,114 B2 | 10/2013 | Kremin |
| 8,587,535 B2 | 11/2013 | Oda et al. |
| 8,625,726 B2 | 1/2014 | Kuan |
| 8,657,681 B2 | 2/2014 | Kim |
| 8,966,400 B2 | 2/2015 | Yeap |
| 8,982,097 B1 | 3/2015 | Kuzo et al. |
| 9,081,437 B2 | 7/2015 | Oda |
| 9,201,547 B2 | 12/2015 | Elias |
| 10,007,335 B2 | 6/2018 | Lee |
| 10,120,498 B2 * | 11/2018 | Gray ................... G06F 3/04162 |
| 10,296,108 B2 * | 5/2019 | Gray ................... G06F 3/03545 |
| 11,907,484 B2 * | 2/2024 | Gray ................... G06F 3/0416 |
| 2003/0052657 A1 | 3/2003 | Koernle et al. |
| 2005/0235758 A1 | 10/2005 | Kowal et al. |
| 2011/0063154 A1 * | 3/2011 | Hotelling .............. H03M 3/494 |
| | | 341/143 |
| 2011/0298745 A1 | 12/2011 | Souchkov |
| 2012/0278031 A1 | 11/2012 | Oda |
| 2013/0278447 A1 * | 10/2013 | Kremin ................ G06F 3/0446 |
| | | 341/20 |
| 2014/0327644 A1 | 11/2014 | Mohindra |
| 2015/0091847 A1 | 4/2015 | Chang |
| 2015/0346889 A1 | 12/2015 | Chen |
| 2016/0188049 A1 | 6/2016 | Yang et al. |
| 2017/0242502 A1 * | 8/2017 | Gray ................... G06F 3/04162 |
| 2017/0242534 A1 * | 8/2017 | Gray ................... G06F 3/041662 |
| 2018/0157354 A1 | 6/2018 | Blondin et al. |
| 2018/0275824 A1 | 9/2018 | Li |
| 2019/0042040 A1 * | 2/2019 | Kumar ................. G06F 3/0412 |
| 2022/0019315 A1 * | 1/2022 | Gray ................... G06F 3/0416 |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |

OTHER PUBLICATIONS

Baker; How delta-sigma ADCs work, Part 1; Analog Applications Journal; Oct. 1, 2011; 6 pgs.

Brian Pisani, Digital Filter Types in Delta-Sigma ADCs, Application Report SBAA230, May 2017, pp. 1-8, Texas Instruments Incorporated, Dallas, Texas.

* cited by examiner communication system 10 computing device 12 computing device 14 computing device 18

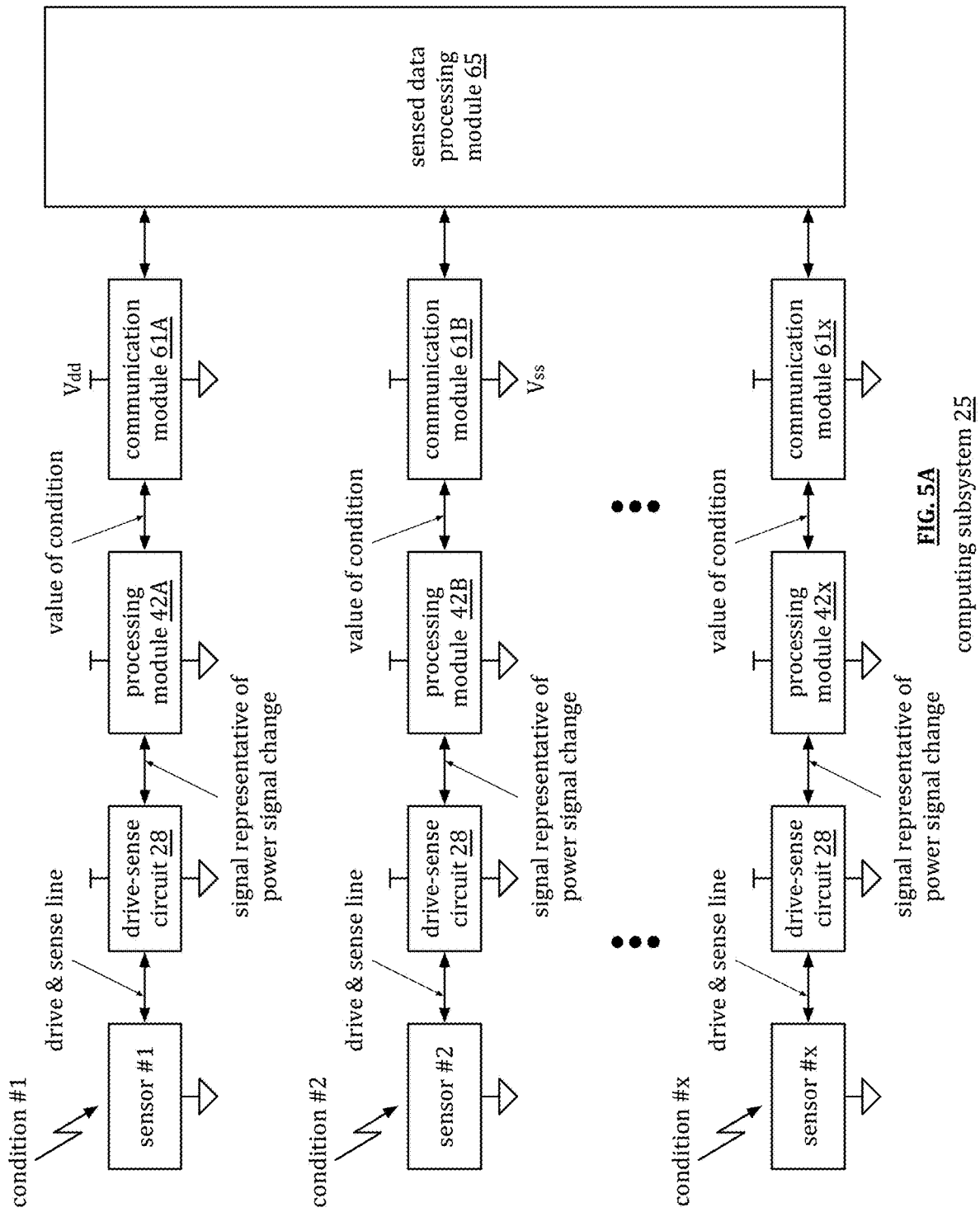

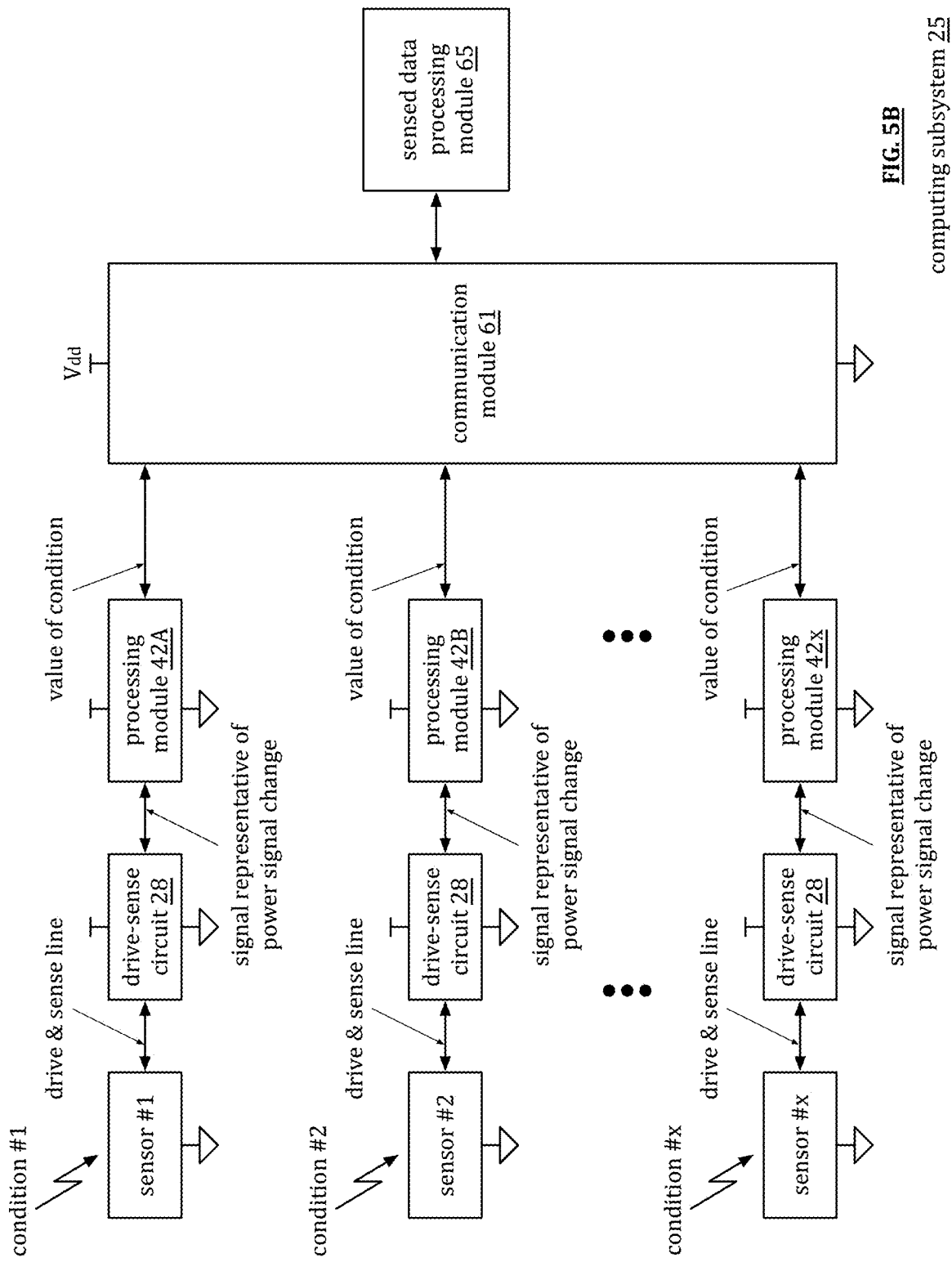

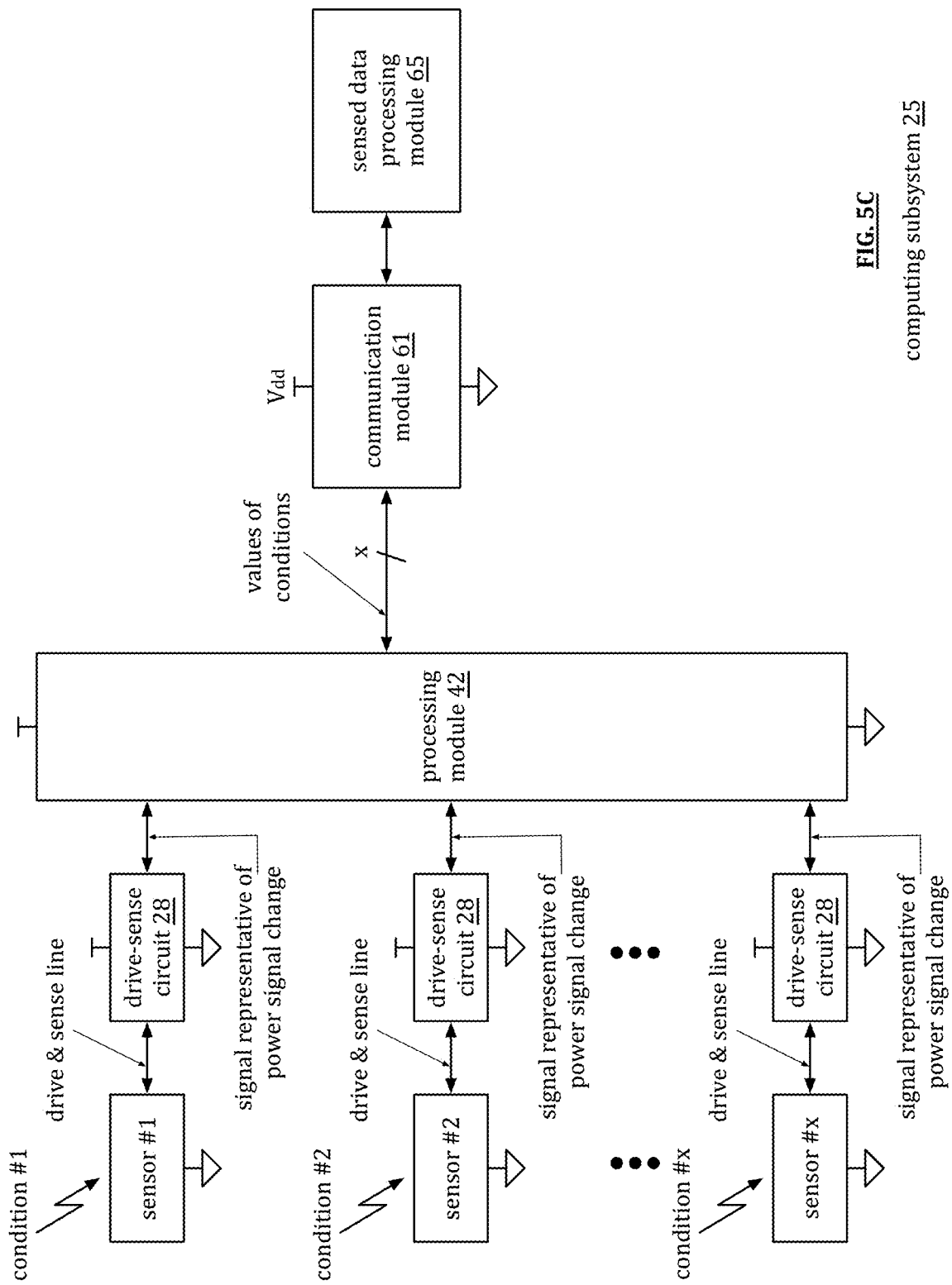

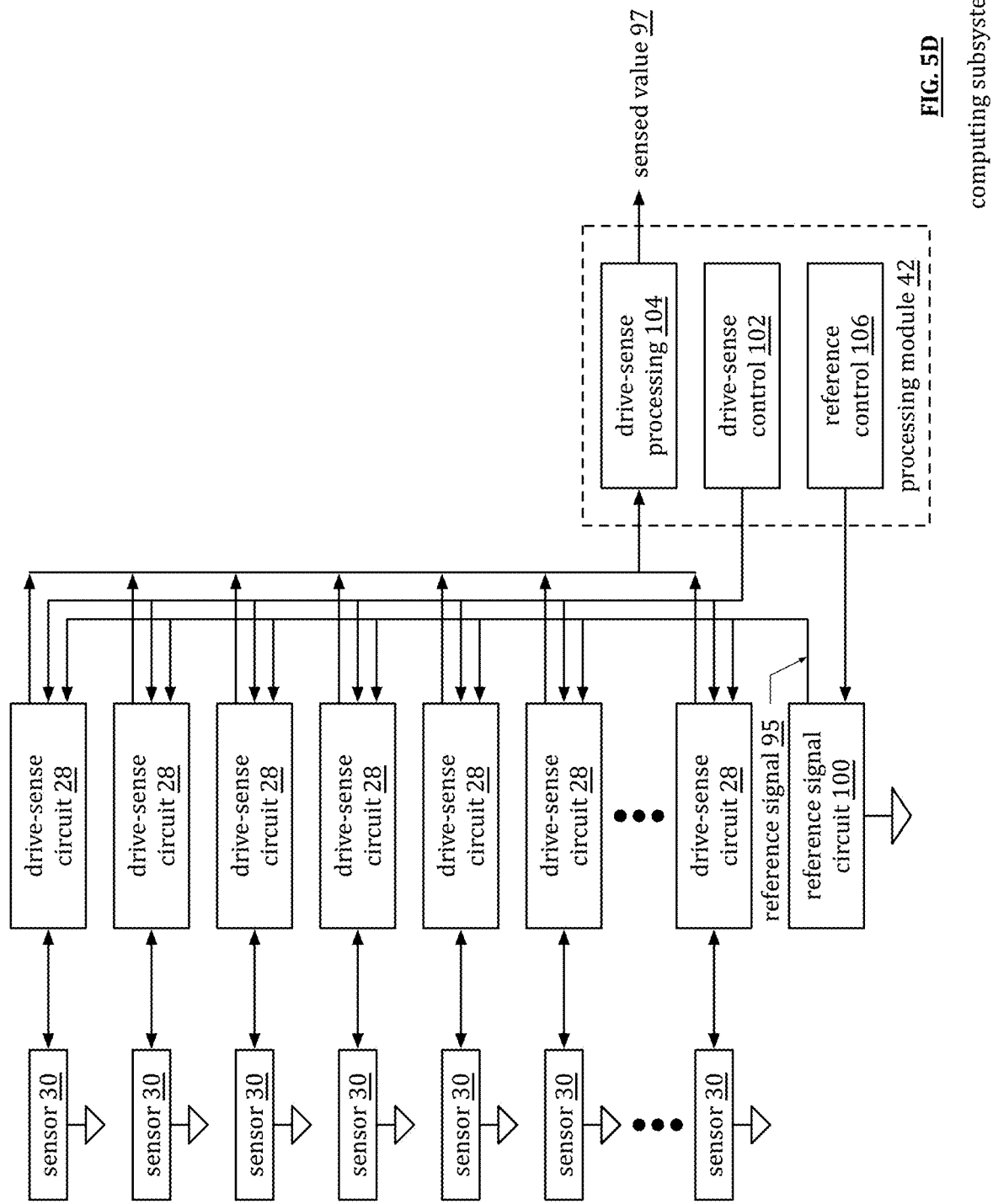

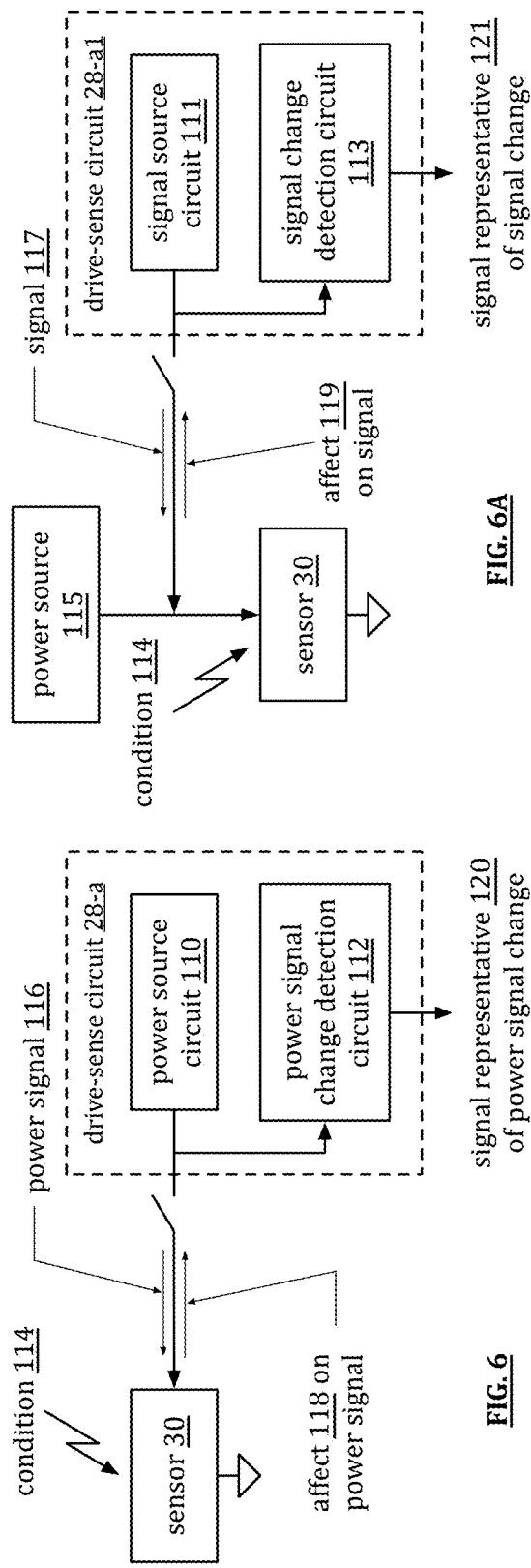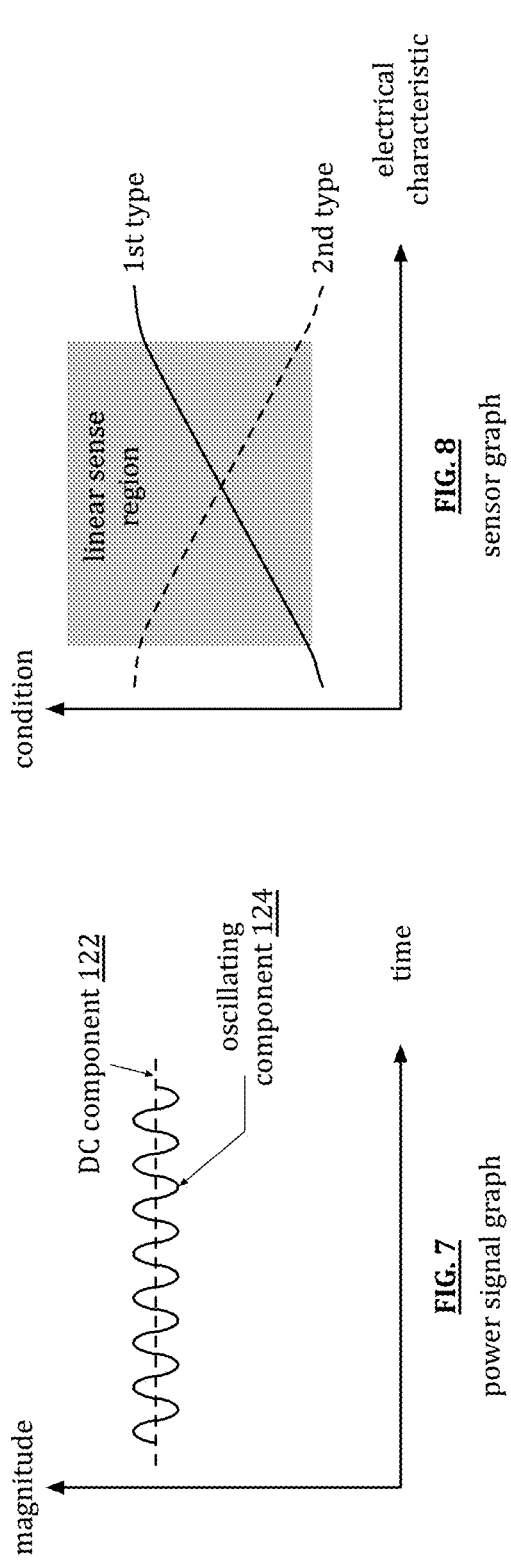

power signal graph power signal graph power signal graph power signal graph

1400

1500

FIG. 16 examples of electrode patterns for use in TSDs

1800

1900

2100

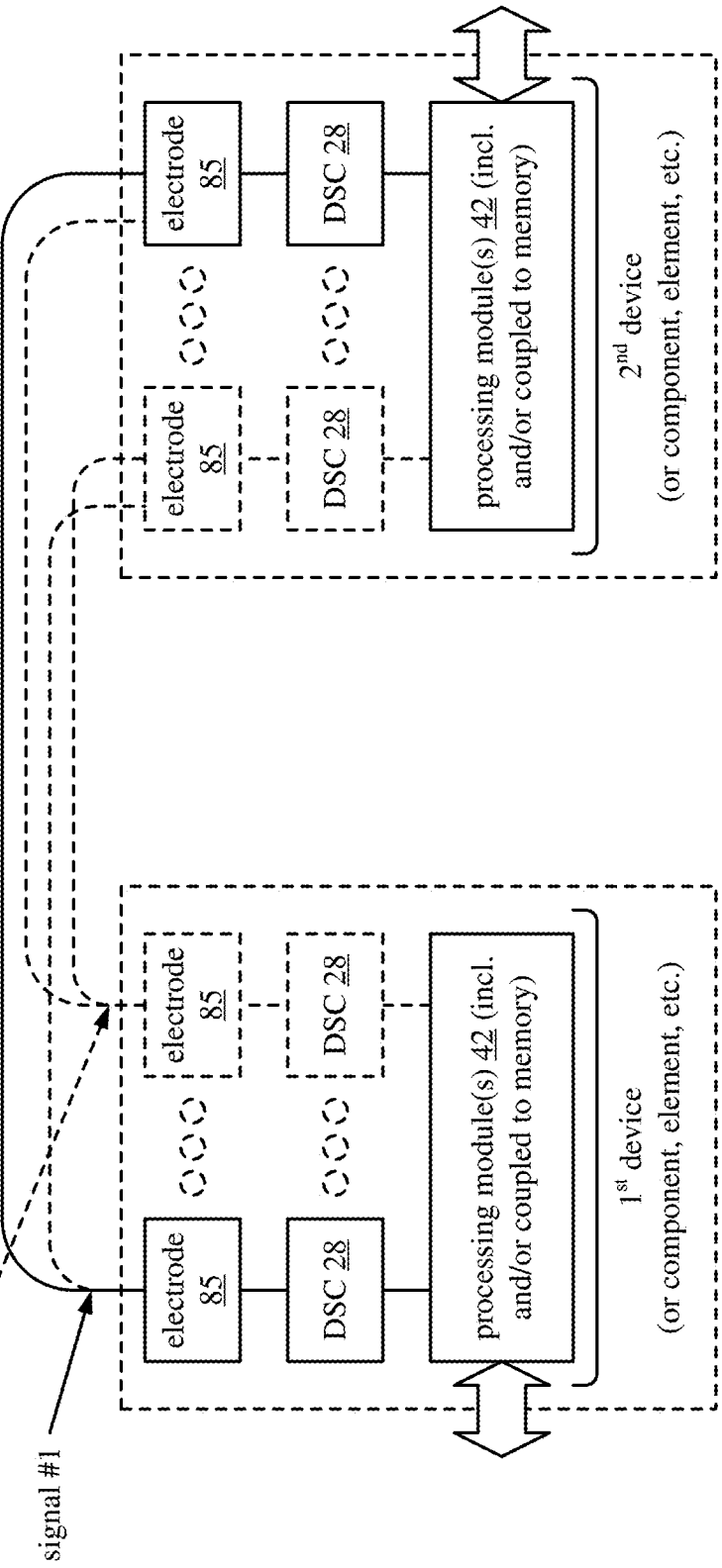

2301

2302

2400
drive-sense circuit 28-24

1st Packet, 3 Pure Frequencies, Added and Scaled Amplitude With a Sum Tones Resultant — Freq1 — Freq2 — Freq3 — SUM Tones

2902

2nd Packet, 3 Pure Frequencies, Added and Scaled Amplitude With a Sum Tones Resultant — Freq4 — Freq5 — Freq6 — SUM Tones #2

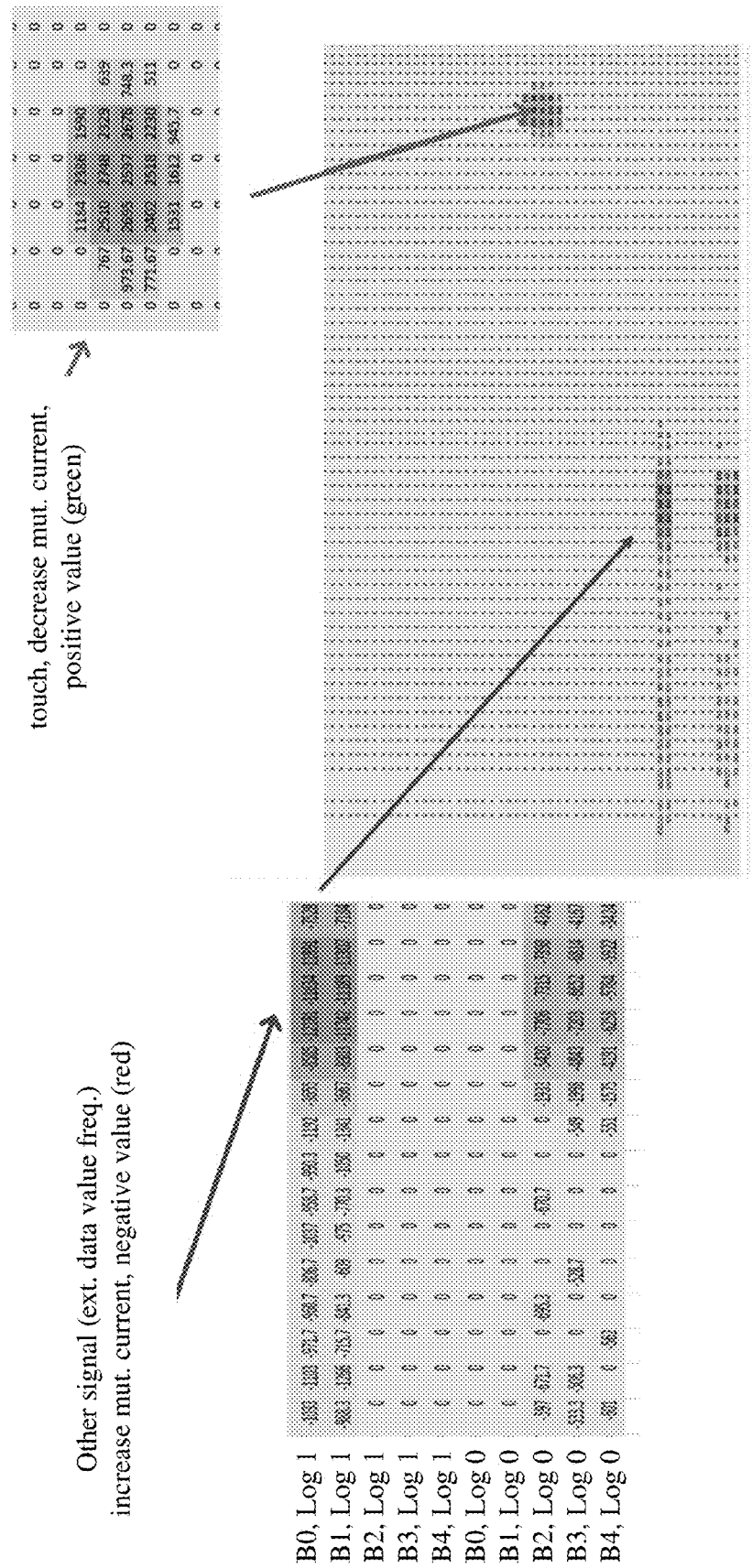

3100

- Min. threshold for negative External Data Value Frequency at -500 (converted those values to an arbitrary value, -32761, and all other values to 0)
- More than X (such as X=10) -32761 values are found in a Row, the bit row is labeled as valid
- 5 valid bit rows is a valid data character
- When Data is transferred through a user finger touch, the number value for valid touches may be less than 5
- Can handle a hover, provides improved validation of the data
- 10 unique frequencies, only 5 frequencies in Red are sent (5 of the 10 frequencies are sent to make a valid number)
- LUT where a=1, b=2, c=3 .... letter "b" = binary 00010 (below on right hand side (RHS))
- LUT where a=1, b=2, c=3 .... letter "a" = binary 00001 (below on left hand side (LHS))

letter "a" would be binary 00001    letter "b" would be binary 00010

- bottom row, right hand side (RHS), would not meet criteria of more than 10

Data Decoding

FIG. 32
3200

Digital Data Single Bit Frequencies

- 5-bit value, only 5 unique sine wave frequencies

- Individual frequencies for each of the logic 1's bits

- Data sources in contact with the surface of the touch screen / gaming table when decoded

- TX from none, each, all or some combination of the 5 frequencies

- With this version, at least 1 RX channel needs to pick up the signal

- More RX channels the higher the confidence of the correct data

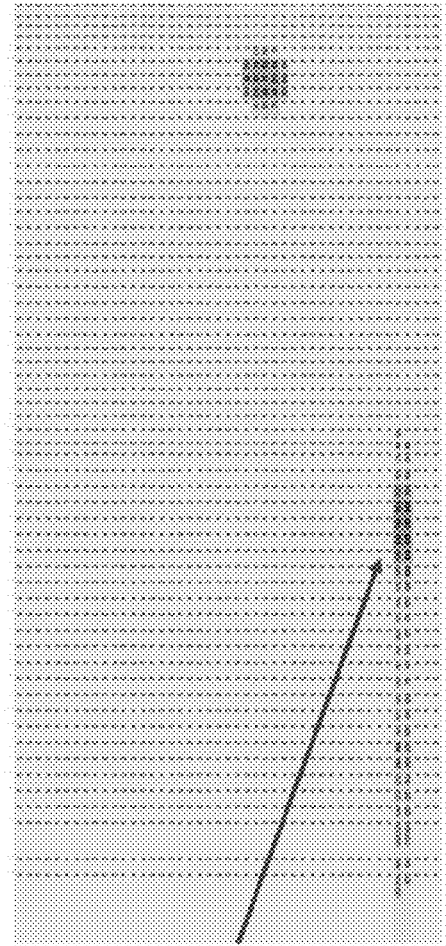

- Only top half of the bottom 10 frequencies used (Bit 4 Logic 1 through Bit 0 Logic 1)

FIG. 33
3300

Multiple Game Pieces, with Bi-Directional Data through Frequencies

- Active game pieces communicate with touchscreen directly into the panel from data wirelessly sent or through the point of contact of the touch screen or a perimeter transmitting beacon
- Game pucks each could have multiple different frequencies
- Content not be displayed graphically on the blue screen.
- Digital data in the green area (off-screen) is a representation of 2, 5-bit values.

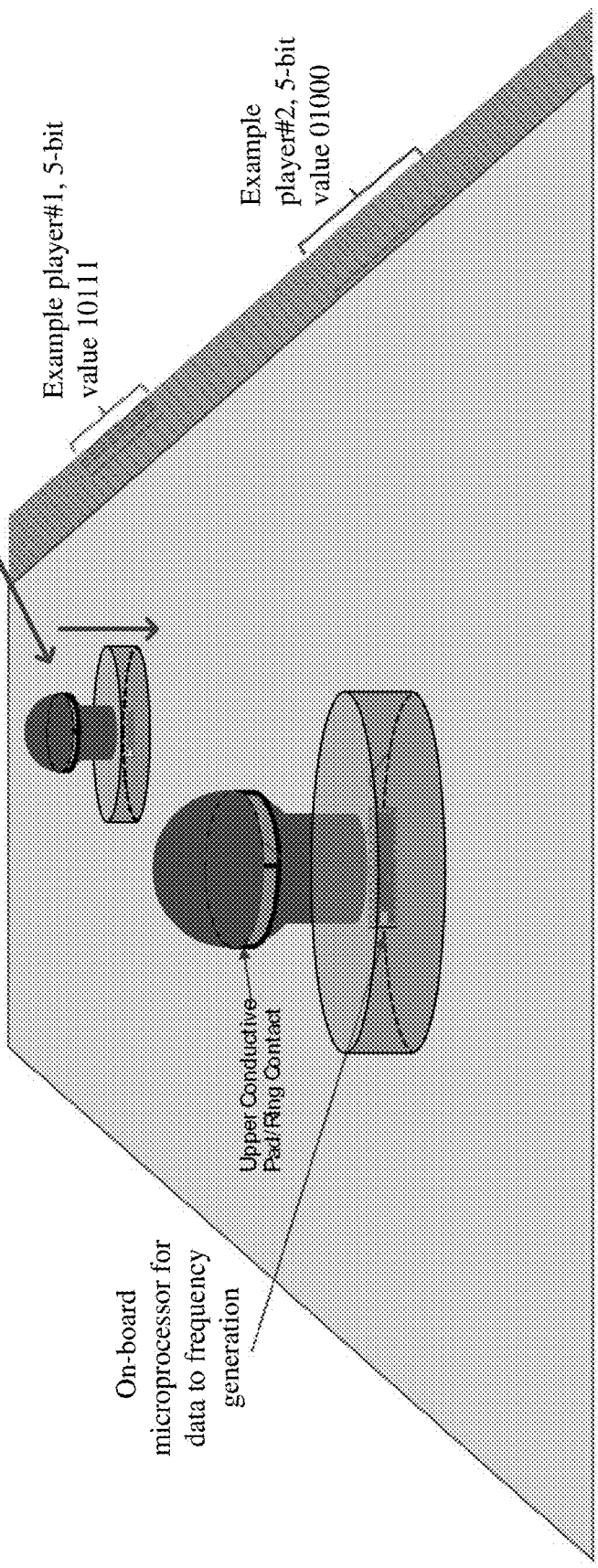

FIG. 34
3400

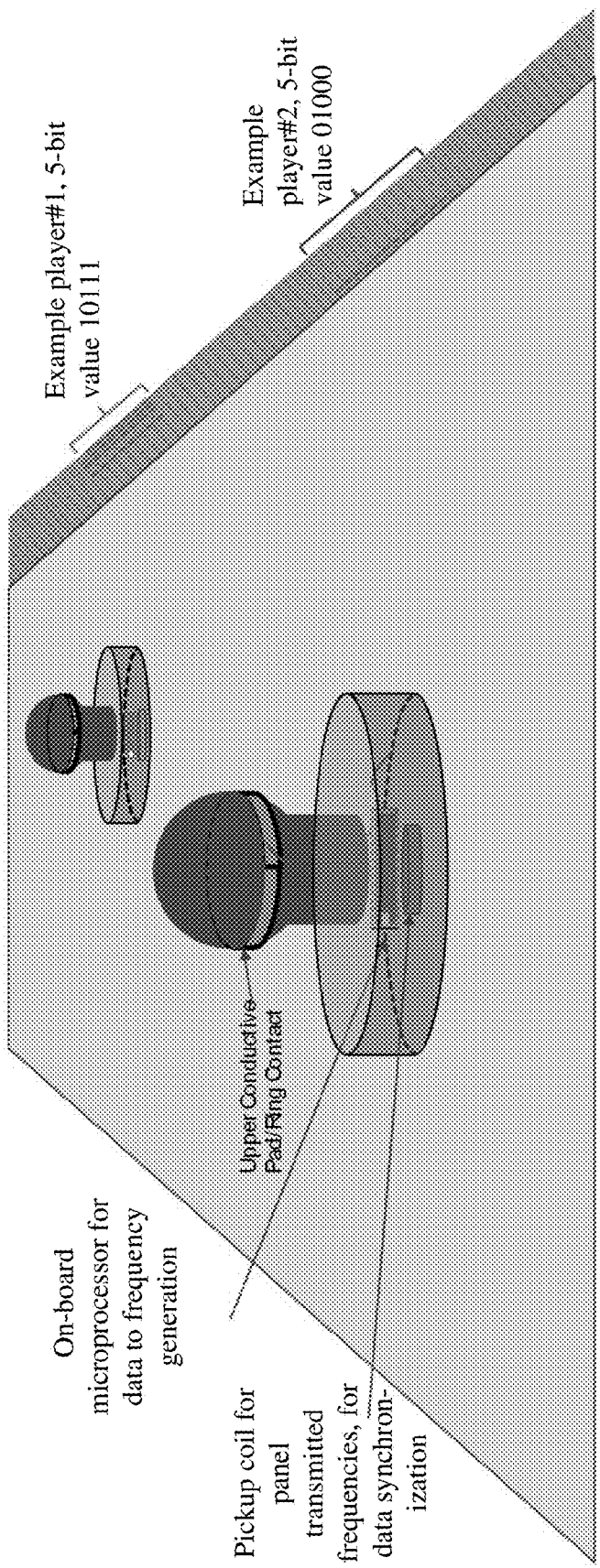

User Identification Through Touch

- External microprocessor to generate the frequencies, a key FOB ID can be generated from the device in the users pocket, watch, or phone, etc. to create an unique user ID
- Set of Sum Tones unique to the holder coupled to the user's body
- When the user touches the screen, all points of contact would be registered as that user.

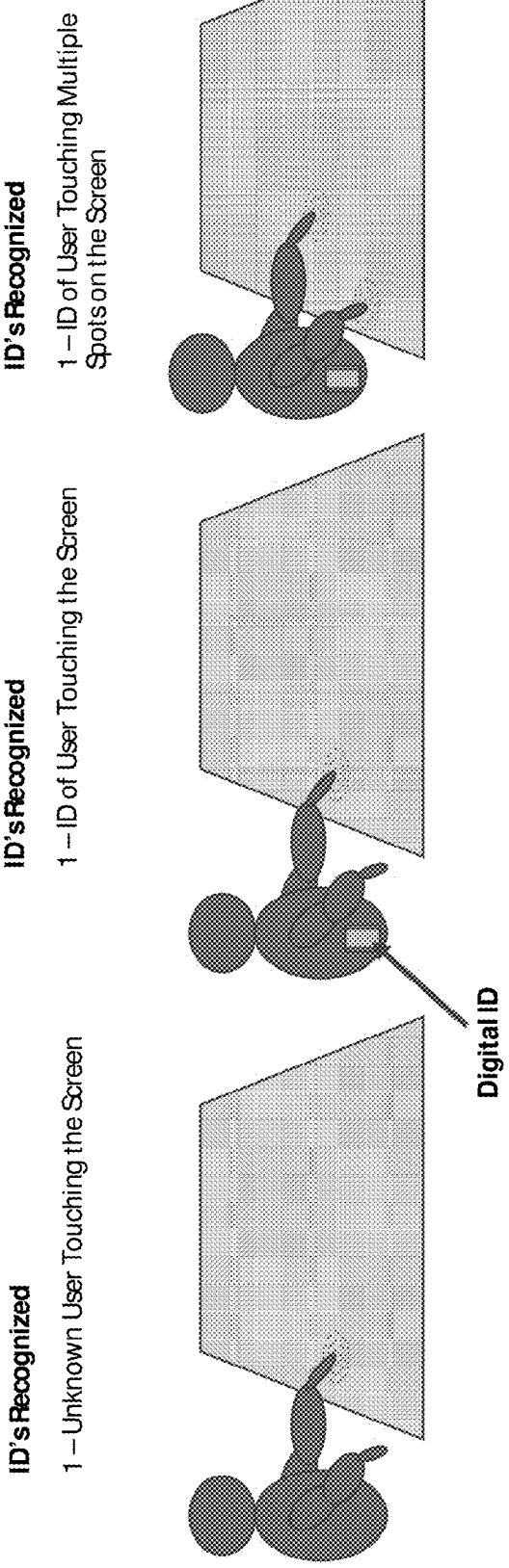

ID's Recognized
1 – Unknown User Touching the Screen

Digital ID

ID's Recognized
1 – ID of User Touching the Screen

ID's Recognized
1 – ID of User Touching Multiple Spots on the Screen

FIG. 36
3600

User Identification Through Touch and Game Pieces

- External microprocessor to generate the frequencies, a custom code can be generated from the device in the users pocket, watch, or phone, etc. to create an unique user ID with a mix of frequencies

- Set of Sum Tones unique to the holder would be coupled to the user's body and when the user touches the screen, all points of contact would be registered as from the user touch

- The game pieces also would have unique frequency IDS

- When an user touches a game piece the, two unique IDs would both be sent

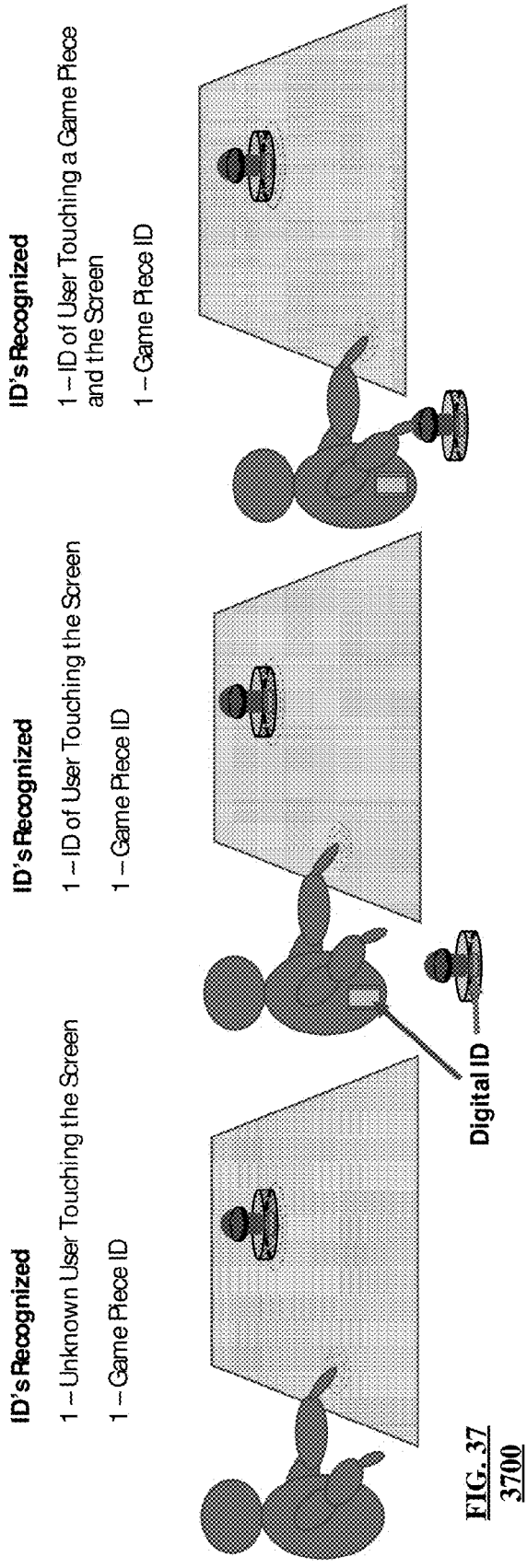

ID's Recognized
1 – Unknown User Touching the Screen
1 – Game Piece ID

ID's Recognized
1 – ID of User Touching the Screen
1 – Game Piece ID

ID's Recognized
1 – ID of User Touching a Game Piece and the Screen
1 – Game Piece ID Digital ID

FIG. 37
3700

User ID and Presence/Proximity Detection (Perimeter Data)

- Presence / Proximity Detection System added to discriminate direction that multiple users are crossing the panel edge to touch the screen sensor

- By adding Digital Data Through Touch, multiple users can move around the touch screen and be identified from any side that they reach across the panel, at all touch points.

- Around the perimeter of an example touch sensor panel, with 20 rows and 36 columns, is 4 conductive external perimeter sensors, represented by Left, Right, Top and Bottom

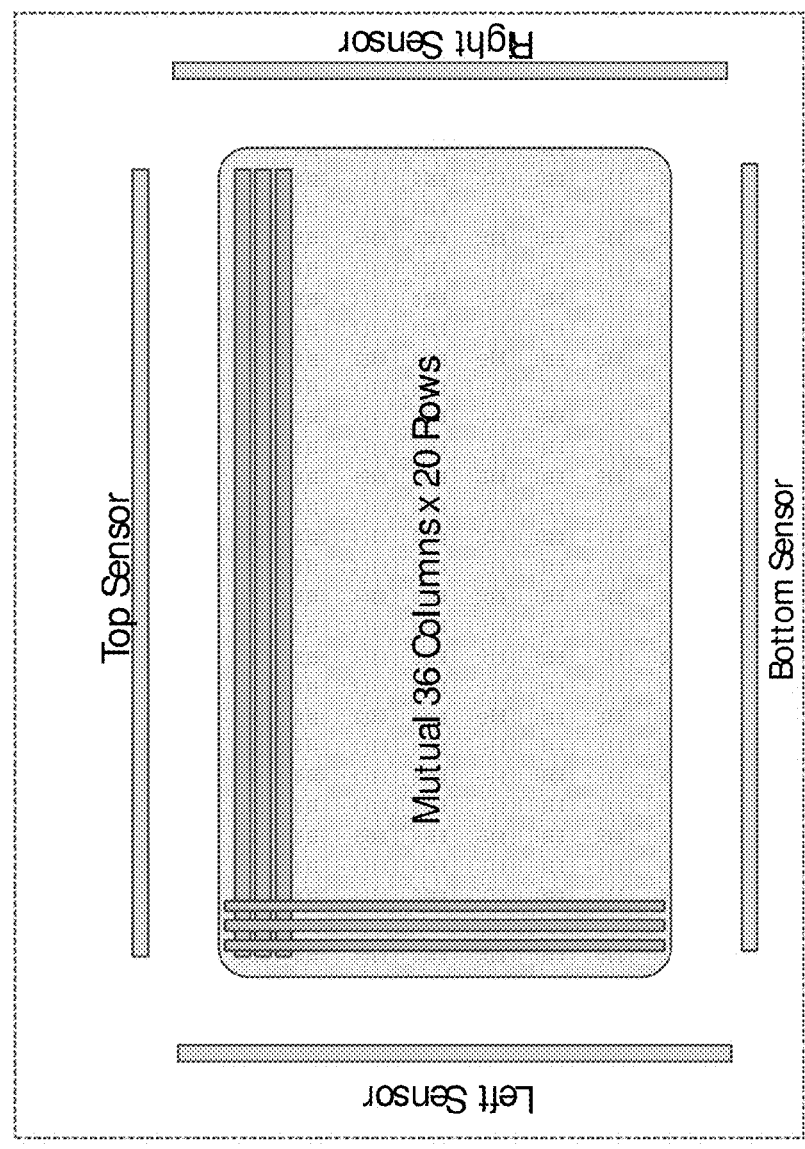

User ID and Presence / Proximity Detection (Perimeter Data)

mutual touch, very positive value external sensor, neg. vs. baseline

MULTI-FREQUENCY CHARACTER TRANSMISSION AND DETECTION

CROSS REFERENCE TO RELATED PATENTS/PATENT APPLICATIONS

The present U.S. Utility patent application claims priority pursuant to 35 U.S.C. § 119(e) to U.S. Provisional Application No. 63/335,795, entitled "Multi-Frequency Character Transmission and Detection," filed Apr. 28, 2022, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touchscreens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touchscreen. As yet another example, the computing device processes the sensor signals to determine various data points in a production line of a product.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

FIG. 5A is a schematic plot diagram of a computing subsystem in accordance with the present disclosure;

FIG. 5B is a schematic block diagram of another embodiment of a computing subsystem in accordance with the present disclosure;

FIG. 5C is a schematic block diagram of another embodiment of a computing subsystem in accordance with the present disclosure;

FIG. 5D is a schematic block diagram of another embodiment of a computing subsystem in accordance with the present disclosure;

FIG. 6 is a schematic block diagram of a drive center circuit in accordance with the present disclosure;

FIG. 6A is a schematic block diagram of another embodiment of a drive sense circuit in accordance with the present disclosure;

FIG. 7 is an example of a power signal graph in accordance with the present disclosure;

FIG. 8 is an example of a sensor graph in accordance with the present disclosure;

FIG. 22 is a schematic block diagram of another embodiment of multiple touch sensor devices (TSDs) in accordance with the present disclosure;

FIG. 26 is a schematic block diagram of another embodiment of a DSC that is interactive with an electrode in accordance with the present disclosure;

FIG. 30 is a schematic block diagram of an embodiment of touch sensor device (TSD) data facilitating discrimination between finger touch and external data in accordance with the present disclosure;

FIG. 32 is a schematic block diagram of another embodiment of data decoding of touch sensor device (TSD) data based on two frequencies per bit in accordance with the present disclosure;

FIG. 33 is a schematic block diagram of an embodiment of touch sensor device (TSD) data based on a single frequency per bit in accordance with the present disclosure;

FIG. 34 is a schematic block diagram of an embodiment of multiple game pieces interacting with a touch sensor device (TSD) with bi-directional data transmission in accordance with the present disclosure;

FIG. 35 is a schematic block diagram of an embodiment of multiple game pieces interacting with a touch sensor device (TSD) with bi-directional data transmission using ring detector and retransmission in accordance with the present disclosure;

FIG. 36 is a schematic block diagram of an embodiment of a touch sensor device (TSD) configured to perform user identification through touch in accordance with the present disclosure;

FIG. 37 is a schematic block diagram of an embodiment of a touch sensor device (TSD) configured to perform user identification through touch and game pieces in accordance with the present disclosure;

FIG. 38 is a schematic block diagram of an embodiment of a touch sensor device (TSD) configured to perform user identification and presence/proximity detection in accordance with the present disclosure;

FIG. 39A and FIG. 39B are schematic block diagrams of embodiments of touch sensor device (TSD) data of a touch sensor device (TSD) configured to perform presence/proximity detection in accordance with the present disclosure;

FIG. 40A and FIG. 40B are schematic block diagrams of embodiments of touch sensor device (TSD) data of a touch sensor device (TSD) configured to perform user identification and presence/proximity detection in accordance with the present disclosure;

FIG. 41A and FIG. 41B are schematic block diagrams of embodiments of touch sensor device (TSD) data of a touch sensor device (TSD) configured to perform user identification and presence/proximity detection in accordance with the present disclosure;

Figure 42:
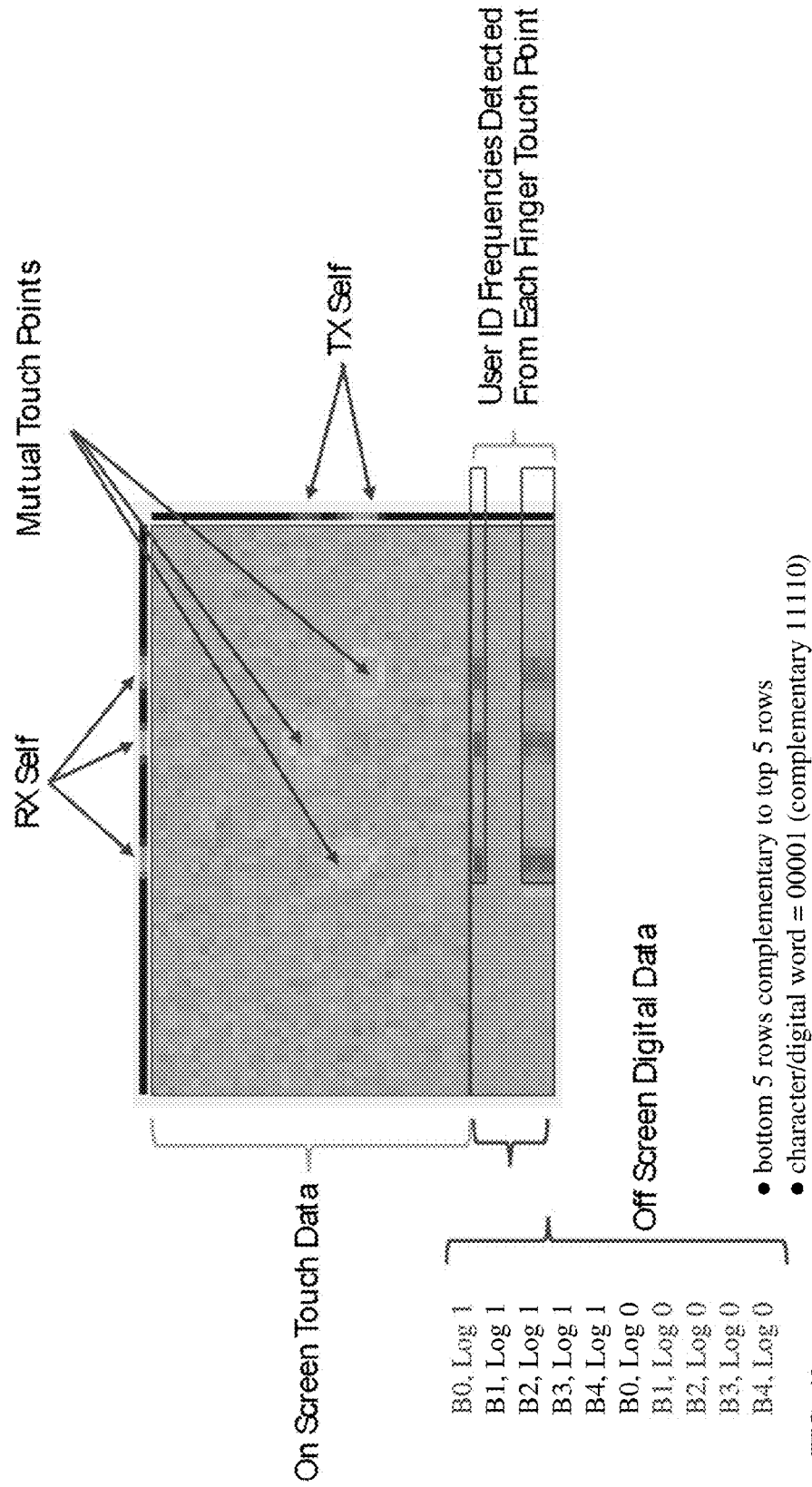
Figure 43:
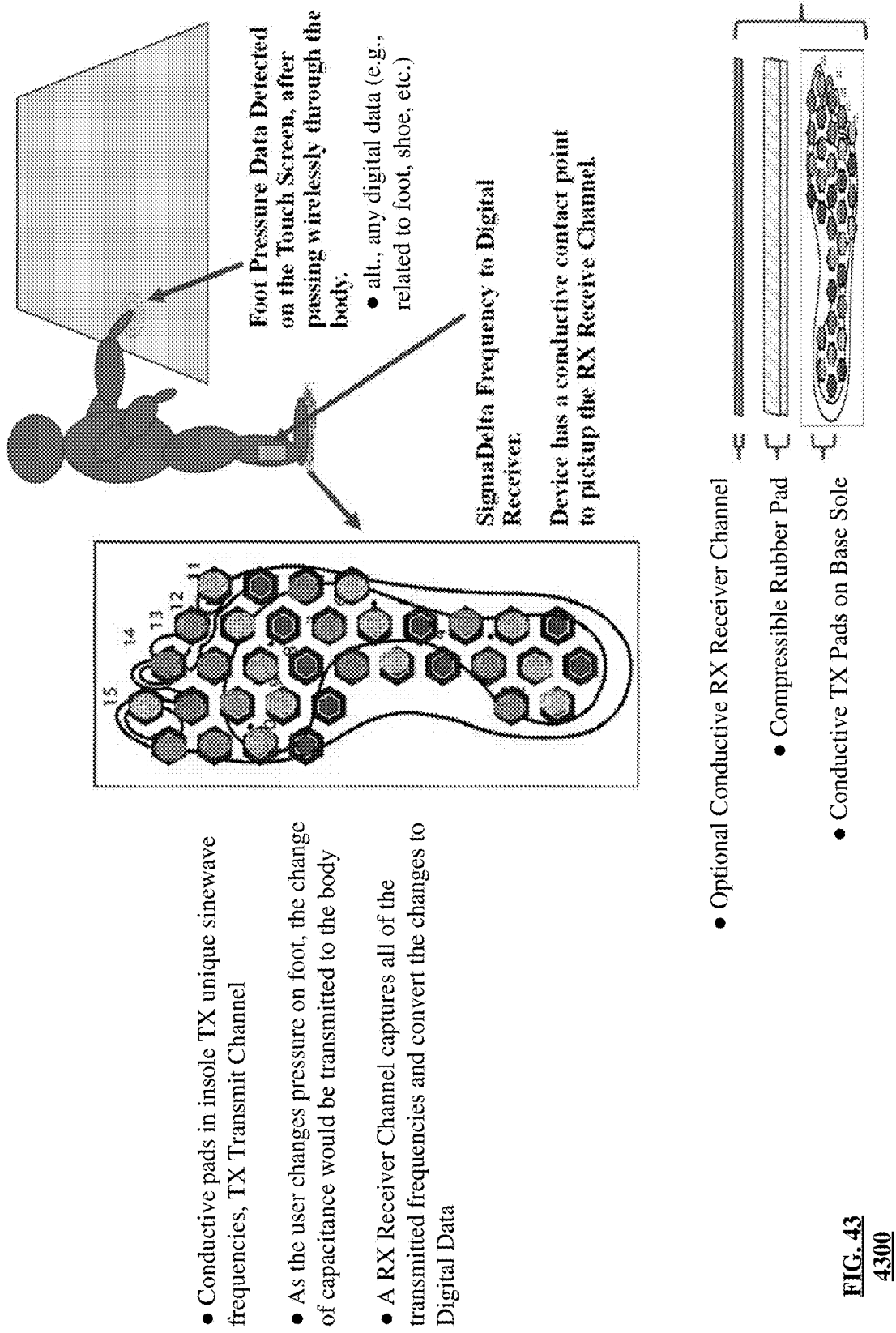

FIG. 42 is a schematic block diagram of an embodiment of touch sensor device (TSD) data of a touch sensor device (TSD) including user identification detected on each touch point in accordance with the present disclosure; and FIG. 43 is a schematic block diagram of an embodiment of data, from a device that is associated with a user, transmitted through the user to a touch sensor device (TSD) in accordance with the present disclosure.

DETAILED DESCRIPTION OF THE INVENTION

Figure 1:
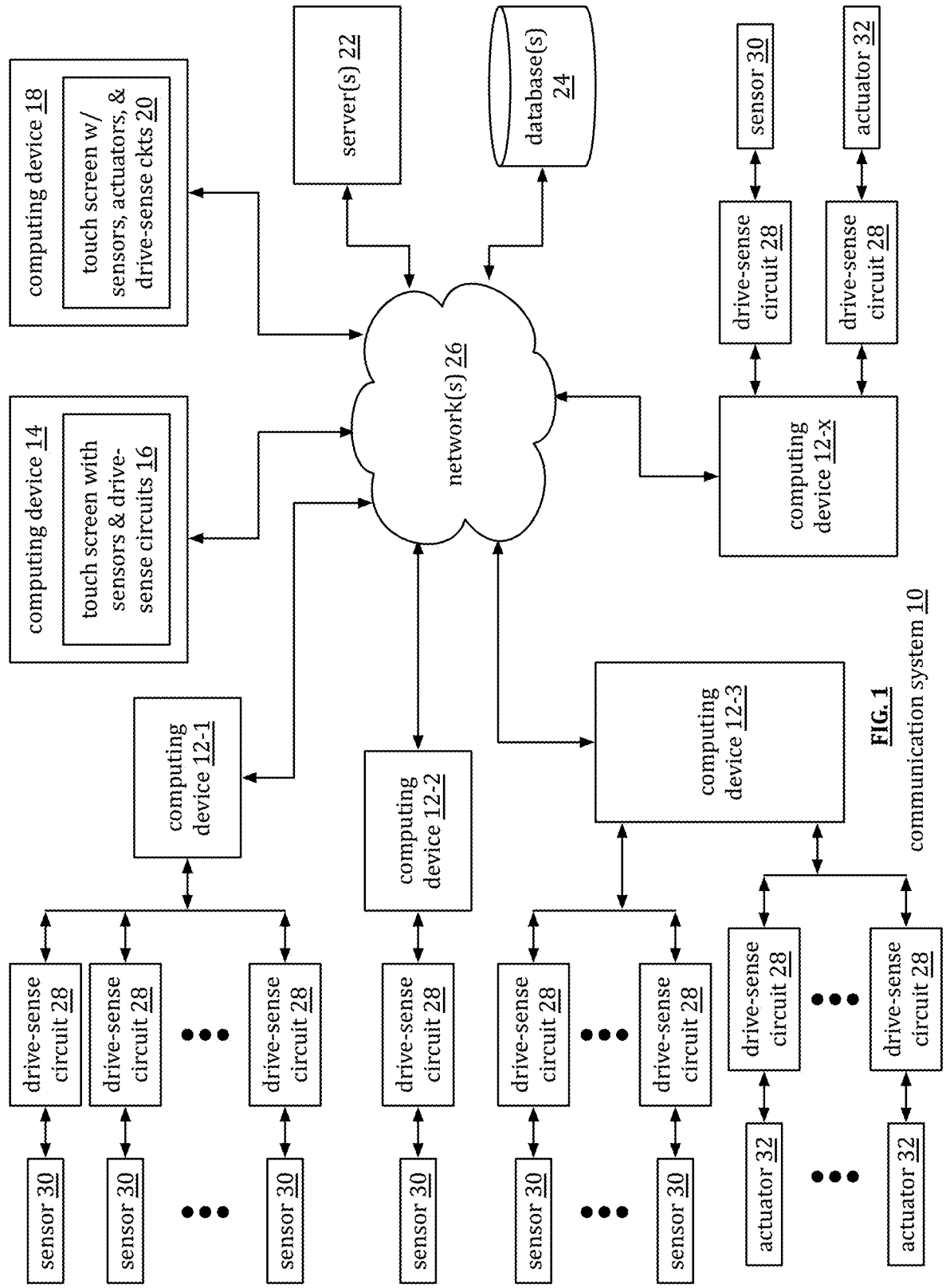
FIG. 1 is a schematic block diagram of an embodiment of a communication system in accordance with the present disclosure.

FIG. 1 is a schematic block diagram of an embodiment of a communication system that includes a plurality of computing devices 12-10, one or more servers 22, one or more databases 24, one or more networks 26, a plurality of drive-sense circuits 28, a plurality of sensors 30, and a plurality of actuators 32. Computing devices 14 include a touchscreen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/ or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/ or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a standalone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-$x$ is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-$x$. For example, the sensor 30 may be a piezoelectric microphone and the actuator 32 may be a piezoelectric speaker.

Figure 2:
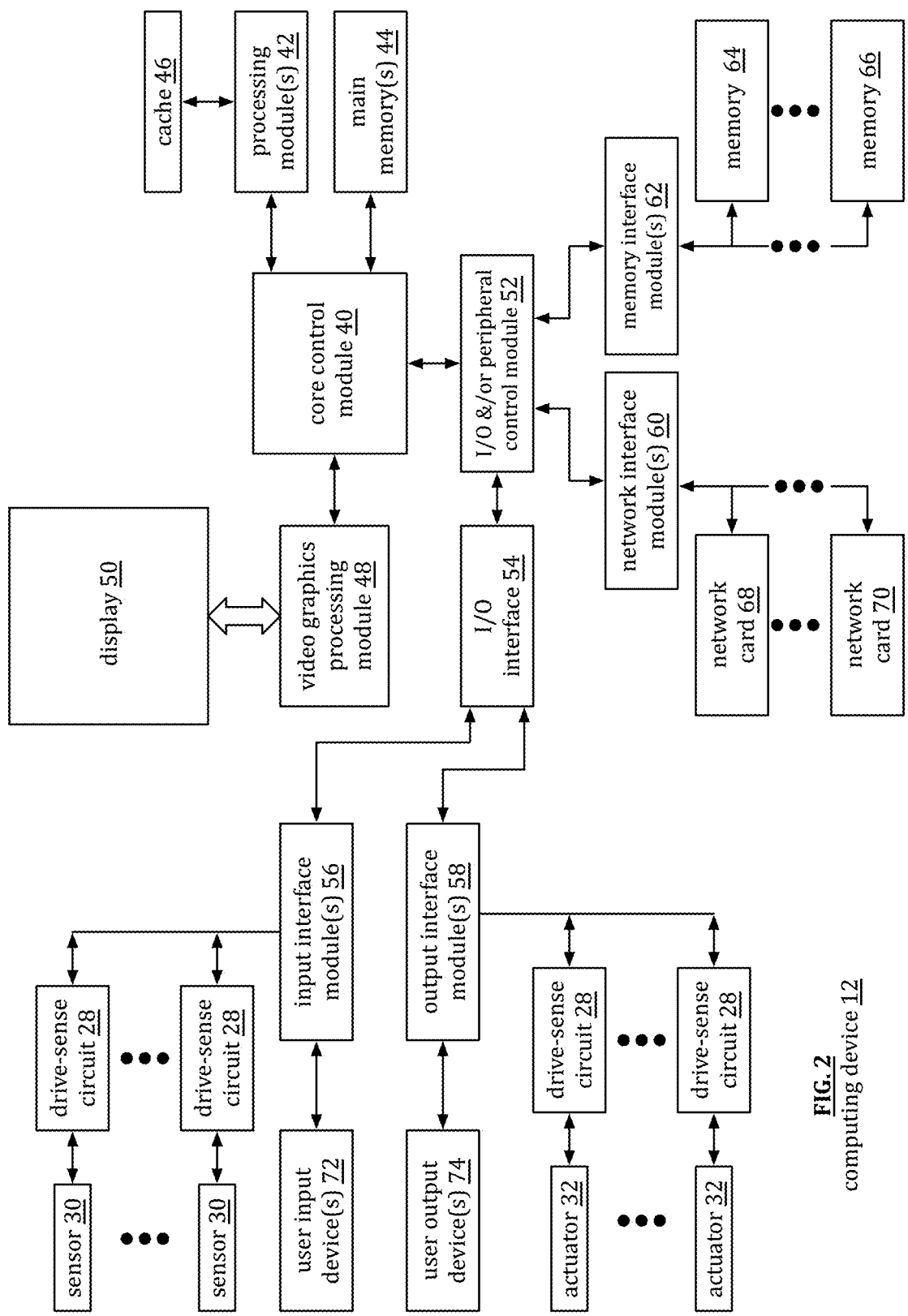
FIG. 2 is a schematic block diagram of an embodiment of a computing device in accordance with the present disclosure.

FIG. 2 is a schematic block diagram of an embodiment of a computing device 12 (e.g., any one of 12-1 through 12-$x$). The computing device 12 includes a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 2 further illustrates sensors 30 and actuators 32 coupled to drive-sense circuits 28, which are coupled to the input interface module 56 (e.g., USB port). Alternatively, one or more of the drive-sense circuits 28 is coupled to the computing device via a wireless network card (e.g., WLAN) or a wired network card (e.g., Gigabit LAN). While not shown, the computing device 12 further includes a BIOS (Basic Input Output System) memory coupled to the core control module 40.

Figure 3:
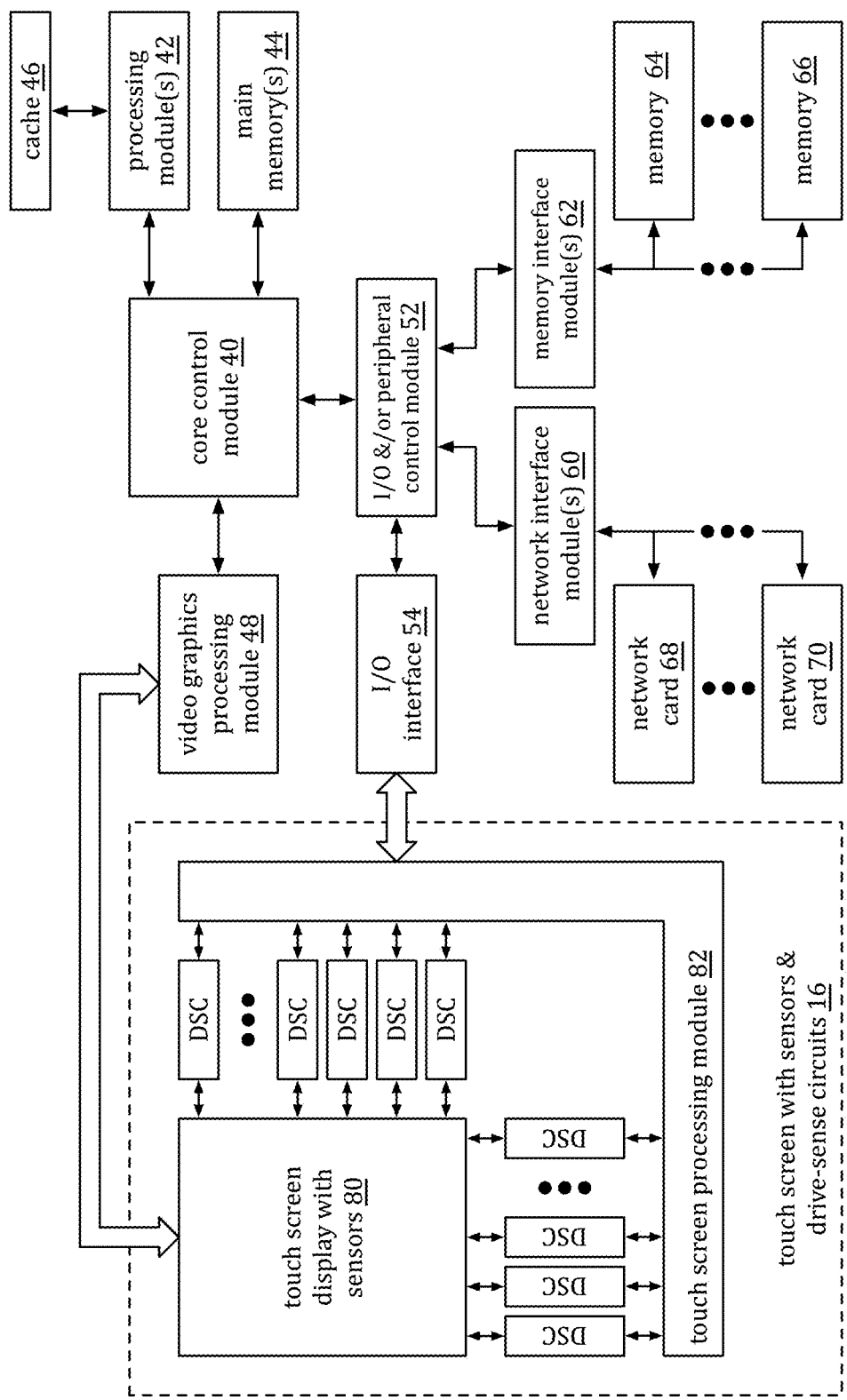
FIG. 3 is a schematic block diagram of another embodiment of a computing device in accordance with the present disclosure.

FIG. 3 is a schematic block diagram of another embodiment of a computing device 14 that includes a core control module 40, one or more processing modules 42, one or more main memories 44, cache memory 46, a video graphics processing module 48, a touchscreen 16, an Input-Output (I/O) peripheral control module 52, one or more input interface modules 56, one or more output interface modules 58, one or more network interface modules 60, and one or more memory interface modules 62. The touchscreen 16 includes a touchscreen display 80, a plurality of sensors 30, a plurality of drive-sense circuits (DSC), and a touchscreen processing module 82.

Computing device 14 operates similarly to computing device 12 of FIG. 2 with the addition of a touchscreen as an input device. The touchscreen includes a plurality of sensors (e.g., electrodes, capacitor sensing cells, capacitor sensors, inductive sensor, etc.) to detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touchscreen processing module 82, which may be a separate processing module or integrated into the processing module 42.

The touchscreen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 4:
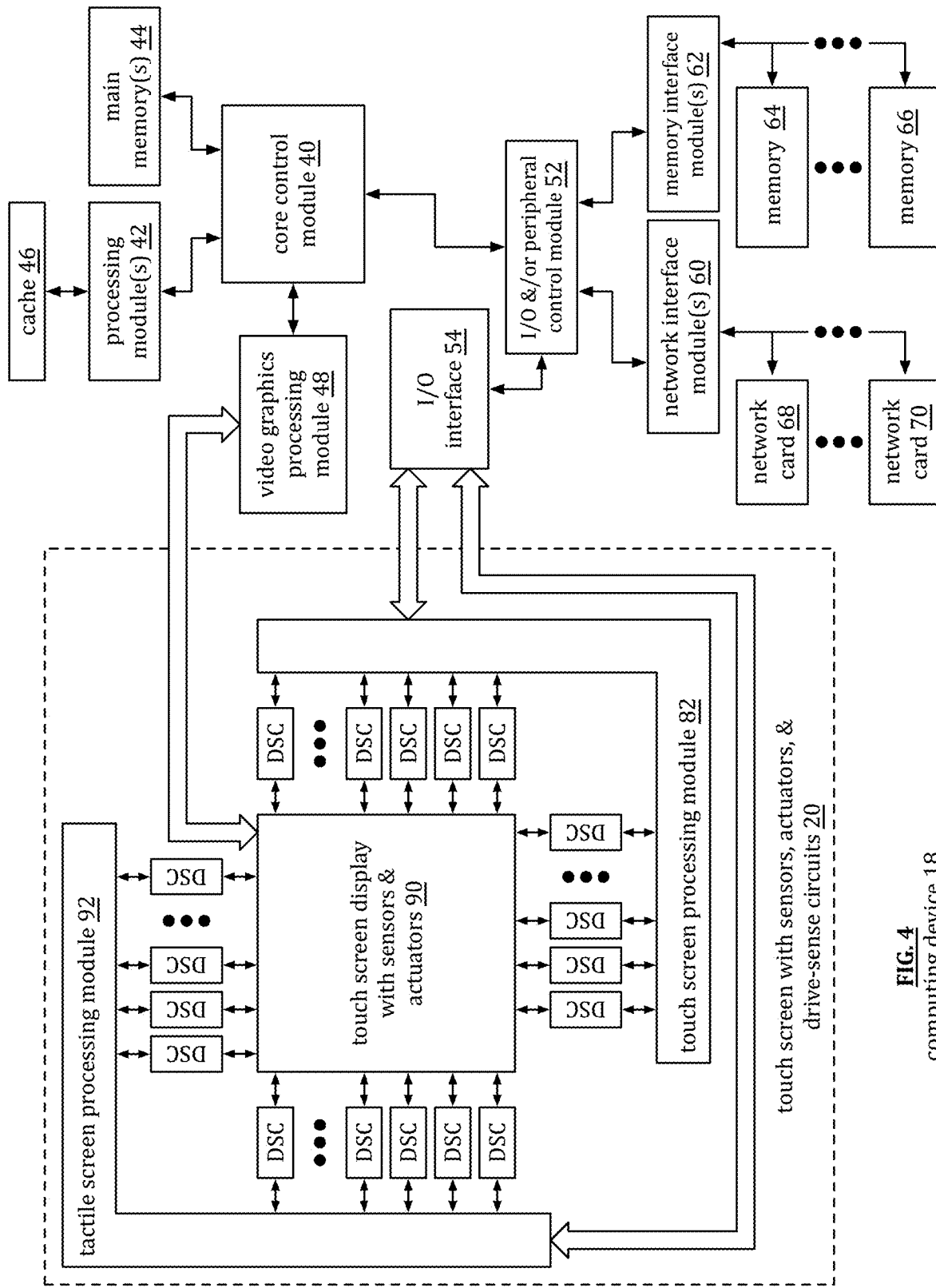
FIG. 4 is a schematic block diagram of another embodiment of a computing device in accordance with the present disclosure.

FIG. 4 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touchscreen processing module 82, and a tactile screen processing module 92.

Computing device 18 operates similarly to computing device 14 of FIG. 3 with the addition of a tactile aspect to the screen 20 as an output device. The tactile portion of the screen includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

FIG. 5A is a schematic plot diagram of a computing subsystem 25 that includes a sensed data processing module 65, a plurality of communication modules 61A-x, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing devices in which processing modules 42A-x reside.

A drive-sense circuit 28 (or multiple drive-sense circuits), a processing module (e.g., 41A), and a communication module (e.g., 61A) are within a common computing device. Each grouping of a drive-sense circuit(s), processing module, and communication module is in a separate computing device. A communication module 61A-x is constructed in accordance with one or more wired communication protocol and/or one or more wireless communication protocols that is/are in accordance with the one or more of the Open System Interconnection (OSI) model, the Transmission Control Protocol/Internet Protocol (TCP/IP) model, and other communication protocol module.

In an example of operation, a processing module (e.g., 42A) provides a control signal to its corresponding drive-sense circuit 28. The processing module 42A may generate the control signal, receive it from the sensed data processing module 65, or receive an indication from the sensed data processing module 65 to generate the control signal. The control signal enables the drive-sense circuit 28 to provide a drive signal to its corresponding sensor. The control signal may further include a reference signal having one or more frequency components to facilitate creation of the drive signal and/or interpreting a sensed signal received from the sensor.

Based on the control signal, the drive-sense circuit 28 provides the drive signal to its corresponding sensor (e.g., 1) on a drive & sense line. While receiving the drive signal (e.g., a power signal, a regulated source signal, etc.), the sensor senses a physical condition 1-x (e.g., acoustic waves, a biological condition, a chemical condition, an electric condition, a magnetic condition, an optical condition, a thermal condition, and/or a mechanical condition). As a result of the physical condition, an electrical characteristic (e.g., impedance, voltage, current, capacitance, inductance, resistance, reactance, etc.) of the sensor changes, which affects the drive signal. Note that if the sensor is an optical sensor, it converts a sensed optical condition into an electrical characteristic.

The drive-sense circuit 28 detects the effect on the drive signal via the drive & sense line and processes the affect to produce a signal representative of power change, which may be an analog or digital signal. The processing module 42A receives the signal representative of power change, interprets it, and generates a value representing the sensed physical condition. For example, if the sensor is sensing pressure, the value representing the sensed physical condition is a measure of pressure (e.g., x PSI (pounds per square inch)).

In accordance with a sensed data process function (e.g., algorithm, application, etc.), the sensed data processing module 65 gathers the values representing the sensed physical conditions from the processing modules. Since the sensors 1-x may be the same type of sensor (e.g., a pressure sensor), may each be different sensors, or a combination thereof; the sensed physical conditions may be the same, may each be different, or a combination thereof. The sensed data processing module 65 processes the gathered values to produce one or more desired results. For example, if the computing subsystem 25 is monitoring pressure along a pipeline, the processing of the gathered values indicates that the pressures are all within normal limits or that one or more of the sensed pressures is not within normal limits.

As another example, if the computing subsystem 25 is used in a manufacturing facility, the sensors are sensing a variety of physical conditions, such as acoustic waves (e.g., for sound proofing, sound generation, ultrasound monitoring, etc.), a biological condition (e.g., a bacterial contamination, etc.) a chemical condition (e.g., composition, gas concentration, etc.), an electric condition (e.g., current levels, voltage levels, electro-magnetic interference, etc.), a magnetic condition (e.g., induced current, magnetic field strength, magnetic field orientation, etc.), an optical condition (e.g., ambient light, infrared, etc.), a thermal condition (e.g., temperature, etc.), and/or a mechanical condition (e.g., physical position, force, pressure, acceleration, etc.).

The computing subsystem 25 may further include one or more actuators in place of one or more of the sensors and/or in addition to the sensors. When the computing subsystem 25 includes an actuator, the corresponding processing module provides an actuation control signal to the corresponding drive-sense circuit 28. The actuation control signal enables the drive-sense circuit 28 to provide a drive signal to the actuator via a drive & actuate line (e.g., similar to the drive & sense line, but for the actuator). The drive signal includes one or more frequency components and/or amplitude components to facilitate a desired actuation of the actuator.

In addition, the computing subsystem 25 may include an actuator and sensor working in concert. For example, the sensor is sensing the physical condition of the actuator. In this example, a drive-sense circuit provides a drive signal to the actuator and another drive sense signal provides the same drive signal, or a scaled version of it, to the sensor. This allows the sensor to provide near immediate and continuous sensing of the actuator's physical condition. This further allows for the sensor to operate at a first frequency and the actuator to operate at a second frequency.

In an embodiment, the computing subsystem is a stand-alone system for a wide variety of applications (e.g., manufacturing, pipelines, testing, monitoring, security, etc.). In another embodiment, the computing subsystem 25 is one subsystem of a plurality of subsystems forming a larger system. For example, different subsystems are employed based on geographic location. As a specific example, the computing subsystem 25 is deployed in one section of a factory and another computing subsystem is deployed in another part of the factory. As another example, different subsystems are employed based function of the subsystems. As a specific example, one subsystem monitors a city's traffic light operation and another subsystem monitors the city's sewage treatment plants.

Regardless of the use and/or deployment of the computing system, the physical conditions it is sensing, and/or the physical conditions it is actuating, each sensor and each actuator (if included) is driven and sensed by a single line as opposed to separate drive and sense lines. This provides many advantages including, but not limited to, lower power requirements, better ability to drive high impedance sensors, lower line to line interference, and/or concurrent sensing functions.

FIG. 5B is a schematic block diagram of another embodiment of a computing subsystem 25 that includes a sensed data processing module 65, a communication module 61, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device, devices, in which processing modules 42A-x reside.

In an embodiment, the drive-sense circuits 28, the processing modules, and the communication module are within a common computing device. For example, the computing device includes a central processing unit that includes a plurality of processing modules. The functionality and operation of the sensed data processing module 65, the communication module 61, the processing modules 42A-x, the drive sense circuits 28, and the sensors 1-x are as discussed with reference to FIG. 5A.

FIG. 5C is a schematic block diagram of another embodiment of a computing subsystem 25 that includes a sensed data processing module 65, a communication module 61, a processing module 42, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device in which the processing module 42 resides.

In an embodiment, the drive-sense circuits 28, the processing module, and the communication module are within a common computing device. The functionality and operation of the sensed data processing module 65, the communication module 61, the processing module 42, the drive sense circuits 28, and the sensors 1-x are as discussed with reference to FIG. 5A.

FIG. 5D is a schematic block diagram of another embodiment of a computing subsystem 25 that includes a processing module 42, a reference signal circuit 100, a plurality of drive sense circuits 28, and a plurality of sensors 30. The processing module 42 includes a drive-sense processing block 104, a drive-sense control block 102, and a reference control block 106. Each block 102-106 of the processing module 42 may be implemented via separate modules of the processing module, may be a combination of software and hardware within the processing module, and/or may be field programmable modules within the processing module 42.

In an example of operation, the drive-sense control block 104 generates one or more control signals to activate one or more of the drive-sense circuits 28. For example, the drive-sense control block 102 generates a control signal that enables of the drive-sense circuits 28 for a given period of time (e.g., 1 second, 1 minute, etc.). As another example, the drive-sense control block 102 generates control signals to sequentially enable the drive-sense circuits 28. As yet another example, the drive-sense control block 102 generates a series of control signals to periodically enable the drive-sense circuits 28 (e.g., enabled once every second, every minute, every hour, etc.).

Continuing with the example of operation, the reference control block 106 generates a reference control signal that it provides to the reference signal circuit 100. The reference signal circuit 100 generates, in accordance with the control signal, one or more reference signals for the drive-sense circuits 28. For example, the control signal is an enable signal, which, in response, the reference signal circuit 100 generates a pre-programmed reference signal that it provides to the drive-sense circuits 28. In another example, the reference signal circuit 100 generates a unique reference signal for each of the drive-sense circuits 28. In yet another example, the reference signal circuit 100 generates a first unique reference signal for each of the drive-sense circuits 28 in a first group and generates a second unique reference signal for each of the drive-sense circuits 28 in a second group.

The reference signal circuit 100 may be implemented in a variety of ways. For example, the reference signal circuit 100 includes a DC (direct current) voltage generator, an AC voltage generator, and a voltage combining circuit. The DC voltage generator generates a DC voltage at a first level and the AC voltage generator generates an AC voltage at a second level, which is less than or equal to the first level. The voltage combining circuit combines the DC and AC voltages to produce the reference signal. As examples, the reference signal circuit 100 generates a reference signal similar to the signals shown in FIG. 7, which will be subsequently discussed.

As another example, the reference signal circuit 100 includes a DC current generator, an AC current generator, and a current combining circuit. The DC current generator generates a DC current a first current level and the AC current generator generates an AC current at a second current level, which is less than or equal to the first current level. The current combining circuit combines the DC and AC currents to produce the reference signal.

Returning to the example of operation, the reference signal circuit 100 provides the reference signal, or signals, to the drive-sense circuits 28. When a drive-sense circuit 28 is enabled via a control signal from the drive sense control block 102, it provides a drive signal to its corresponding sensor 30. As a result of a physical condition, an electrical characteristic of the sensor is changed, which affects the drive signal. Based on the detected effect on the drive signal and the reference signal, the drive-sense circuit 28 generates a signal representative of the effect on the drive signal.

The drive-sense circuit provides the signal representative of the effect on the drive signal to the drive-sense processing block 104. The drive-sense processing block 104 processes the representative signal to produce a sensed value 97 of the physical condition (e.g., a digital value that represents a specific temperature, a specific pressure level, etc.). The processing module 42 provides the sensed value 97 to another application running on the computing device, to another computing device, and/or to a server 22.

Figure 5E:
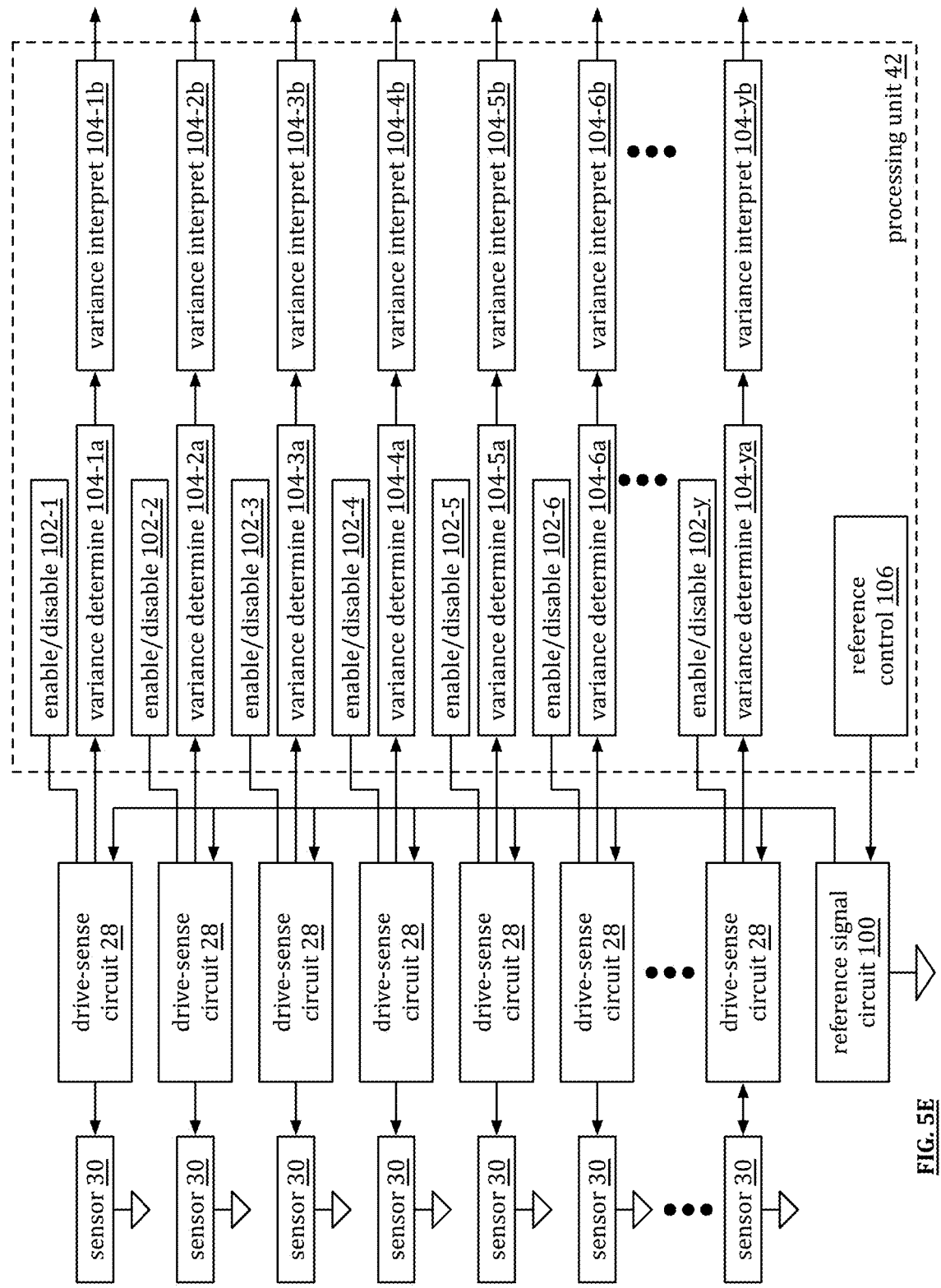
FIG. 5E is a schematic block diagram of another embodiment of a computing subsystem in accordance with the present disclosure.

FIG. 5E is a schematic block diagram of another embodiment of a computing subsystem 25 that includes a processing module 42, a plurality of drive sense circuits 28, and a plurality of sensors 30. This embodiment is similar to the embodiment of FIG. 5D with the functionality of the drive-sense processing block 104, a drive-sense control block 102, and a reference control block 106 shown in greater detail. For instance, the drive-sense control block 102 includes individual enable/disable blocks 102-1 through 102-y. An enable/disable block functions to enable or disable a corresponding drive-sense circuit in a manner as discussed above with reference to FIG. 5D.

The drive-sense processing block 104 includes variance determining modules 104-1a through *y* and variance interpreting modules 104-2a through *y*. For example, variance determining module 104-1a receives, from the corresponding drive-sense circuit 28, a signal representative of a physical condition sensed by a sensor. The variance determining module 104-1a functions to determine a difference from the signal representing the sensed physical condition with a signal representing a known, or reference, physical condition. The variance interpreting module 104-1*b* interprets the difference to determine a specific value for the sensed physical condition.

As a specific example, the variance determining module 104-1*a* receives a digital signal of 1001 0110 (150 in decimal) that is representative of a sensed physical condition (e.g., temperature) sensed by a sensor from the corresponding drive-sense circuit 28. With 8-bits, there are 28 (256) possible signals representing the sensed physical condition. Assume that the units for temperature is Celsius and a digital value of 0100 0000 (64 in decimal) represents the known value for 25 degree Celsius. The variance determining module 104-*b*1 determines the difference between the digital signal representing the sensed value (e.g., 1001 0110, 150 in decimal) and the known signal value of (e.g., 0100 0000, 64 in decimal), which is 0011 0000 (86 in decimal). The variance determining module 104-*b*1 then determines the sensed value based on the difference and the known value. In this example, the sensed value equals 25+86*(100/256)= 25+33.6=58.6 degrees Celsius.

FIG. 6 is a schematic block diagram of a drive center circuit 28-*a* coupled to a sensor 30. The drive sense-sense circuit 28 includes a power source circuit 110 and a power signal change detection circuit 112. The sensor 30 includes one or more transducers that have varying electrical characteristics (e.g., capacitance, inductance, impedance, current, voltage, etc.) based on varying physical conditions 114 (e.g., pressure, temperature, biological, chemical, etc.), or vice versa (e.g., an actuator).

The power source circuit 110 is operably coupled to the sensor 30 and, when enabled (e.g., from a control signal from the processing module 42, power is applied, a switch is closed, a reference signal is received, etc.) provides a power signal 116 to the sensor 30. The power source circuit 110 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 110 generates the power signal 116 to include a DC (direct current) component and/or an oscillating component.

When receiving the power signal 116 and when exposed to a condition 114, an electrical characteristic of the sensor affects 118 the power signal. When the power signal change detection circuit 112 is enabled, it detects the affect 118 on the power signal as a result of the electrical characteristic of the sensor. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

As another example, the power signal is a 1.5 voltage signal and, under a first condition, the sensor draws 1 milliamp of current, which corresponds to an impedance of 1.5 K Ohms. Under a second conditions, the power signal drops to 1.3 volts and the current increases to 1.3 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

The power signal 116 includes a DC component 122 and/or an oscillating component 124 as shown in FIG. 7. The oscillating component 124 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). Note that the power signal is shown without affect from the sensor as the result of a condition or changing condition.

In an embodiment, power generating circuit 110 varies frequency of the oscillating component 124 of the power signal 116 so that it can be tuned to the impedance of the sensor and/or to be off-set in frequency from other power signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

In an embodiment, the power generating circuit 110 varies magnitude of the DC component 122 and/or the oscillating component 124 to improve resolution of sensing and/or to adjust power consumption of sensing. In addition, the power generating circuit 110 generates the drive signal 110 such that the magnitude of the oscillating component 124 is less than magnitude of the DC component 122.

FIG. 6A is a schematic block diagram of a drive center circuit 28-*a*1 coupled to a sensor 30. The drive sense-sense circuit 28-*a*1 includes a signal source circuit 111, a signal change detection circuit 113, and a power source 115. The power source 115 (e.g., a battery, a power supply, a current source, etc.) generates a voltage and/or current that is combined with a signal 117, which is produced by the signal source circuit 111. The combined signal is supplied to the sensor 30.

The signal source circuit 111 may be a voltage supply circuit (e.g., a battery, a linear regulator, an unregulated DC-to-DC converter, etc.) to produce a voltage-based signal 117, a current supply circuit (e.g., a current source circuit, a current mirror circuit, etc.) to produce a current-based signal 117, or a circuit that provide a desired power level to the sensor and substantially matches impedance of the sensor. The signal source circuit 111 generates the signal 117 to include a DC (direct current) component and/or an oscillating component.

When receiving the combined signal (e.g., signal 117 and power from the power source) and when exposed to a condition 114, an electrical characteristic of the sensor affects 119 the signal. When the signal change detection circuit 113 is enabled, it detects the affect 119 on the signal as a result of the electrical characteristic of the sensor.

FIG. 8 is an example of a sensor graph that plots an electrical characteristic versus a condition. The sensor has a substantially linear region in which an incremental change in a condition produces a corresponding incremental change in the electrical characteristic. The graph shows two types of electrical characteristics: one that increases as the condition increases and the other that decreases and the condition increases. As an example of the first type, impedance of a temperature sensor increases and the temperature increases.

As an example of a second type, a capacitance touch sensor decreases in capacitance as a touch is sensed.

Figure 9:
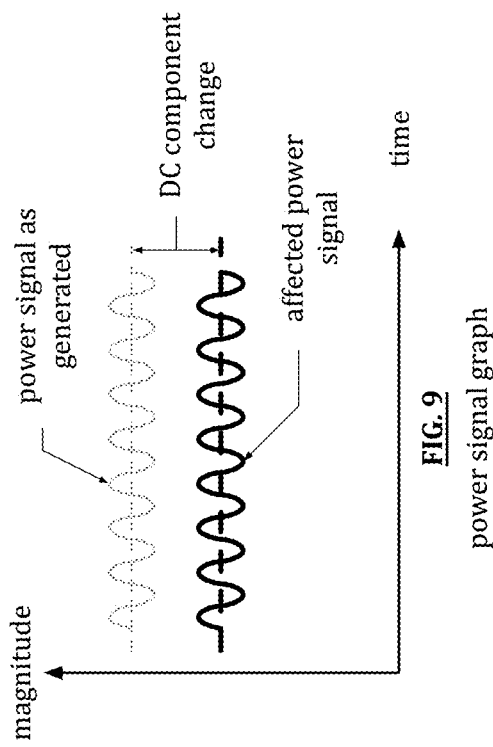
FIG. 9 is a schematic block diagram of another example of a power signal graph in accordance with the present disclosure.

FIG. 9 is a schematic block diagram of another example of a power signal graph in which the electrical characteristic or change in electrical characteristic of the sensor is affecting the power signal. In this example, the effect of the electrical characteristic or change in electrical characteristic of the sensor reduced the DC component but had little to no effect on the oscillating component. For example, the electrical characteristic is resistance. In this example, the resistance or change in resistance of the sensor decreased the power signal, inferring an increase in resistance for a relatively constant current.

Figure 10:
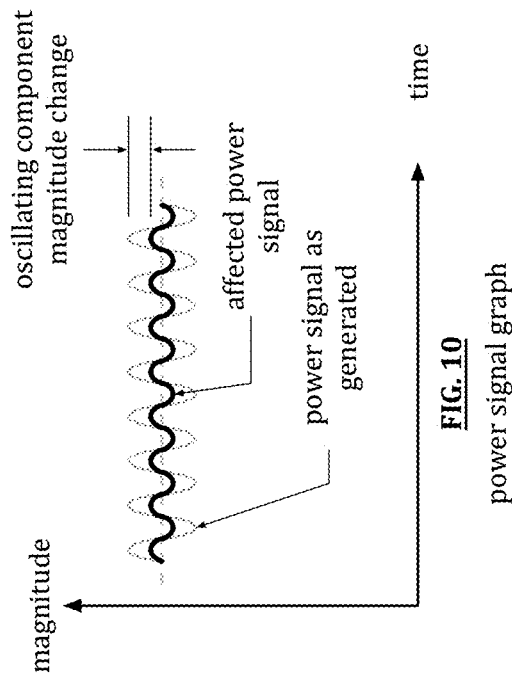
FIG. 10 is a schematic block diagram of another example of a power signal graph in accordance with the present disclosure.

FIG. 10 is a schematic block diagram of another example of a power signal graph in which the electrical characteristic or change in electrical characteristic of the sensor is affecting the power signal. In this example, the effect of the electrical characteristic or change in electrical characteristic of the sensor reduced magnitude of the oscillating component but had little to no effect on the DC component. For example, the electrical characteristic is impedance of a capacitor and/or an inductor. In this example, the impedance or change in impedance of the sensor decreased the magnitude of the oscillating signal component, inferring an increase in impedance for a relatively constant current.

Figure 11A:
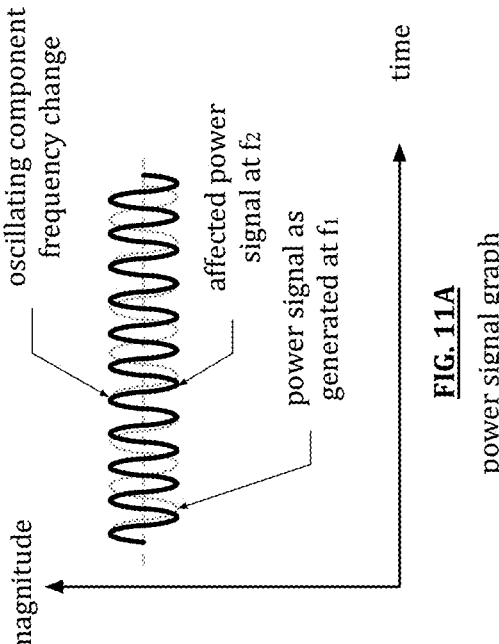
FIG. 11A is a schematic block diagram of another example of a power signal graph in accordance with the present disclosure.
Figure 11:
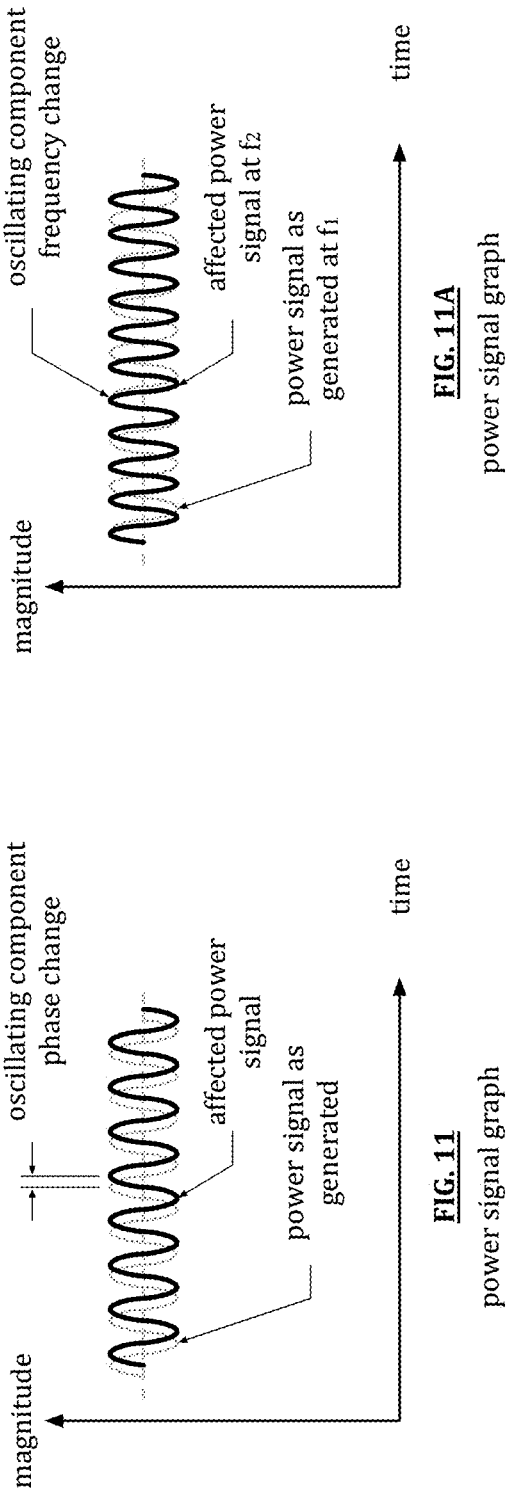
FIG. 11 is a schematic block diagram of another example of a power signal graph in accordance with the present disclosure.

FIG. 11 is a schematic block diagram of another example of a power signal graph in which the electrical characteristic or change in electrical characteristic of the sensor is affecting the power signal. In this example, the effect of the electrical characteristic or change in electrical characteristic of the sensor shifted frequency of the oscillating component but had little to no effect on the DC component. For example, the electrical characteristic is reactance of a capacitor and/or an inductor. In this example, the reactance or change in reactance of the sensor shifted frequency of the oscillating signal component, inferring an increase in reactance (e.g., sensor is functioning as an integrator or phase shift circuit).

FIG. 11A is a schematic block diagram of another example of a power signal graph in which the electrical characteristic or change in electrical characteristic of the sensor is affecting the power signal. In this example, the effect of the electrical characteristic or change in electrical characteristic of the sensor changes the frequency of the oscillating component but had little to no effect on the DC component. For example, the sensor includes two transducers that oscillate at different frequencies. The first transducer receives the power signal at a frequency of $f_1$ and converts it into a first physical condition. The second transducer is stimulated by the first physical condition to create an electrical signal at a different frequency $f_2$. In this example, the first and second transducers of the sensor change the frequency of the oscillating signal component, which allows for more granular sensing and/or a broader range of sensing.

Figure 12:
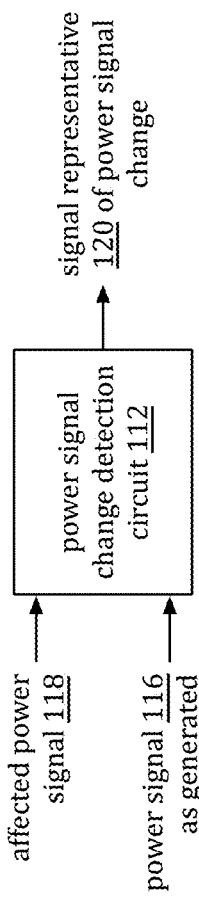
FIG. 12 is a schematic block diagram of an embodiment of a power signal change detection circuit in accordance with the present disclosure.

FIG. 12 is a schematic block diagram of an embodiment of a power signal change detection circuit 112 receiving the affected power signal 118 and the power signal 116 as generated to produce, therefrom, the signal representative 120 of the power signal change. The affect 118 on the power signal is the result of an electrical characteristic and/or change in the electrical characteristic of a sensor; a few examples of the affects are shown in FIGS. 8-11A.

In an embodiment, the power signal change detection circuit 112 detect a change in the DC component 122 and/or the oscillating component 124 of the power signal 116. The power signal change detection circuit 112 then generates the signal representative 120 of the change to the power signal based on the change to the power signal. For example, the change to the power signal results from the impedance of the sensor and/or a change in impedance of the sensor. The representative signal 120 is reflective of the change in the power signal and/or in the change in the sensor's impedance.

In an embodiment, the power signal change detection circuit 112 is operable to detect a change to the oscillating component at a frequency, which may be a phase shift, frequency change, and/or change in magnitude of the oscillating component. The power signal change detection circuit 112 is also operable to generate the signal representative of the change to the power signal based on the change to the oscillating component at the frequency. The power signal change detection circuit 112 is further operable to provide feedback to the power source circuit 110 regarding the oscillating component. The feedback allows the power source circuit 110 to regulate the oscillating component at the desired frequency, phase, and/or magnitude.

Figure 13:
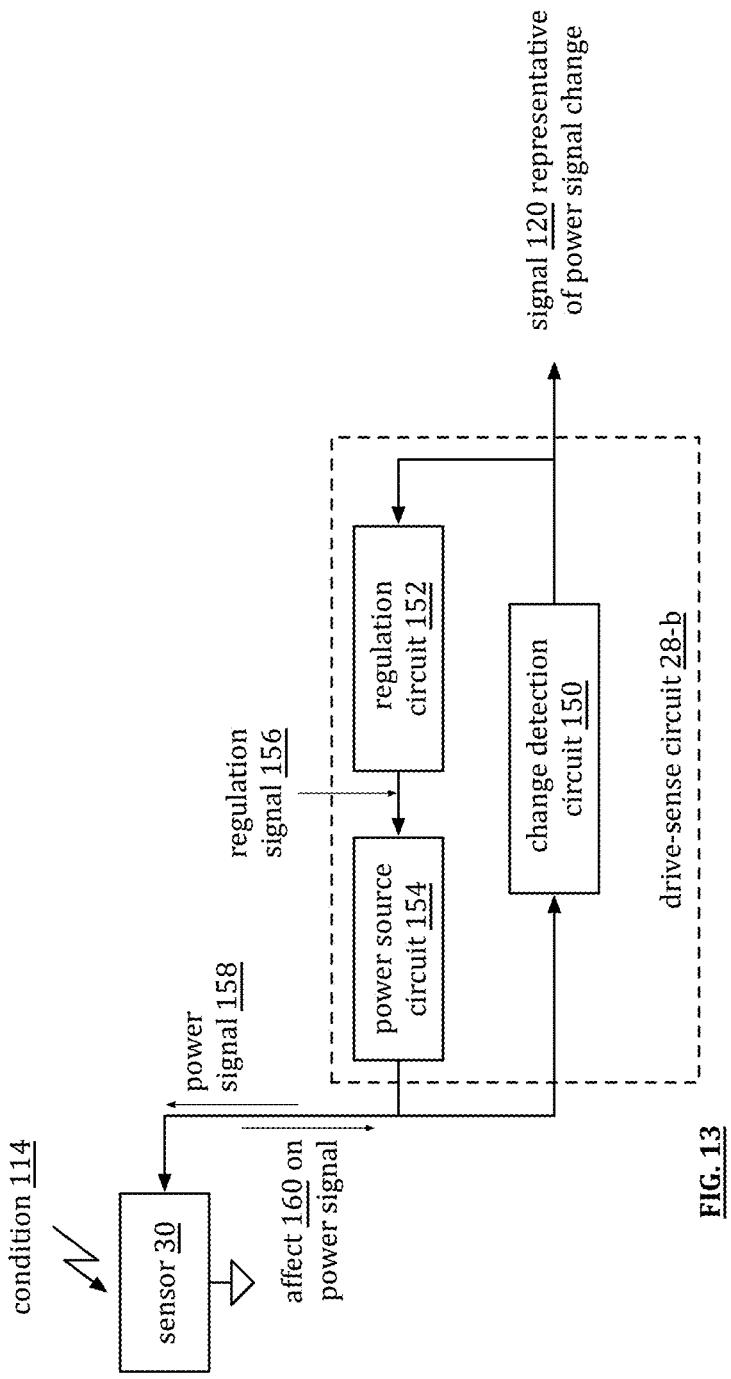
FIG. 13 is a schematic block diagram of another embodiment of a drive-sense circuit in accordance with the present disclosure.

FIG. 13 is a schematic block diagram of another embodiment of a drive sense circuit 28-b includes a change detection circuit 150, a regulation circuit 152, and a power source circuit 154. The drive-sense circuit 28-b is coupled to the sensor 30, which includes a transducer that has varying electrical characteristics (e.g., capacitance, inductance, impedance, current, voltage, etc.) based on varying physical conditions 114 (e.g., pressure, temperature, biological, chemical, etc.).

The power source circuit 154 is operably coupled to the sensor 30 and, when enabled (e.g., from a control signal from the processing module 42, power is applied, a switch is closed, a reference signal is received, etc.) provides a power signal 158 to the sensor 30. The power source circuit 154 may be a voltage supply circuit (e.g., a battery, a linear regulator, an unregulated DC-to-DC converter, etc.) to produce a voltage-based power signal or a current supply circuit (e.g., a current source circuit, a current mirror circuit, etc.) to produce a current-based power signal. The power source circuit 154 generates the power signal 158 to include a DC (direct current) component and an oscillating component.

When receiving the power signal 158 and when exposed to a condition 114, an electrical characteristic of the sensor affects 160 the power signal. When the change detection circuit 150 is enabled, it detects the affect 160 on the power signal as a result of the electrical characteristic of the sensor 30. The change detection circuit 150 is further operable to generate a signal 120 that is representative of change to the power signal based on the detected effect on the power signal.

The regulation circuit 152, when its enabled, generates regulation signal 156 to regulate the DC component to a desired DC level and/or regulate the oscillating component to a desired oscillating level (e.g., magnitude, phase, and/or frequency) based on the signal 120 that is representative of the change to the power signal. The power source circuit 154 utilizes the regulation signal 156 to keep the power signal at a desired setting 158 regardless of the electrical characteristic of the sensor. In this manner, the amount of regulation is indicative of the affect the electrical characteristic had on the power signal.

In an example, the power source circuit 158 is a DC-DC converter operable to provide a regulated power signal having DC and AC components. The change detection circuit 150 is a comparator and the regulation circuit 152 is a pulse width modulator to produce the regulation signal 156. The comparator compares the power signal 158, which is affected by the sensor, with a reference signal that includes DC and AC components. When the electrical characteristics is at a first level (e.g., a first impedance), the power signal is regulated to provide a voltage and current such that the power signal substantially resembles the reference signal.

When the electrical characteristics changes to a second level (e.g., a second impedance), the change detection circuit 150 detects a change in the DC and/or AC component of the power signal 158 and generates the representative signal 120, which indicates the changes. The regulation circuit 152 detects the change in the representative signal 120 and creates the regulation signal to substantially remove the effect on the power signal. The regulation of the power signal 158 may be done by regulating the magnitude of the DC and/or AC components, by adjusting the frequency of AC component, and/or by adjusting the phase of the AC component.

With respect to the operation of various drive-sense circuits as described herein and/or their equivalents, note that the operation of such a drive-sense circuit is operable simultaneously to drive and sense a signal via a single line. In comparison to switched, time-divided, time-multiplexed, etc. operation in which there is switching between driving and sensing (e.g., driving at first time, sensing at second time, etc.) of different respective signals at separate and distinct times, the drive-sense circuit is operable simultaneously to perform both driving and sensing of a signal. In some examples, such simultaneous driving and sensing is performed via a single line using a drive-sense circuit.

In addition, other alternative implementations of various drive-sense circuits (DSCs) are described in U.S. Utility patent application Ser. No. 16/113,379, entitled "DRIVE SENSE CIRCUIT WITH DRIVE-SENSE LINE," filed Aug. 27, 2018, pending. Any instantiation of a drive-sense circuit as described herein may also be implemented using any of the various implementations of various drive-sense circuits (DSCs) described in U.S. Utility patent application Ser. No. 16/113,379.

In addition, note that the one or more signals provided from a drive-sense circuit (DSC) may be of any of a variety of types. For example, such a signal may be based on encoding of one or more bits to generate one or more coded bits used to generate modulation data (or generally, data). For example, a device is configured to perform forward error correction (FEC) and/or error checking and correction (ECC) code of one or more bits to generate one or more coded bits. Examples of FEC and/or ECC may include turbo code, convolutional code, trellis coded modulation (TCM), turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof.

Also, the one or more coded bits may then undergo modulation or symbol mapping to generate modulation symbols (e.g., the modulation symbols may include data intended for one or more recipient devices, components, elements, etc.). Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

In addition, note that a signal provided from a DSC may be of a unique frequency that is different from signals provided from other DSCs. Also, a signal provided from a DSC may include multiple frequencies independently or simultaneously. The frequency of the signal can be hopped on a pre-arranged pattern. In some examples, a handshake is established between one or more DSCs and one or more processing modules (e.g., one or more controllers) such that the one or more DSC is/are directed by the one or more processing modules regarding which frequency or frequencies and/or which other one or more characteristics of the one or more signals to use at one or more respective times and/or in one or more particular situations.

With respect to any signal that is driven and simultaneously detected by a DSC, note that any additional signal that is coupled into a line, an electrode, a touch sensor, a bus, a communication link, a battery, a load, an electrical coupling or connection, etc. associated with that DSC is also detectable. For example, a DSC that is associated with such a line, an electrode, a touch sensor, a bus, a communication link, a battery, a load, an electrical coupling or connection, etc. is configured to detect any signal from one or more other lines, electrodes, touch sensors, buses, communication links, loads, electrical couplings or connections, etc. that get coupled into that line, electrode, touch sensor, bus, communication link, battery, load, electrical coupling or connection, etc.

Note that the different respective signals that are driven and simultaneously sensed by one or more DSCs may be differentiated from one another. Appropriate filtering and processing can identify the various signals given their differentiation, orthogonality to one another, difference in frequency, etc. Other examples described herein and their equivalents operate using any of a number of different characteristics other than or in addition to frequency.

Moreover, with respect to any embodiment, diagram, example, etc. that includes more than one DSC, note that the DSCs may be implemented in a variety of manners. For example, all of the DSCs may be of the same type, implementation, configuration, etc. In another example, the first DSC may be of a first type, implementation, configuration, etc., and a second DSC may be of a second type, implementation, configuration, etc. that is different than the first DSC. Considering a specific example, a first DSC may be implemented to detect change of impedance associated with a line, an electrode, a touch sensor, a bus, a communication link, an electrical coupling or connection, etc. associated with that first DSC, while a second DSC may be implemented to detect change of voltage associated with a line, an electrode, a touch sensor, a bus, a communication link, an electrical coupling or connection, etc. associated with that second DSC. In addition, note that a third DSC may be implemented to detect change of a current associated with a line, an electrode, a touch sensor, a bus, a communication link, an electrical coupling or connection, etc. associated with that DSC. In general, while a common reference may be used generally to show a DSC or multiple instantiations of a DSC within a given embodiment, diagram, example, etc., note that any particular DSC may be implemented in accordance with any manner as described herein, such as described in U.S. Utility patent application Ser. No. 16/113,379, etc. and/or their equivalents.

Note that certain of the following diagrams show a computing device (e.g., alternatively referred to as device; the terms computing device and device may be used interchangeably) that may include or be coupled to one or more processing modules. In certain instances, the one or more processing modules is configured to communicate with and interact with one or more other devices including one or more of DSCs, one or more components associated with a DSC, one or more components associated with a display, a touch sensor device that may or may not include display functionality (e.g., a touchscreen display with sensors, a panel without display functionality that includes one or more sensors, etc., one or more other components associated with a display, a touchscreen display with sensors, or generally a touch sensor device that may or may not include display functionality, etc.) Note that any such implementation of one or more processing modules may include integrated memory and/or be coupled to other memory. At least some of the memory stores operational instructions to be executed by the one or more processing modules. In addition, note that the one or more processing modules may interface with one or more other computing devices, components, elements, etc. via one or more communication links, networks, communication pathways, channels, etc. (e.g., such as via one or more communication interfaces of the computing device, such as may be integrated into the one or more processing modules or be implemented as a separate component, circuitry, etc.).

In addition, when a DSC is implemented to communicate with and interact with another element, the DSC is configured simultaneously to transmit and receive one or more signals with the element. For example, a DSC is configured simultaneously to sense and to drive one or more signals to the one element. During transmission of a signal from a DSC, that same DSC is configured simultaneously to sense the signal being transmitted from the DSC and any other signal may be coupled into the signal that is being transmitted from the DSC.

In addition, while many examples, embodiments, diagrams, etc. herein include one or more DSCs (e.g., coupled to one or more processing modules and one or more electrodes), note that any instantiation of a DSC may alternatively be implemented using a channel drive circuitry, an Analog Front End (AFE) that includes analog to digital and/or digital to analog conversion capability, etc. within alternative embodiments.

Figure 14:
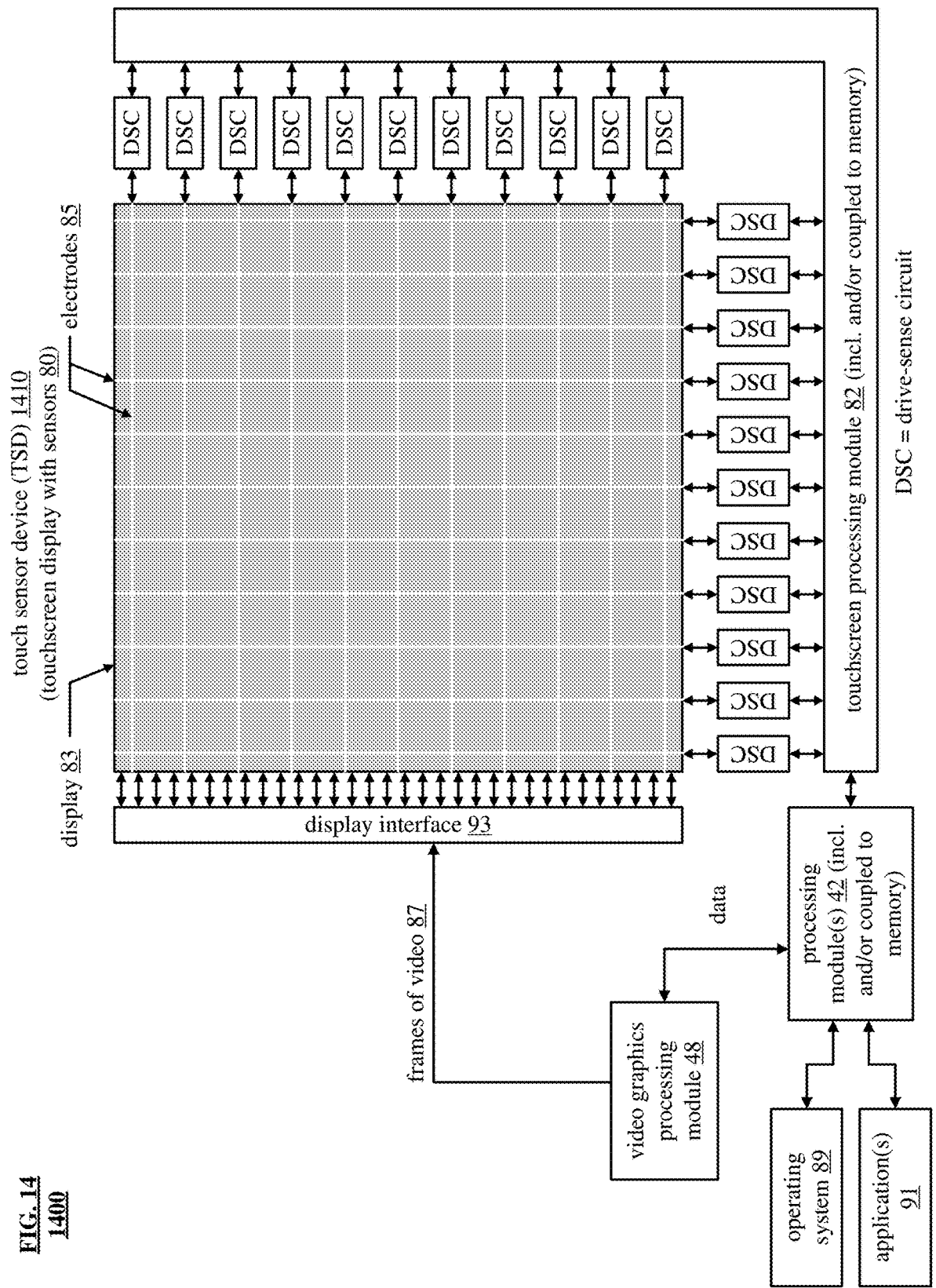
FIG. 14 is a schematic block diagram of an embodiment of a touch sensor device (TSD) in accordance with the present disclosure.

FIG. 14 is a schematic block diagram of an embodiment 1400 of a touch sensor device (TSD) in accordance with the present disclosure. This diagram includes a schematic block diagram of an embodiment of a TSD 1410 that is implemented to include a touchscreen display with sensors 80 that also includes a plurality of drive-sense circuits (DSCs), a touchscreen processing module 82, a display 83, and a plurality of electrodes 85 (e.g., the electrodes operate as the sensors or sensor components into which touch and/or proximity may be detected in the touchscreen display with sensors 80). The touchscreen display with sensors 80 is coupled to a processing module 42, a video graphics processing module 48, and a display interface 93, which are components of a computing device (e.g., one or more of computing devices 14-18), an interactive display, or other device that includes a touchscreen display. An interactive display functions to provide users with an interactive experience (e.g., touch the screen to obtain information, be entertained, etc.). For example, a store provides interactive displays for customers to find certain products, to obtain coupons, to enter contests, etc.

In some examples, note that display functionality and touchscreen functionality are both provided by a combined device that may be referred to as a touchscreen display with sensors 80. However, in other examples, note that touchscreen functionality and display functionality are provided by separate devices, namely, the display 83 and a touchscreen that is implemented separately from the display 83. Generally speaking, different implementations may include display functionality and touchscreen functionality within a combined device such as a touchscreen display with sensors 80, or separately using a display 83 and a touchscreen.

There are a variety of other devices that may be implemented to include a touchscreen display. For example, a vending machine includes a touchscreen display to select and/or pay for an item. Another example of a device having a touchscreen display is an Automated Teller Machine (ATM). As yet another example, an automobile includes a touchscreen display for entertainment media control, navigation, climate control, etc.

The touchscreen display with sensors 80 includes a large display 83 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it's not an exhaustive list. Other screen sizes, resolutions, aspect ratios, etc. may be implemented within other various displays.

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 |

The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for the touch sense part of the touchscreen display. The electrodes 85 are distributed throughout the display area or where touchscreen functionality is desired. For example, a first group of the electrodes are arranged in rows and a second group of electrodes are arranged in columns. As will be discussed in greater detail with reference to one or more of FIGS. 18, 19, 20, and 21, the row electrodes are separated from the column electrodes by a dielectric material.

The electrodes 85 are comprised of a transparent conductive material and are in-cell or on-cell with respect to layers of the display. For example, a conductive trace is placed in-cell or on-cell of a layer of the touchscreen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

In certain examples, one or more images are displayed so as to facilitate communication of data from a first computing device to a second computing device via a user. For example, one or more images are displayed on the touchscreen display with sensors 80, and when a user is in contact with the one or more images that are displayed on the touchscreen display with sensors 80, one or more signals that are associated with the one or more images are coupled via the user to another computing device. In some examples, the touchscreen display with sensors 80 is implemented within a portable device, such as a cell phone, a smart phone, a tablet, and/or any other such device that includes a touching display with sensors 80. Also, in some examples, note that the computing device that is displaying one or more images that are coupled via the user to another computing device does not include a touchscreen display with sensors 80, but merely a display that is implemented to display one or more images. In accordance with operation of the display, whether implemented as it display alone for a touchscreen display with sensors, as the one or more images are displayed, and when the user is in contact with the display (e.g., such as touching the one or more images with a digit of a hand, such as found, fingers, etc.) or is was within sufficient proximity to facilitate coupling of one or more signals that are associated with a lot of images, then the signals are coupled via the user to another computing device.

When the display 83 is implemented as a touchscreen display with sensors 80, while the display 83 is rendering the frames of video into visible images, the drive-sense circuits (DSC) provide sensor signals to the electrodes 85. When the touchscreen (e.g., which may alternatively be referred to as screen) is touched, capacitance of the electrodes 85 proximal to the touch (i.e., directly or close by) is changed. The DSCs detect the capacitance change for affected electrodes and provide the detected change to the touchscreen processing module 82.

The touchscreen processing module 82 processes the capacitance change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

In addition, note that certain implementations of TSDs may be made to include many more row electrodes and many more column electrodes than shown in this diagram as well as others included herein. In certain examples, a TSD includes tens, hundreds, thousands, etc. or an even larger number of row electrodes and/or tens, hundreds, thousands, etc. or an even larger number of column electrodes. In general, a TSD may be implemented to include one or more electrodes. In certain examples, such one or more electrodes includes a first group of one or more electrodes implemented in a first direction and a second group of one or more electrodes implemented in a second direction that is different than the first direction. In one implementation, the second direction is 90 degrees different than the first direction. In another implementation, the second direction is offset from the first direction by some other amount (e.g., a difference in alignment that is greater than 10 degrees and less than 90 degrees different than the first direction).

Figure 15:
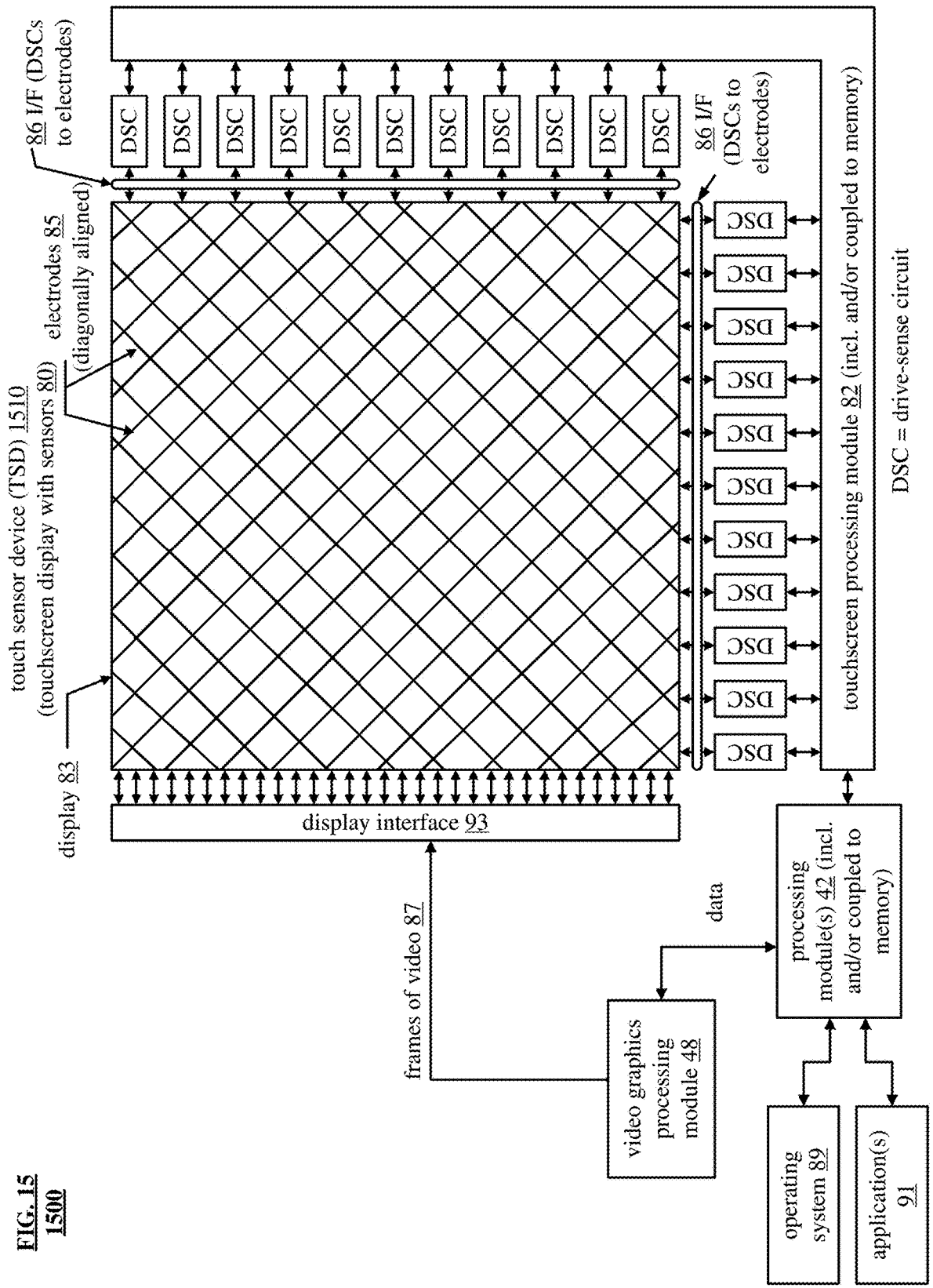
FIG. 15 is a schematic block diagram of another embodiment of a touch sensor device (TSD) in accordance with the present disclosure.

FIG. 15 is a schematic block diagram of another embodiment 1500 of a TSD 1510 in accordance with the present disclosure. This diagram has certain similarities to the prior diagram and includes a schematic block diagram of another embodiment of a TSD 1510 that includes display functionality, e.g., a touchscreen display 80, and that also includes a plurality of drive-sense circuits (DSCs), the touchscreen processing module 82, the processing module 42, the video graphics processing module 48, a display 83, and a plurality of electrodes 85. The processing module 42 is executing an operating system 89 and one or more user applications 91 to produce data that is processed by the video graphics processing module 48 to generate frames of data 87. The processing module 42 provides the frames of data 87 to the display interface 93.

This diagram is similar to the prior diagram with at least one different being that the electrodes 85 are diagonally aligned. Generally speaking, the electrodes 85 may be implemented using any desired pattern, configuration, arrangement, etc. In addition, interfaces (I/Fs) 86 provide interfacing between the DSCs and the electrodes 85 appropriately such that a respective DSC services one or more electrodes 85 that are diagonally aligned in this implementation of a TSD 1510. For example, given the diagonally aligned electrodes 85, the DSCs as implemented in a particular architecture may not align directly with the respective electrodes that they service, and the I/Fs 86 provide for appropriate coupling between the DSCs and the electrodes 85. The TSD 1510 operates similarly to the TSD 1410 of FIG. 14 with the above noted differences.

Figure 16:
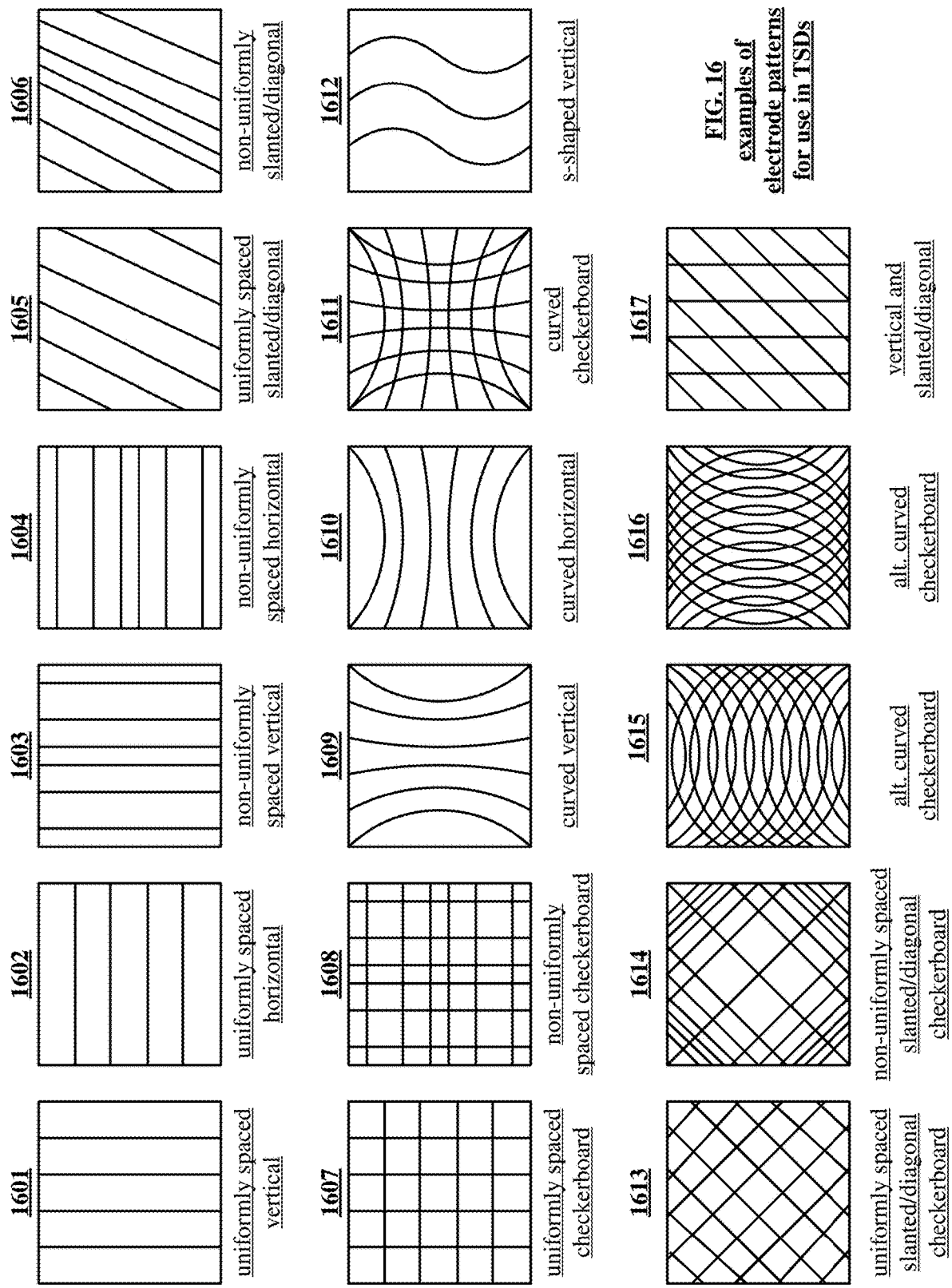
FIG. 16 is a schematic block diagram of various embodiments of electrode patterns that may be used on a touch sensor device (TSD) in accordance with the present disclosure.

FIG. 16 is a schematic block diagram of various embodiments 1601 through 1617 of electrode patterns that may be used on a TSD in accordance with the present disclosure. These diagrams show portions of or cross-sections of various embodiments of electrode patterns that may be used in accordance with any of the various TSDs described herein and/or their equivalents.

Generally speaking, the various electrodes within a TSD may be implemented in any desired configuration, pattern, arrangement, etc. In addition, note that alternative embodiments may include an electrode that is a pad, a button, etc. that is not implemented in a configuration, pattern, arrangement, etc. that facilitate capacitive coupling between a first electrode implemented in a first direction and a second electrode implemented in a second direction.

Reference 1601 corresponds to a pattern that includes uniformly spaced vertical electrodes. Reference numeral 1602 corresponds to a pattern that includes uniformly spaced horizontal electrodes. Generally speaking, note that the electrodes of such patterns may be aligned in any desired direction. Also, they may be uniformly spaced, non-uniformly spaced, parallel, non-parallel, etc.

Reference numeral 1603 corresponds to a pattern that includes non-uniformly spaced vertical electrodes. Reference numeral 1604 corresponds to a pattern that includes non-uniformly spaced horizontal electrodes. Note that the non-uniformity of spacing of the vertical or horizontal electrodes may be based on any desired pattern, including a repetitive pattern, a random pattern, etc.

Reference numeral 1605 corresponds to a pattern that includes uniformly spaced slanted/diagonal electrodes. Reference numeral 1606 corresponds to a pattern that includes nonuniformly spliced slanted electrodes.

Reference 1607 corresponds to a pattern that includes a uniformly spaced checkerboard. Reference 1608 corresponds to a pattern that includes non-uniformly spaced checkerboard. Note that the non-uniformity of spacing of the vertical and horizontal electrodes within such a non-uniformly spaced checkerboard pattern may be based on any desired pattern, including a repetitive pattern, a random pattern, etc. In addition, note that a pattern including electrodes extending in various directions such as checkerboard may include electrical isolation between the electrodes aligned in one direction and the electrodes aligned in another direction. For example, considering a checkerboard pattern such as these, the vertical and horizontal aligned electrodes may be electrically isolated such that there is not direct electrical connection between the vertical and horizontal aligned electrodes yet are configured to facilitate capacitive coupling of signals between the vertical and horizontal aligned electrodes.

Reference 1609 corresponds to a pattern that includes curved vertical aligned electrodes. In this particular example, the electrodes are more closely aligned to one another near the middle of the pattern than at the top or the bottom of the pattern. Reference 1610 corresponds to a pattern that includes curved horizontal aligned electrodes. In this particular example, the electrodes are more closely aligned to one another near the middle of the pattern than at the left or the right of the pattern.

Reference 1611 corresponds to a pattern that includes a curved checkerboard that includes both curved vertical aligned electrodes and curved horizontal aligned electrodes. Note also that the curved vertical aligned electrodes and curved horizontal aligned electrodes may be electrically isolated from one another such that such that there is not direct electrical connection between the vertical aligned electrodes and curved horizontal aligned electrodes.

Reference 1612 corresponds to a pattern that includes s-shaped vertical aligned electrodes. Note that an alternative pattern may alternatively include s-shaped horizontal aligned electrodes.

Reference 1613 corresponds to a pattern that includes a uniformly spaced slanted/diagonal checkerboard. Reference 1614 corresponds to a pattern that includes a non-uniformly spaced slanted/diagonal checkerboard. In this particular example, the electrodes are more closely aligned near the corners of this cross-section than in the middle/center of this cross-section.

Reference 1615 corresponds to a pattern that includes an alternative curved checkerboard such that some electrodes curve up and back down when traversing from left to right and other electrodes curve down and back up when traversing from left to right and other. Reference 1616 corresponds to a pattern that includes an alternative curved checkerboard such that some electrodes curve to the right and back to the left when traversing from top to bottom and other electrodes curve to the left and back to the right when traversing from top to bottom. Reference 1617 corresponds to a vertical and slanted/diagonal pattern that includes some electrodes aligned vertically and other electrodes aligned in a slanted/diagonal manner.

For example, considering the patterns shown by reference numerals 1613, 1614, 1615, 1616, and 1617 that include electrodes aligned in at least 2 different directions may be electrically isolated such that there is not direct electrical connection between the electrodes aligned in at least 2 different directions yet are configured to facilitate capacitive coupling of signals between the electrodes aligned in at least 2 different directions.

Generally speaking, any desired pattern of electrodes may be used in a TSD and may be implemented on any surface, layer, component, etc. of the TSD. In some examples, note that one or more protective layers may be implemented over electrodes to ensure that they are not damaged, etc. yet still are configured to facilitate capacitive coupling with the electrodes and/or between electrodes through the one or more protective layers.

In addition, with respect to electrodes implemented in different directions (e.g., rows and columns, or some other pattern) within a TSD, a mutual capacitance is created between a first electrode implemented in a first direction in a first surface, layer, component, etc. of the TSD and a second electrode implemented in a second direction in a second surface, layer, component, etc. of the TSD. In addition, each electrode has a self-capacitance, which corresponds to a parasitic capacitance created by the electrode with respect to other conductors in the TSD (e.g., ground, conductive layer(s), and/or one or more other electrodes). Also, a mutual capacitance exists between a first electrode implemented in a first direction in a first surface, layer, component, etc. of the TSD and a second electrode implemented in a second direction in a second surface, layer, component, etc. of the TSD. When no touch (e.g., from a user, stylus, other device that may or may not include TSD functionality, another other TSD, etc. is present), the self-capacitances and mutual capacitances of the TSD are at a nominal state. Depending on the length, width, and thickness of the electrodes, separation from the electrodes and other conductive surfaces, and dielectric properties of the layers, the self-capacitances and mutual capacitances can range from a few pico-Farads to 10's of nano-Farads.

Figure 17:
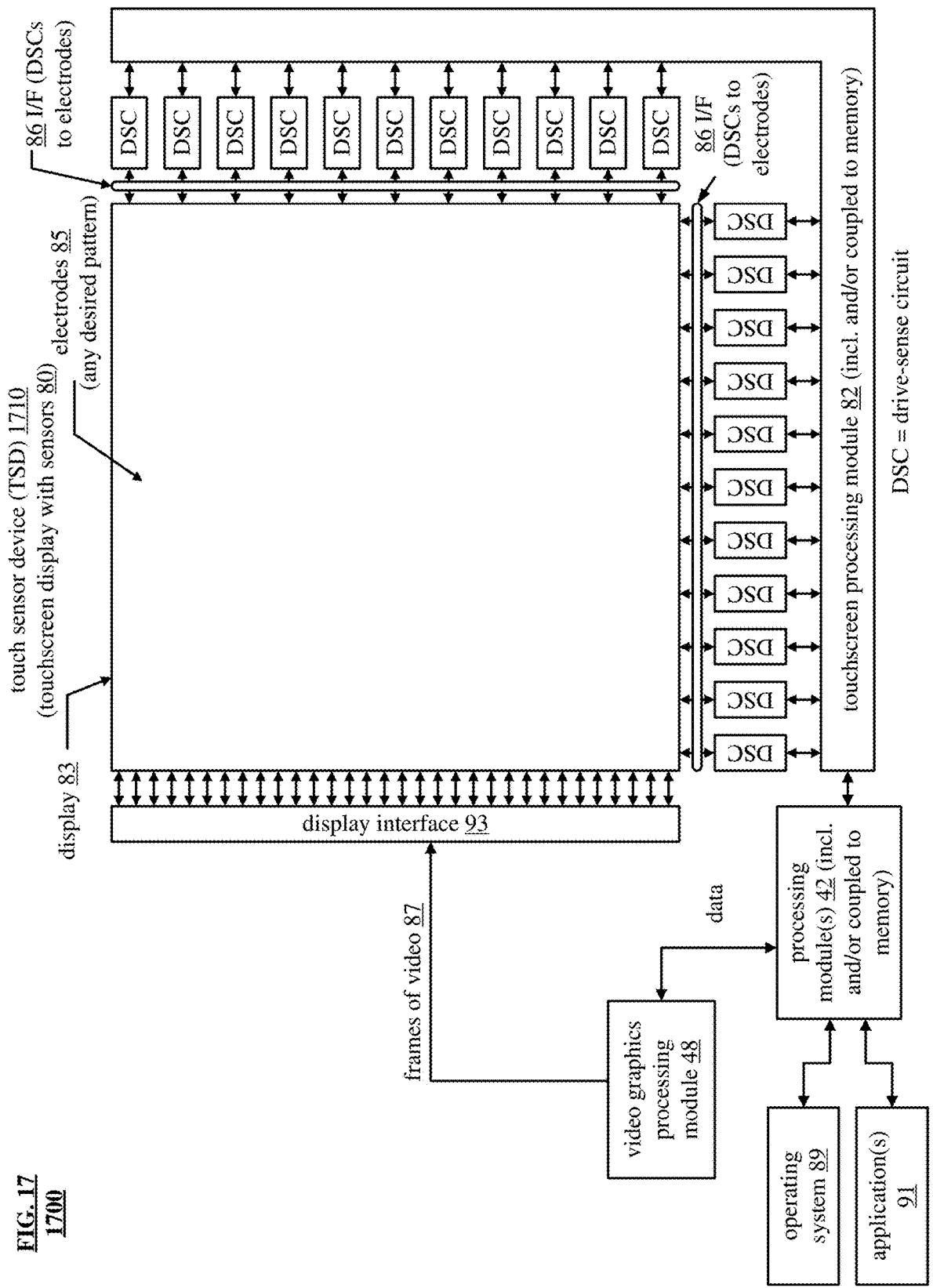
FIG. 17 is a schematic block diagram of another embodiment of a touch sensor device (TSD) that is similar to FIG. 15 with the option of using any desired electrode pattern in accordance with the present disclosure.

FIG. 17 is a schematic block diagram of another embodiment 1700 of a TSD that is similar to FIG. 15 with the option of using any desired electrode pattern in accordance with the present disclosure. For example, the electrodes 85 of the TSD 1710 may be implemented using any of the various electrode patterns shown within FIG. 16, or alternatively, using any other desired electrode pattern, configuration, etc. Similar to FIG. 15, I/Fs 86 provide for appropriate coupling between the DSCs and the electrodes 85 to accommodate any desired electrode pattern and coupling between the DSCs and the electrodes 85.

Figure 18:
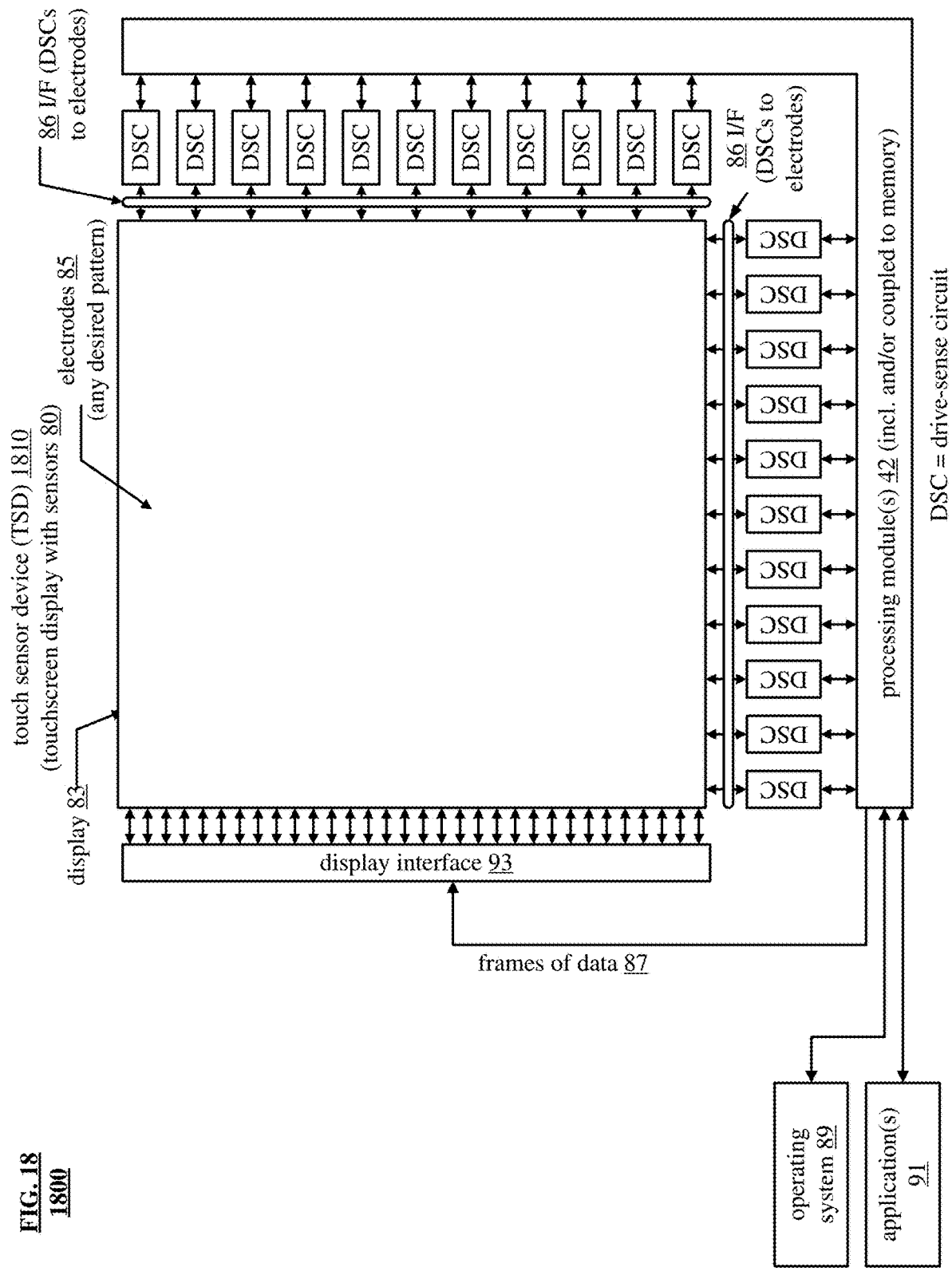
FIG. 18 is a schematic block diagram of another embodiment of a touch sensor device (TSD) in accordance with the present disclosure.

FIG. 18 is a schematic block diagram of another embodiment 1800 of a touchscreen display in accordance with the present disclosure. This diagram includes a schematic block diagram of another embodiment of a touch sensor device (TSD) 1810 that includes display functionality, e.g., a touchscreen display 80, and that also includes a plurality of drive-sense circuits (DSCs), the processing module 42, a display 83, and a plurality of electrodes 85. The processing module 42 is executing an operating system 89 and one or more user applications 91 to produce frames of data 87. The processing module 42 provides the frames of data 87 to the display interface 93. The TSD 1810 operates similarly to the TSD 1410 of FIG. 14 with the above noted differences.

Figure 19:
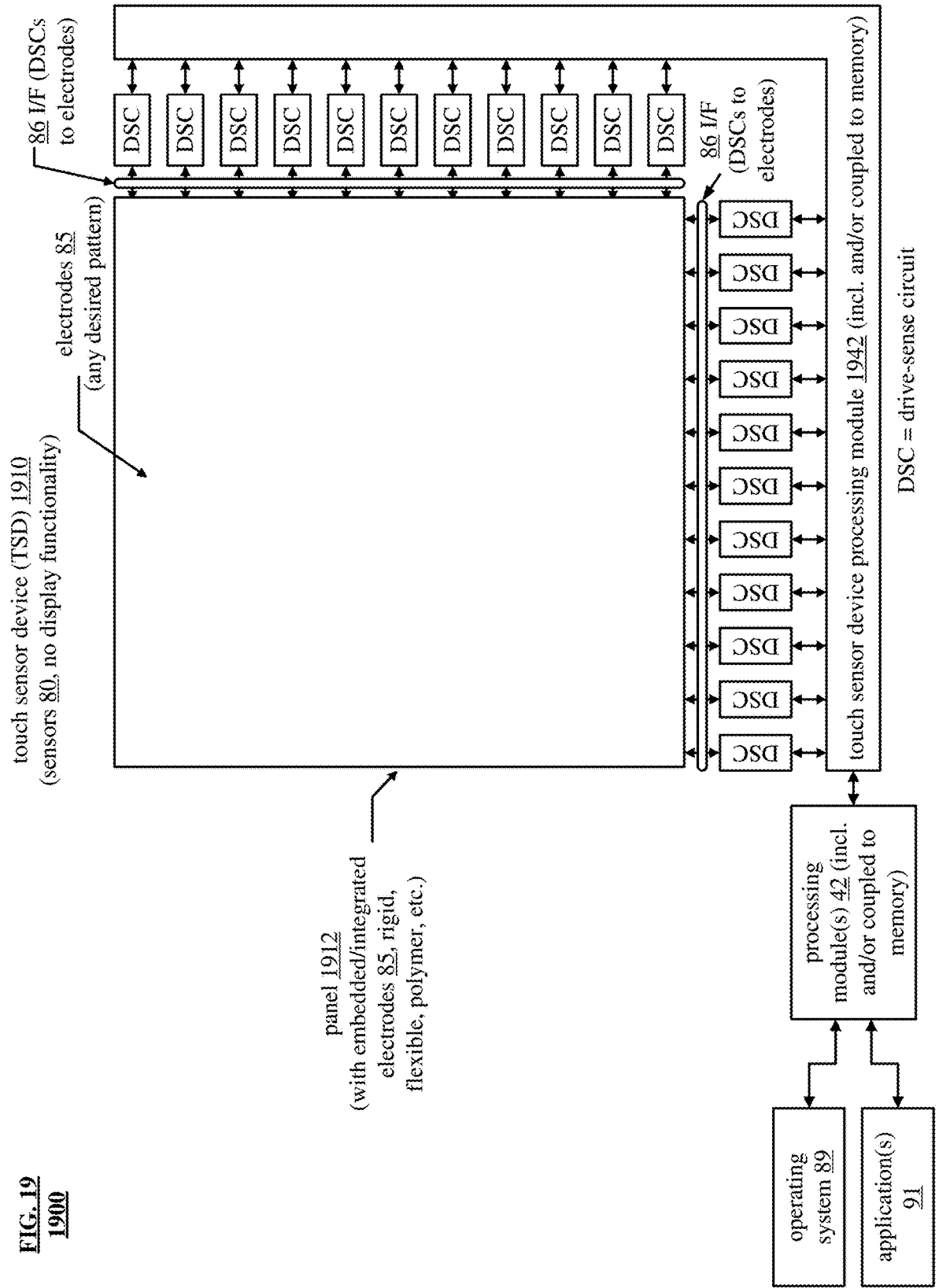
FIG. 19 is a schematic block diagram of an embodiment of a touch sensor device (TSD) in accordance with the present disclosure.

FIG. 19 is a schematic block diagram of an embodiment 1900 of a touch sensor device (TSD) in accordance with the present disclosure. Note that a touch sensor device may or may not include display functionality. For example, one example of a touch sensor device includes a touchscreen display (e.g., such as described with respect to FIG. 14 or FIG. 15). Alternatively, a touch sensor device may include touch sensor functionality without including display functionality. In this diagram, an alternative example of a touch sensor device, namely, touch sensor device 1910, includes sensor 80 but with no display functionality. Generally speaking, any reference to a touch sensor device herein may be used to refer to a touch sensor device that may or may not include display functionality (e.g., a touchscreen display or a touch sensor device such as touch sensor device 1910 that does not include display functionality). This diagram is similar to FIG. 17 with at least some differences being that this diagram includes a touch sensor device 1910 with sensors 80. The touch sensor device 1910 of this diagram includes a panel 1912 (e.g., that includes embedded/integrated electrodes 85) that facilitates touch sensor functionality. However, the touch sensor device 1910 of this diagram does not include display functionality and does not include a video graphics processing module 48 or a display interface 93 as does FIG. 17. In addition, the touchscreen processing module 82 of FIG. 14, which may include and/or be coupled to memory, is replaced in FIG. 19 by a touch sensor device processing module 1942, which may include and/or be coupled to memory.

The touch sensor device processing module 1942 operates similarly to the touchscreen processing module 82 of FIG. 17 with respect to touch related functionality yet with at least some differences being that the touch sensor device processing module 1942 does not particularly operate in accordance with display related functionality. For example, the touch sensor device 1910 includes a panel 1912, a plurality of sensors (e.g., shows as electrodes 85 in the diagram), a plurality of drive-sense circuits (DSCs), and the touch sensor device processing module 1942. The touch sensor device 1910 includes a plurality of sensors (e.g., electrodes 85, capacitor sensing cells, capacitor sensors, inductive sensor, etc.) to detect a proximal touch of the panel 1912. For example, when one or more fingers, styluses, other components, etc. touches the screen, capacitance of sensors proximal to the touch(es) are affected (e.g., impedance changes). The drive-sense circuits (DSC) coupled to the affected sensors detect the change and provide a representation of the change to the touch sensor device processing module 1942, which may be a separate processing module or integrated into the processing module 42.

The touch sensor device processing module 1942 processes the representative signals from the drive-sense circuits (DSC) to determine the location of the touch(es). This information is inputted to the processing module 42 for processing as an input. For example, a touch represents a selection of a location on the panel 1912, a motion on the panel 1912, a gesture of a user with respect to the panel 1912, etc.

In addition, with respect to this diagram and others herein, note that the panel 1912 may be implemented in a variety of ways including in a rigid format such as is made when such electrodes are implemented in a TSD that includes display functionality. However, when the panel 1912 that includes the electrodes 85, which may be implemented in any desired pattern, may alternatively be implementation using other non-rigid materials that are flexible and allow for adaptability to a variety of applications. Such materials may be polymer, flexible plastic, any other materials that facilitates capacitive coupling to the electrodes of the panel 1912 while also allowing flexibility of the panel 1912.

Figure 20:
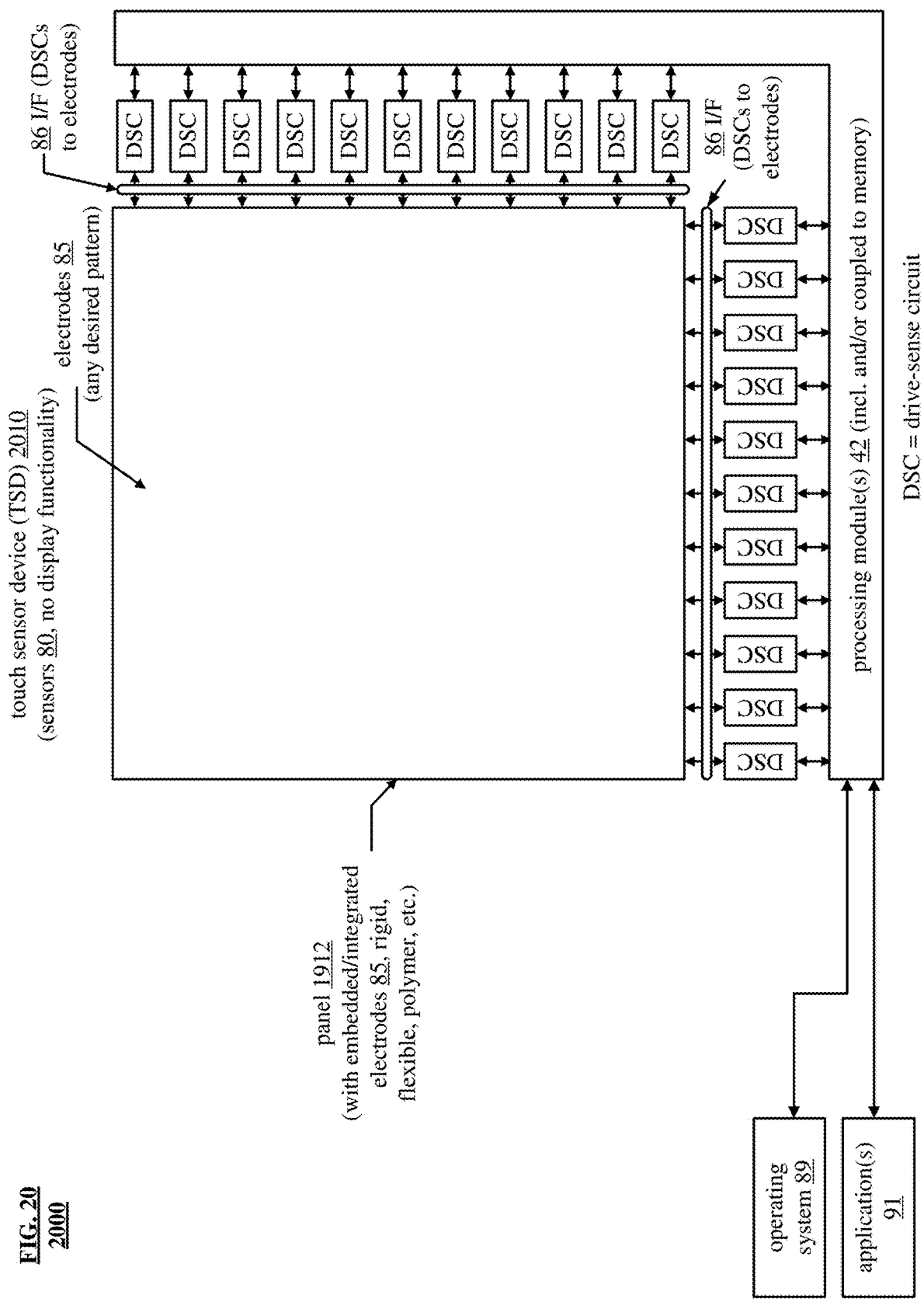
FIG. 20 is a schematic block diagram of another embodiment of a touch sensor device (TSD) in accordance with the present disclosure.

FIG. 20 is a schematic block diagram of another embodiment 2000 of a touch sensor device (TSD) in accordance with the present disclosure. This diagram has some similarities to prior diagrams including FIG. 19. In this diagram, the functionality from a touch sensor device processing module 1942, which may include or be coupled to memory, such as with respect to FIG. 19, is integrated into the processing module 42, which may include or be coupled to memory. The processing module 42 facilitates touch related functionality without specifically supporting display related functionality.

Note that while many of the examples of electrode alignment within a panel or touchscreen display show the electrodes as being aligned with respect to rows and columns, any other desired configuration of electrodes may alternatively be made. For example, electrodes may be arranged angularly such as a first set of electrodes are implemented as extending from upper left to lower right of the panel or touch screen display and a second set of electrodes are implemented as extending from upper right to lower left of the panel or touchscreen display. Generally speaking, any desired configuration and implementation of electrode arrangement within such a panel or touchscreen display, including any such pattern shown with respect to FIG. 16, may be implemented within any such device as described here including various aspects, embodiments, and/or examples of the disclosure (and/or their equivalents).

Figure 21:
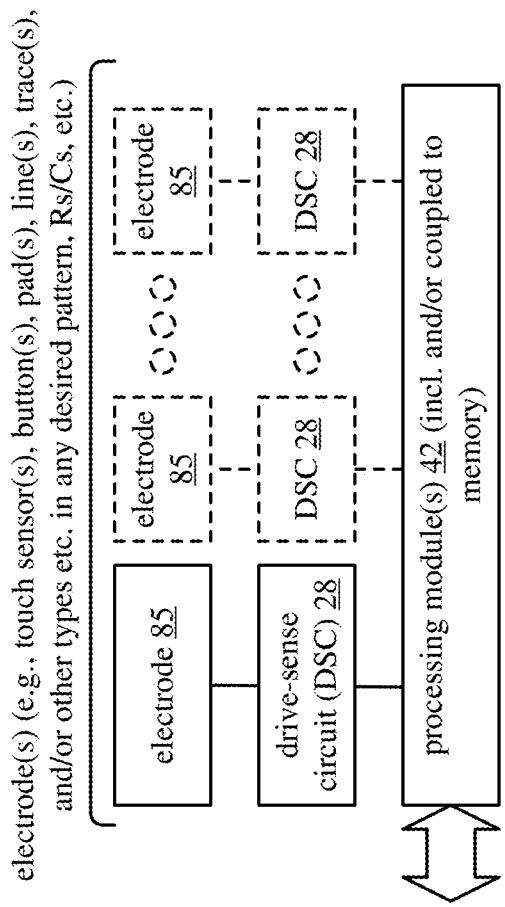
FIG. 21 is a schematic block diagram of another embodiment of a touch sensor device (TSD) in accordance with the present disclosure.

FIG. 21 is a schematic block diagram of another embodiment 2100 of a touch sensor device (TSD) in accordance with the present disclosure. The TSD includes one or more drive-sense circuits (DSCs) 28 and one or more electrodes 85 in accordance with the present disclosure. Within this diagram, as well as any other diagram described herein, or their equivalents, the one or electrodes 85 that are in communication with one or more DSC 28 (e.g., touch sensor electrodes such as may be implemented within a TSD configured to facilitate sensing of touch, proximity, gesture, etc.) may be of any of a variety of one or more types including any one or more of a touch sensor element (e.g., including one or more touch sensors with or without display functionality), a touchscreen including both touch sensor and display functionality, a button, an electrode, an external controller, one or more rows of electrodes, one or more columns of electrodes, a matrix of buttons, an array of buttons, a film that includes any desired implementation of components to facilitate touch sensor operation, and/or any other configuration by which interaction with the touch sensor may be performed.

Note that the one or more electrodes 85 may be implemented within any of a variety of devices including any one or more of a touchscreen, a pad device, a laptop, a cell phone, a smartphone, a whiteboard, an interactive display, a navigation system display, an in-vehicle display, a panel (e.g., implemented using rigid or flexible material), etc., and/or any other device in which one or more touch electrodes 85 may be implemented.

Note that such interaction of a user with an electrode 85 may correspond to the user touching the touch sensor, the user being in proximate distance to the touch sensor (e.g., within a sufficient proximity to the touch sensor that coupling from the user to the touch sensor may be performed via capacitively coupling (CC), etc. and/or generally any manner of interacting with the touch sensor that is detectable based on processing of signals transmitted to and/or sensed from the touch sensor including proximity detection, gesture detection, etc.). With respect to the various embodiments, implementations, etc. of various respective electrodes as described herein, note that they may also be of any such variety of one or more types. For example, electrodes may be implemented within any desired shape or style (e.g., lines, buttons, pads, etc.) or include any one or more of touch sensor electrodes, capacitive buttons, capacitive sensors, row and column implementations of touch sensor electrodes such as in a touchscreen, etc.

One example of such user interaction with the one or more electrodes 85 is via capacitive coupling between the user and the one or more electrodes 85. Such capacitive coupling (CC) may be achieved from a user, via a stylus, an active element such as an electronic pen (e-pen), and/or any other element such as an overlay, another TSD, etc. implemented to facilitate capacitive coupling between the user and the electrode 85. In some examples, note that the one or more electrodes 85 are also implemented to detect user interaction based on user touch (e.g., via capacitive coupling (CC) from a user, such as a user's finger, to the one or more electrodes 85).

Another example of such interaction with the one or more electrodes 85 is via capacitive coupling between a non-user element and the one or more electrodes 85. For example, consider a robotic arm, article of manufacture, etc. comes into proximity to the one or more electrodes 85, then capacitive coupling between the a robotic arm, article of manufacture, etc. may be detected via the one or more electrodes 85. Note that any example, embodiment, etc. described herein corresponding to user interaction with the TSD may analogously be performed based on interaction of any other object other than a user when interacting with the TSD.

At the bottom of this diagram, one or more processing modules 42 is coupled to drive-sense circuits (DSCs) 28. Note that the one or more processing modules 42 may include integrated memory and/or be coupled to other memory. At least some of the memory stores operational instructions to be executed by the one or more processing modules 42.

FIG. 22 is a schematic block diagram of another embodiment 2200 of multiple touch sensor devices (TSDs) in accordance with the present disclosure. At the bottom of this diagram, a first TSD/$1^{st}$ device includes one or more processing modules 42 includes a first subset of the one or more processing modules 42 that are in communication and operative with a first subset of the one or more DSCs 28 (e.g., those in communication with one or more row and/or column electrodes of the first TSD/$1^{st}$ device) and a second TSD/$2^{nd}$ device includes a second subset of the one or more processing modules 42 that are in communication and operative with a second subset of the one or more DSCs 28 (e.g., those in communication with one or more row and/or column electrodes of the second TSD/$2^{nd}$ device).

In even other examples, the one or more processing modules 42 shown in the first TSD/$1^{st}$ device or the second TSD/$2^{nd}$ device includes a first subset of the one or more processing modules 42 that are in communication and operative with a first subset of the one or more DSCs 28 (e.g., those in communication with one or more row and/or column electrodes of a TSD) and a second subset of the one or more processing modules 42 that are in communication and operative with a second subset of the one or more DSCs 28 (e.g., those in communication with electrodes of an e-pen or some other TSD).

In some examples, the first subset of the one or more processing modules 42, a first subset of one or more DSCs 28, and a first subset of one or more electrodes 85 are implemented within or associated with a first TSD/$1^{st}$ device, and the second subset of the one or more processing modules 42, a second subset of one or more DSCs 28, and a second subset of one or more electrodes 85 are implemented within or associated with a second TSD/$2^{nd}$ device. The different respective devices (e.g., first and second) may be similar type devices or different devices. For example, they may both be devices that include touch sensors (e.g., without display functionality). For example, they may both be devices that include touchscreens (e.g., with display functionality). For example, the first TSD/$1^{st}$ device may be a device that include touch sensors (e.g., with or without display functionality), and the second TSD/$2^{nd}$ device is an e-pen device.

In an example of operation and implementation, with respect to the first subset of the one or more processing modules 42 that are in communication and operative with a first subset of one or more DSCs 28, a signal #1 is coupled from a first electrode 85 that is in communication to a first DSC 28 of the first subset of one or more DSCs 28 that is in communication and operative with the first subset of the one or more processing modules 42 to a second electrode 85 that is in communication to a first DSC 28 of the second subset of one or more DSCs 28 that is in communication and operative with the second subset of the one or more processing modules 42.

When more than one DSC 28 is included within the first subset of one or more DSCs 28, the signal #1 may also be coupled from the first electrode 85 that is in communication to a first DSC 28 of the first subset of one or more DSCs 28 that is in communication and operative with the first subset of the one or more processing modules 42 to a third electrode 85 that is in communication to a second DSC 28 of the second subset of one or more DSCs 28 that is in communication and operative with the second subset of the one or more processing modules 42.

Generally speaking, signals may be coupled between one or more electrodes 85 that are in communication and operative with the first subset of the one or more DSCs 28 associated with the first subset of the one or more processing modules 42 and the one or more electrodes 85 that are in communication and operative with the second subset of the one or more DSCs 28 (e.g., signal #1, signal #2). In certain examples, such signals are coupled from one electrode 85 (e.g., such as associated with the first TSD/$1^{st}$ device) to one or more other electrodes 85 (e.g., such as associated with the second TSD/$2^{nd}$ device).

In some examples, these two different subsets of the one or more processing modules 42 are also in communication with one another (e.g., via communication effectuated via capacitive coupling between a first subset of electrodes 85 serviced by the first subset of the one or more processing modules 42 and a second subset of electrodes 85 serviced by the first subset of the one or more processing modules 42, via one or more alternative communication means such as a backplane, a bus, a wireless communication path, etc., and/or other means). In some particular examples, these two different subsets of the one or more processing modules 42 are not in communication with one another directly other than via the signal coupling between the one or more electrodes 85 themselves.

A first group of one or more DSCs 28 is/are implemented simultaneously to drive and to sense respective one or more signals provided to a first of the one or more electrodes 85. In addition, a second group of one or more DSCs 28 is/are implemented simultaneously to drive and to sense respective one or more other signals provided to a second of the one or more electrodes 85.

For example, a first DSC 28 is implemented simultaneously to drive and to sense a first signal via a first sensor electrode 85. A second DSC 28 is implemented simultaneously to drive and to sense a second signal via a second sensor electrode 85. Note that any number of additional DSCs implemented simultaneously to drive and to sense additional signals to additional electrodes 85 as may be appropriate in certain embodiments. Note also that the respective DSCs 28 may be implemented in a variety of ways. For example, they may be implemented within a device that includes the one or more electrodes 85, they may be implemented within a TSD such as a touchscreen that includes display functionality, they may be distributed among a TSD that includes the one or more electrodes 85 that does not include display functionality, etc.

In this diagram as well as any other diagram herein, note that the different respective signals that are driven and simultaneously sensed via the electrodes 85 may be differentiated from one another. For example, appropriate filtering and processing can identify the various signals given their differentiation, orthogonality to one another, difference in frequency, etc. Note that the differentiation among the different respective signals that are driven and simultaneously sensed by the various DSCs 28 may be differentiated based on any one or more characteristics such as frequency, amplitude, modulation, modulation & coding set/rate (MCS), forward error correction (FEC) and/or error checking and correction (ECC), type, etc.

Other examples described herein and their equivalents operate using any of a number of different characteristics other than or in addition to frequency. Differentiation between the signals based on frequency corresponds to a first signal has a first frequency and a second signal has a second frequency different than the first frequency. Differentiation between the signals based on amplitude corresponds to a that if first signal has a first amplitude and a second signal has a second amplitude different than the first amplitude. Note that the amplitude may be a fixed amplitude for a DC signal or the oscillating amplitude component for a signal having both a DC offset and an oscillating component. Differentiation between the signals based on DC offset corresponds to a that if first signal has a first DC offset and a second signal has a second DC offset different than the first DC offset.

Differentiation between the signals based on modulation and/or modulation & coding set/rate (MCS) corresponds to a first signal has a first modulation and/or MCS and a second signal has a second modulation and/or MCS different than the first modulation and/or MCS. Examples of modulation and/or MCS may include binary phase shift keying (BPSK), quadrature phase shift keying (QPSK) or quadrature amplitude modulation (QAM), 8-phase shift keying (PSK), 16 quadrature amplitude modulation (QAM), 32 amplitude and phase shift keying (APSK), 64-QAM, etc., uncoded modulation, and/or any other desired types of modulation including higher ordered modulations that may include even greater number of constellation points (e.g., 1024 QAM, etc.). For example, a first signal may be of a QAM modulation, and the second signal may be of a 32 APSK modulation. In an alternative example, a first signal may be of a first QAM modulation such that the constellation points there and have a first labeling/mapping, and the second signal may be of a second QAM modulation such that the constellation points there and have a second labeling/mapping.

Differentiation between the signals based on FEC/ECC corresponds to a first signal being generated, coded, and/or based on a first FEC/ECC and a second signal being generated, coded, and/or based on a second FEC/ECC that is different than the first modulation and/or first FEC/ECC. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. For example, a first signal may be generated, coded, and/or based on a first LDPC code, and the second signal may be generated, coded, and/or based on a second LDPC code. In an alternative example, a first signal may be generated, coded, and/or based on a BCH code, and the second signal may be generated, coded, and/or based on a turbo code. Differentiation between the different respective signals may be made based on a similar type of FEC/ECC, using different characteristics of the FEC/ECC (e.g., codeword length, redundancy, matrix size, etc. as may be appropriate with respect to the particular type of FEC/ECC). Alternatively, differentiation between the different respective signals may be made based on using different types of FEC/ECC for the different respective signals.

Differentiation between the signals based on type corresponds to a first signal being or a first type and a second signal being of a second type that is different than the first type. Examples of different types of signals include a sinusoidal signal, a square wave signal, a triangular wave signal, a multiple level signal, a polygonal signal, a DC signal, etc. For example, a first signal may be of a sinusoidal signal type, and the second signal may be of a DC signal type. In an alternative example, a first signal may be of a first sinusoidal signal type having first sinusoidal characteristics (e.g., first frequency, first amplitude, first DC offset, first phase, etc.), and the second signal may be of second sinusoidal signal type having second sinusoidal characteristics (e.g., second frequency, second amplitude, second DC offset, second phase, etc.) that is different than the first sinusoidal signal type.

Note that any implementation that differentiates the signals based on one or more characteristics may be used in this and other embodiments, examples, and their equivalents.

Figure 23A:
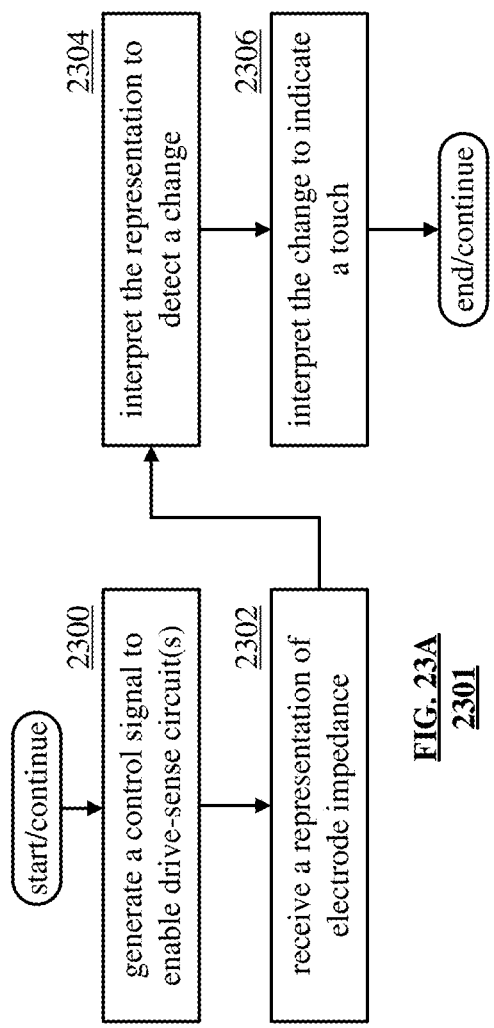
FIG. 23A is a logic diagram of an embodiment of a method for sensing a touch on a touch sensor device (TSD)(with or without display functionality) in accordance with the present disclosure.

FIG. 23A is a logic diagram of an embodiment of a method for sensing a touch on a touch sensor device (TSD)(with or without display functionality) in accordance with the present disclosure. This diagram includes a logic diagram of an embodiment of a method 2301 for execution by one or more computing devices for sensing a touch on a TSD that is executed by one or more processing modules of one or various types (e.g., 42, 82, 1942 and/or 48 of other FIGS. included herein). The method 2301 begins at step 2300 where the processing module generate a control signal (e.g., power enable, operation enable, etc.) to enable a drive-sense circuit to monitor the sensor signal on the electrode. The processing module generates additional control signals to enable other drive-sense circuits to monitor their respective sensor signals. In an example, the processing module enables all of the drive-sense circuits for continuous sensing for touches of the screen. In another example, the processing module enables a first group of drive-sense circuits coupled to a first group of row electrodes and enables a second group of drive-sense circuits coupled to a second group of column electrodes.

The method 2301 continues at step 2302 where the processing module receives a representation of the impedance on the electrode from a drive-sense circuit. In general, the drive-sense circuit provides a drive signal to the electrode. The impedance of the electrode affects the drive signal. The effect on the drive signal is interpreted by the drive-sense circuit to produce the representation of the impedance of the electrode. The processing module does this with each activated drive-sense circuit in serial, in parallel, or in a serial-parallel manner.

The method 2301 continues at step 2304 where the processing module interprets the representation of the impedance on the electrode to detect a change in the impedance of the electrode. A change in the impedance is indicative of a touch. For example, an increase in self-capacitance (e.g., the capacitance of the electrode with respect to a reference (e.g., ground, etc.)) is indicative of a touch on the electrode of a user or other element. As another example, a decrease in mutual capacitance (e.g., the capacitance between a row electrode and a column electrode) is also indicative of a touch and/or presence of a user or other element near the electrodes. The processing module does this for each representation of the impedance of the electrode it receives. Note that the representation of the impedance is a digital value, an analog signal, an impedance value, and/or any other analog or digital way of representing a sensor's impedance.

The method 2301 continues at step 2306 where the processing module interprets the change in the impedance to indicate a touch and/or presence of a user or other element of the TSD in an area corresponding to the electrode. For each change in impedance detected, the processing module indicates a touch and/or presence of a user or other element. Further processing may be done to determine if the touch is a desired touch or an undesired touch.

Figure 23B:
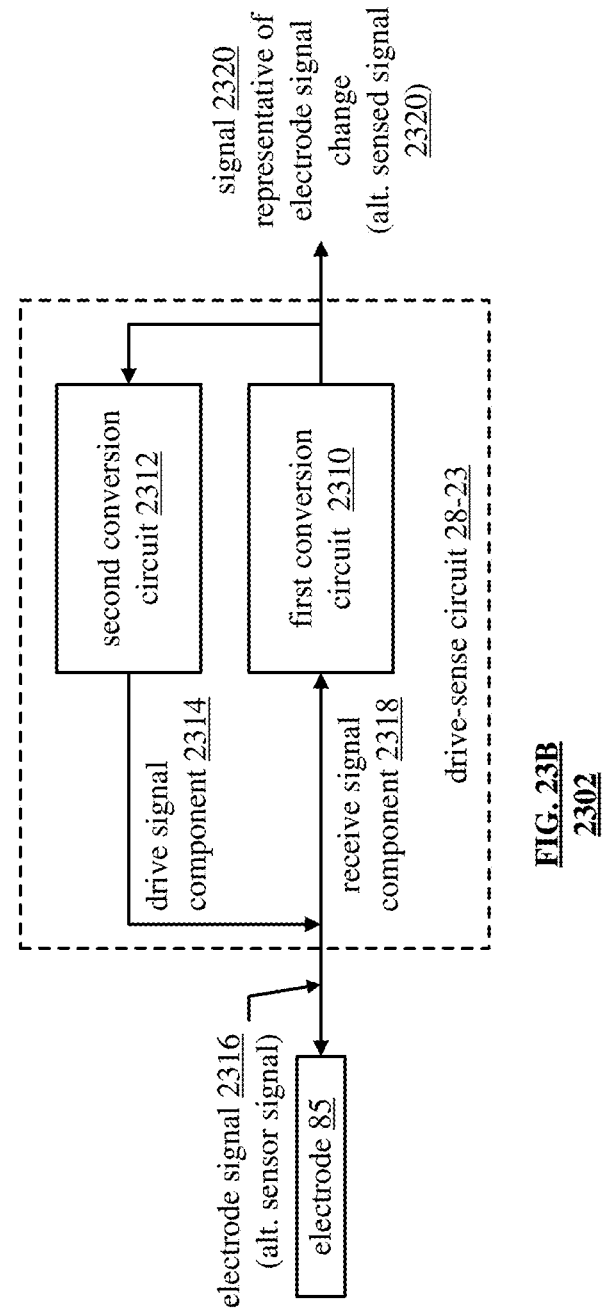
FIG. 23B is a schematic block diagram of an embodiment of a drive sense circuit in accordance with the present disclosure.

FIG. 23B is a schematic block diagram of an embodiment 2302 of a drive sense circuit in accordance with the present disclosure. this diagram includes a schematic block diagram of an embodiment of a drive sense circuit 28-18 that includes a first conversion circuit 2310 and a second conversion circuit 2312. The first conversion circuit 2310 converts an electrode signal 2316 (alternatively a sensor signal, such as when the electrode 85 includes a sensor, etc.) into a signal 2320 that is representative of the electrode signal and/or change thereof (e.g., note that such a signal may alternatively be referred to as a sensor signal, a signal representative of a sensor signal and/or change thereof, etc. such as when the electrode 85 includes a sensor, etc.). The second conversion circuit 2312 generates the drive signal component 2314 from the sensed signal 2312. As an example, the first conversion circuit 2310 functions to keep the electrode signal 2316 substantially constant (e.g., substantially matching a reference signal) by creating the signal 2320 to correspond to changes in a receive signal component 2318 of the sensor signal. The second conversion circuit 2312 functions to generate a drive signal component 2314 of the sensor signal based on the signal 2320 substantially to compensate for changes in the receive signal component 2318 such that the electrode signal 2316 remains substantially constant.

In an example, the electrode signal 2316 (e.g., which may be viewed as a power signal, a drive signal, a sensor signal, etc. such as in accordance with other examples, embodiments, diagrams, etc. herein) is provided to the electrode 85 as a regulated current signal. The regulated current (I) signal in combination with the impedance (Z) of the electrode creates an electrode voltage (V), where V=I*Z. As the impedance (Z) of electrode changes, the regulated current (I) signal is adjusted to keep the electrode voltage (V) substantially unchanged. To regulate the current signal, the first conversion circuit 2310 adjusts the signal 2320 based on the receive signal component 2318, which is indicative of the impedance of the electrode and change thereof. The second conversion circuit 2312 adjusts the regulated current based on the changes to the signal 2320.

As another example, the electrode signal 2316 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 2310 adjusts the signal 2320 based on the receive signal component 2318, which is indicative of the impedance of the electrode and change thereof. The second conversion circuit 2312 adjusts the regulated voltage based on the changes to the signal 2320.

Figure 24:
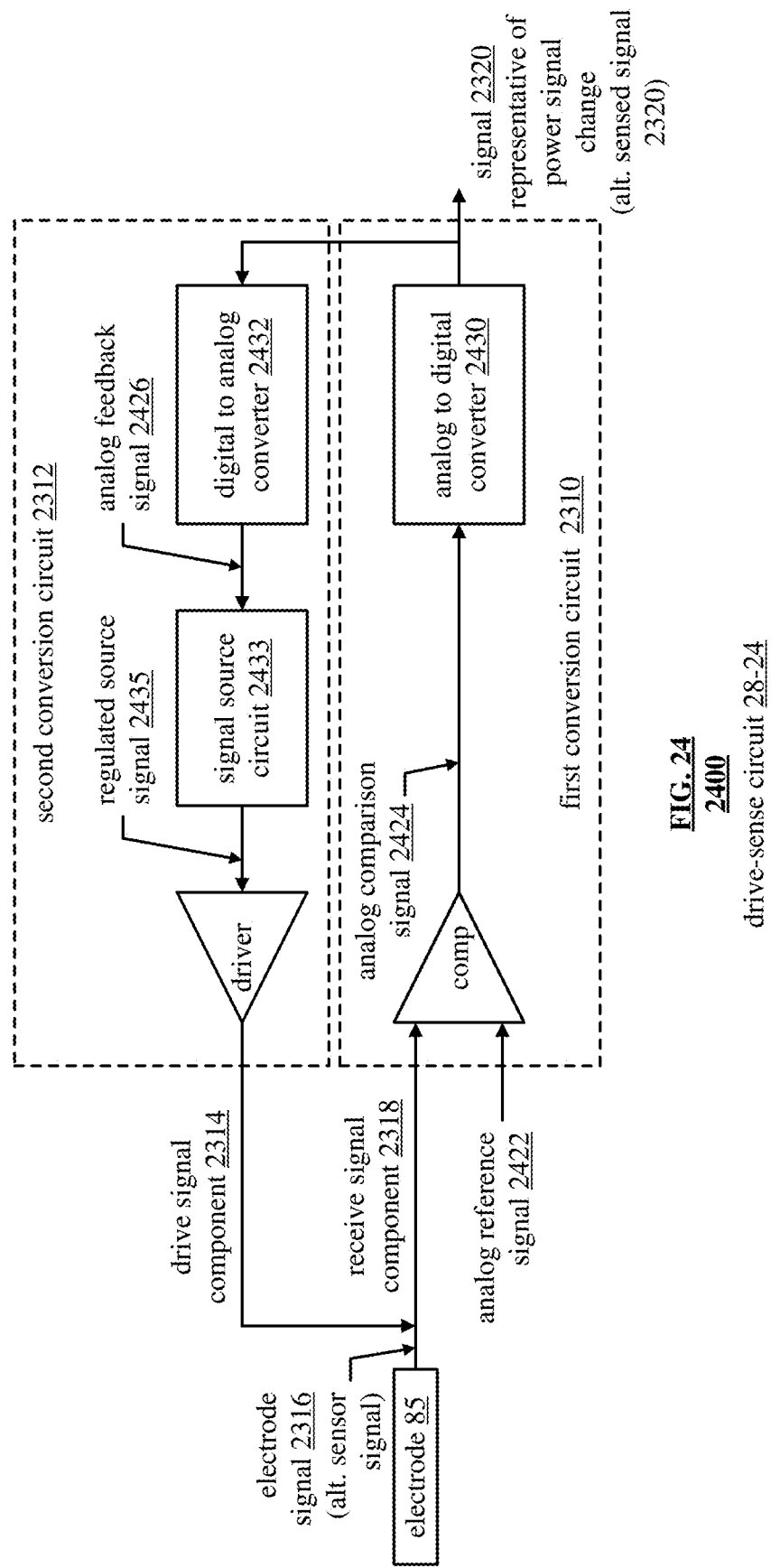
FIG. 24 is a schematic block diagram of another embodiment of a drive sense circuit in accordance with the present disclosure.

FIG. 24 is a schematic block diagram of another embodiment 2400 of a drive sense circuit in accordance with the present disclosure. this diagram includes a schematic block diagram of another embodiment of a drive sense circuit 28 that includes a first conversion circuit 2310 and a second conversion circuit 2312. The first conversion circuit 2310 includes a comparator (comp) and an analog to digital converter 2430. The second conversion circuit 2312 includes a digital to analog converter 2432, a signal source circuit 2433, and a driver.

In an example of operation, the comparator compares the electrode signal 2316 (alternatively, a sensor signal, etc.) to an analog reference signal 2422 to produce an analog comparison signal 2424. The analog reference signal 2424 includes a DC component and/or an oscillating component. As such, the electrode signal 2316 will have a substantially matching DC component and/or oscillating component. An example of an analog reference signal 2422 is also described in greater detail with reference to FIG. 7 such as with respect to a power signal graph.

The analog to digital converter 2430 converts the analog comparison signal 2424 into the signal 2320. The analog to digital converter (ADC) 2430 may be implemented in a variety of ways. For example, the (ADC) 2430 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 2432 may be a sigma-delta DAC, a pulse width modulator DAC, a binary weighted DAC, a successive approximation DAC, and/or a thermometer-coded DAC.

The digital to analog converter (DAC) 2432 converts the signal 2320 into an analog feedback signal 2426. The signal source circuit 2433 (e.g., a dependent current source, a linear regulator, a DC-DC power supply, etc.) generates a regulated source signal 2435 (e.g., a regulated current signal or a regulated voltage signal) based on the analog feedback signal 2426. The driver increases power of the regulated source signal 2435 to produce the drive signal component 2314.

Figure 25:
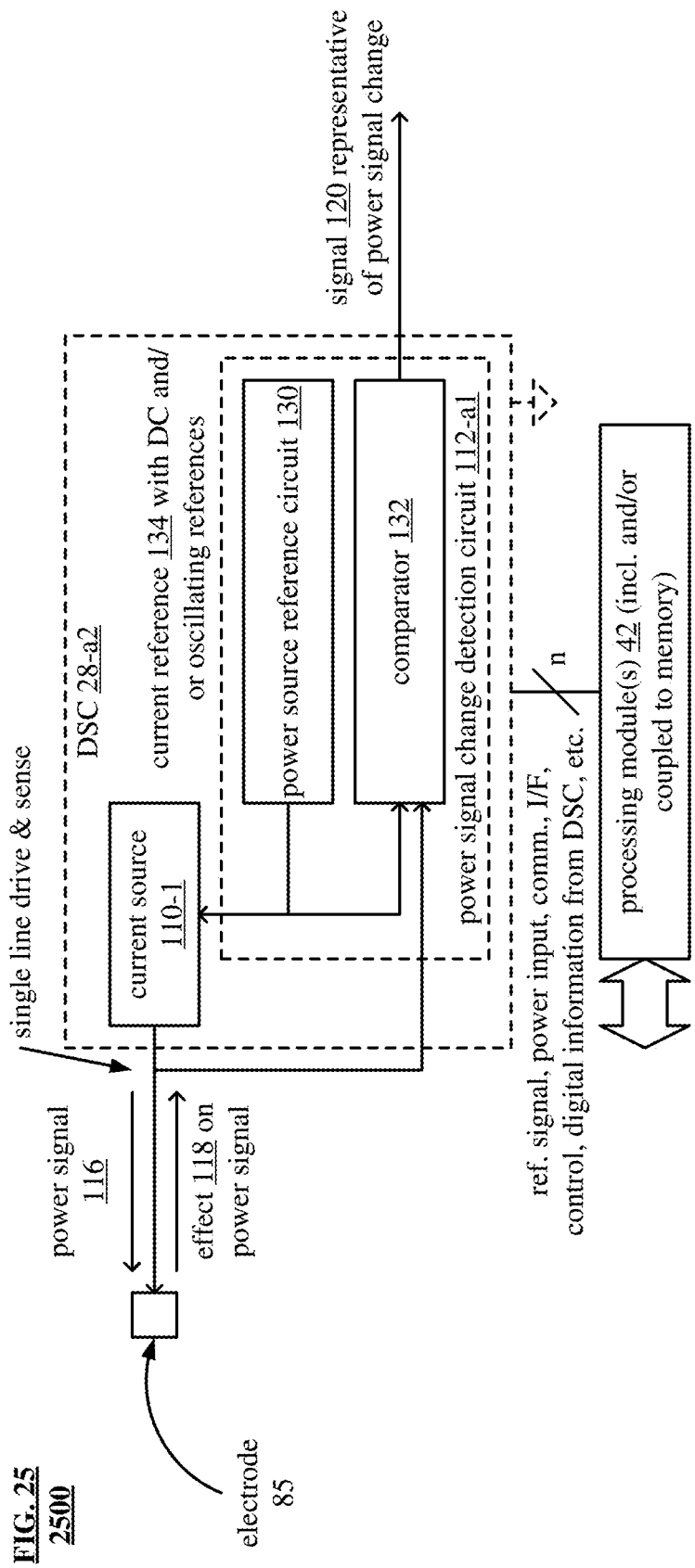
FIG. 25 is a schematic block diagram of an embodiment of a DSC that is interactive with an electrode in accordance with the present disclosure.

FIG. 25 is a schematic block diagram of an embodiment 2500 of a DSC that is interactive with an electrode in accordance with the present disclosure. Similar to other diagrams, examples, embodiments, etc. herein, the DSC 28-a2 of this diagram is in communication with one or more processing modules 42. The DSC 28-a2 is configured to provide a signal (e.g., a power signal, an electrode signal, transmit signal, a monitoring signal, etc.) to the electrode 85 via a single line and simultaneously to sense that signal via the single line. In some examples, sensing the signal includes detection of an electrical characteristic of the electrode that is based on a response of the electrode 85 to that signal. Examples of such an electrical characteristic may include detection of an impedance of the electrode 85 such as a change of capacitance of the electrode 85, detection of one or more signals coupled into the electrode 85 such as from one or more other electrodes, and/or other electrical characteristics.

This embodiment of a DSC 28-a2 includes a current source 110-1 and a power signal change detection circuit 112-a1. The power signal change detection circuit 112-a1 includes a power source reference circuit 130 and a comparator 132. The current source 110-1 may be an independent current source, a dependent current source, a current mirror circuit, etc.

In an example of operation, the power source reference circuit 130 provides a current reference 134 with DC and oscillating components to the current source 110-1. The current source generates a current as the power signal 116 based on the current reference 134. An electrical characteristic of the electrode 85 has an effect on the current power signal 116. For example, if the impedance of the electrode 85 decreases and the current power signal 116 remains substantially unchanged, the voltage across the electrode 85 is decreased.

The comparator 132 compares the current reference 134 with the affected power signal 118 to produce the signal 120 that is representative of the change to the power signal. For example, the current reference signal 134 corresponds to a given current (I) times a given impedance (Z). The current reference generates the power signal to produce the given current (I). If the impedance of the electrode 85 substantially matches the given impedance (Z), then the comparator's output is reflective of the impedances substantially matching. If the impedance of the electrode 85 is greater than the given impedance (Z), then the comparator's output is indicative of how much greater the impedance of the electrode 85 is than that of the given impedance (Z). If the impedance of the electrode 85 is less than the given impedance (Z), then the comparator's output is indicative of how much less the impedance of the electrode 85 is than that of the given impedance (Z).

Figure 26:
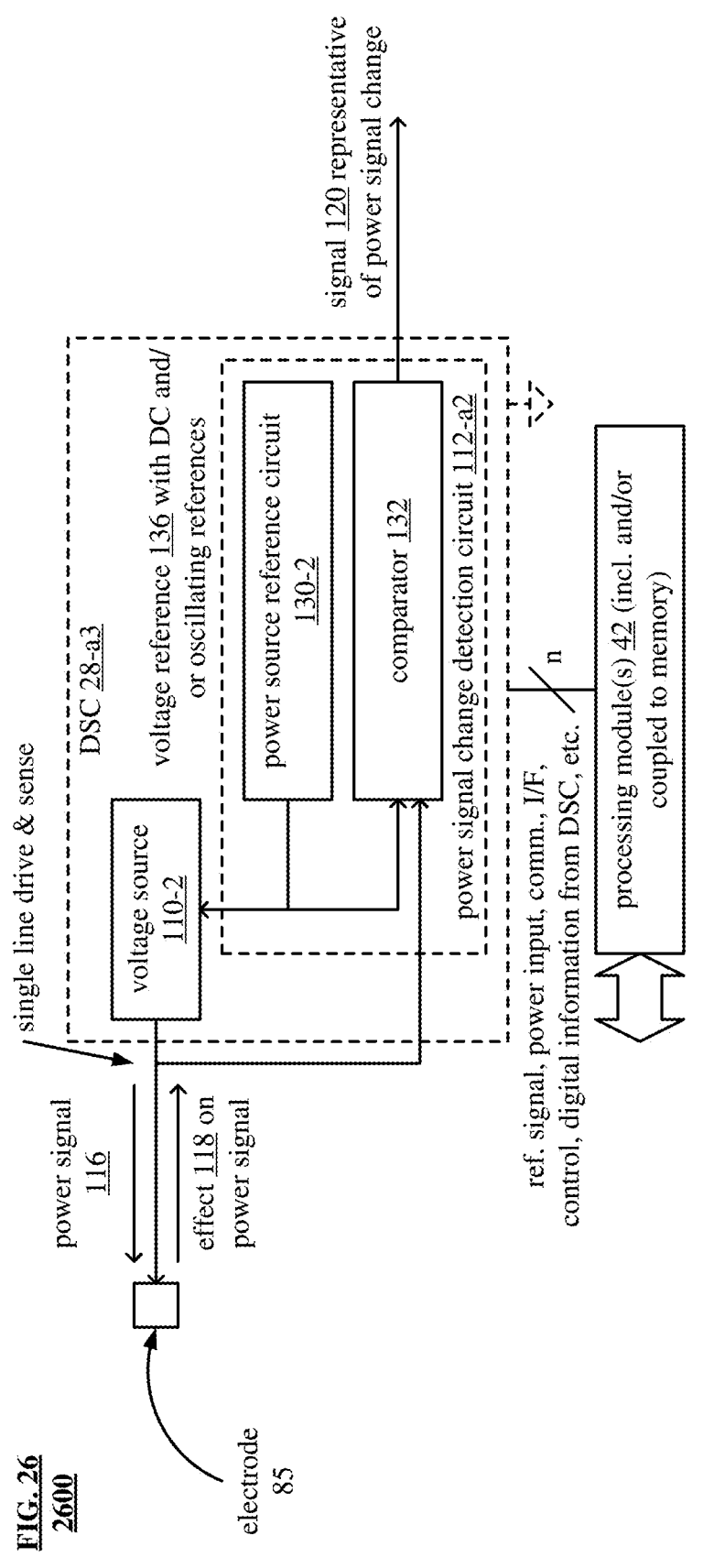

FIG. 26 is a schematic block diagram of another embodiment 2600 of a DSC that is interactive with an electrode in accordance with the present disclosure. Similar to other diagrams, examples, embodiments, etc. herein, the DSC 28-a3 of this diagram is in communication with one or more processing modules 42. Similar to the previous diagram, although providing a different embodiment of the DSC, the DSC 28-a3 is configured to provide a signal to the electrode 85 via a single line and simultaneously to sense that signal via the single line. In some examples, sensing the signal includes detection of an electrical characteristic of the electrode 85 that is based on a response of the electrode 85 to that signal. Examples of such an electrical characteristic may include detection of an impedance of the electrode 85 such as a change of capacitance of the electrode 85, detection of one or more signals coupled into the electrode 85 such as from one or more other electrodes, and/or other electrical characteristics.

This embodiment of a DSC 28-a3 includes a voltage source 110-2 and a power signal change detection circuit 112-a2. The power signal change detection circuit 112-a2 includes a power source reference circuit 130-2 and a comparator 132-2. The voltage source 110-2 may be a battery, a linear regulator, a DC-DC converter, etc.

In an example of operation, the power source reference circuit 130-2 provides a voltage reference 136 with DC and oscillating components to the voltage source 110-2. The voltage source generates a voltage as the power signal 116 based on the voltage reference 136. An electrical characteristic of the electrode 85 has an effect on the voltage power signal 116. For example, if the impedance of the electrode 85 decreases and the voltage power signal 116 remains substantially unchanged, the current through the electrode 85 is increased.

The comparator 132 compares the voltage reference 136 with the affected power signal 118 to produce the signal 120 that is representative of the change to the power signal. For example, the voltage reference signal 134 corresponds to a given voltage (V) divided by a given impedance (Z). The voltage reference generates the power signal to produce the given voltage (V). If the impedance of the electrode 85 substantially matches the given impedance (Z), then the comparator's output is reflective of the impedances substantially matching. If the impedance of the electrode 85 is greater than the given impedance (Z), then the comparator's output is indicative of how much greater the impedance of the electrode 85 is than that of the given impedance (Z). If the impedance of the electrode 85 is less than the given impedance (Z), then the comparator's output is indicative of how much less the impedance of the electrode 85 is than that of the given impedance (Z).

With respect to many of the following diagrams, one or more processing modules 42, which includes and/or is coupled to memory, is configured to communicate and interact with one or more DSCs 28 the coupled to one or more electrodes of the panel or a touchscreen display such as may be implemented within a touch sensor device (TSD) (with or without display functionality). In many of the diagrams, the DSCs 28 are shown as interfacing with electrodes of the panel or touchscreen display (e.g., via interface 86 that couples to row electrodes and another interface 86 that couples to column electrodes). Note that the number of lines that coupled the one or more processing modules 42 to the respective one or more DSCs 28, and from the one or more DSCs 28 to the respective interfaces 86 may be varied (e.g., such as may be described by n and m, which are positive integers greater than or equal to 1). Note that the respective values may be the same or different within different respective embodiments and/or examples herein.

Note that the same and/or different respective signals may be driven simultaneously sensed by the respective one or more DSCs 28 that couple to electrodes 85 within any of the various embodiments and/or examples herein. In some examples, a common signal (e.g., having common one or more characteristics) is implemented in accordance with self signaling, and different respective signals (e.g., different respective signals having one or more different characteristics) are implemented in accordance with mutual signaling as described below. Again, as mentioned above, note that the different respective signals that are driven and simultaneously sensed via the electrodes 85 may be differentiated from one another.

The present disclosure includes various examples, embodiments, implementations, etc. by which digital data communications are performed with a touch sensor device (TSD)(with or without display functionality). Note that such a TSD may or may not include display functionality. In addition, note that such a TSD may be implemented in any of a number of desired ways. For example, consider the embodiments of FIG. 21 and FIG. 22. Note that such a device that includes one or more processing modules and one or more DSCs that respectively service one or more electrodes may be implemented in a variety of ways. Such functionality may be included within a touchscreen, a TSD that does include display functionality, a TSD that does not include display functionality, a computing device, a desktop computer, a laptop computer, handheld device such as a pad device, a touch pad device, a cellular phone, smart phone, television, etc. Note also that such functionality may be included within any of a variety of components of a house or building such as a wall, a door, countertop, a metal plate, etc. In addition, note that such functionality may be included within any variety of components of a vehicle, such as within a steering wheel, a touchscreen within the vehicle, navigation system, and armrest, etc. Generally speaking, such functionality may be implemented within any of a variety of ways.

In addition, note that various aspects, embodiments, and/or examples of the disclosure (and/or their equivalents) may be implemented within devices that do not specifically provide for touch sensing functionality. For example, a device may be implemented to facilitate the digital data communications described here in even when the device does not include touch sensing functionality. The principles of operation of transmission of one or more signals from a first device to a second device, such that the second device includes the functionality of one or more DSCs is effective to facilitate digital data communications.

The functionality of a DSC provides opportunities to perform digital data communications in a way that the prior art cannot. For example, by taking advantage of the high-speed data capture in the spread spectrum nature of the DSC sensing capability, the use of frequencies usually used to detect human touch or presence in the embedded with digital data in the form of multiple frequencies. These multiple frequencies are combined to generate a sum tones resultant that is detected and converted into digital information.

Generally speaking, note that the one or more signals transmitted from a first device to a second device to facilitate digital data communications may be generated in any number of ways. In some examples, one or more signal generators are implemented 2 generate one or more sinusoidal signals that are added together, and may optionally be amplitude scaled, to generate a sums tone resultant signal. Note that the sums tone resultant signal may be transmitted from the first device in any of a number of ways. Examples may include using an antenna of the first device and/or using already existent and implemented hardware within the first device such as any one or more of an electrode, wire, metal fixture, metal housing, etc. Note also that sum tones resulted signal may be received by the second device may be received the second device in any of a number of ways. Examples may include using antenna of the second device and/or using already existent and implemented hardware within the second device such as any one or more of an electrode, wire, metal fixture, metal housing, etc. Considering the particular a particular implementation of the second device being a TSD, note that the already existent and implemented hardware of the TSD may be used to facilitate receiving of a signal that is transmitted from the first device to the second device. However, again, note that the principles described herein to effectuate digital data communications may be implemented using devices that do not necessarily include touch sensing functionality.

In an example, consider a TSD, which may or may not include display functionality, includes a number of row channels and a number of column channels. The respective row channels and column channels may be implemented using electrodes. When DSC technology is used within such a TSD, the TSD operates by sending out unique frequencies on each of the Transmit (TX) row channels simultaneously while the Receive (RX) column channels decode which cross-point on the TSD is being touch through mutual capacitance changes. The data associated with the TSD is decoded all at once verses a line-at-a-time format as is performed within the prior art.

At the same time The Mutual Capacitance is being read, each row (TX) and column (RX) are also decoding the Self capacitance of the cross-points touched.

Since the functionality and capabilities of such DSC technology is configured to look for unique frequencies in parallel, the conversion of digital data is translated into a set of pre-defined mixed frequencies, using either shared channels with the TSD or through extra channels, can decode, for example an 8-bit character in a single read of the TSD touch and shared digital data.

Digital data communications are facilitated by using different respective frequencies for the individual data. For example, consider any extra/spare channels that are not otherwise used for functionality within a TSD, then at least some of those extra/spare channels are provisioned with unique respective frequencies to facilitate data communication. In some examples, two respective unique frequencies are provisioned for two respective channels that both correspond to a digital bit. Consider a first channel and a second channel that correspond to a respective bit, and a first unique frequency is provisioned for a first channel of those two channels for a first value of the bit (e.g., logical 1), and a second unique frequency is provisioned for the second channel of those two channels for a second value of the bit (e.g., logical 0).

In other examples, only one respective unique frequency is provision for one respective channel that corresponds to a digital bit. Consider a channel that corresponds to the respective bit, and a unique frequency is implemented for a first value of the bit (e.g., logical 1). This implementation does not include a second channel having a second unique frequency that is implemented for a second value of the bit (e.g., logical 0). For example, a lack of presence of a signal on the channel is interpreted as a second value of the bit (e.g., logical 0).

Considering an example in which there are 10 extra/spare channels that may be used, these 10 extra/spare channels are provisioned for 5 bits. For example, consider a 5-bit value, then a first channel is provisioned for a first value (e.g., logical 1) of a first of the 5 bits (e.g., the most significant bit), and a second channel is provisioned for a second value (e.g., logical 0) of the first of the 5 bits (e.g., the most significant bit). Similarly, two respective channels are provisioned for each of the other respective bits of the 5-bit value. For example, a first other channel is provisioned for a first value (e.g., logical 1) of another of the 5 bits (e.g., the least significant bit), and a second other channel is provisioned for a second value (e.g., logical 0) of the other of the 5 bits (e.g., the least significant bit).

Figure 27A:
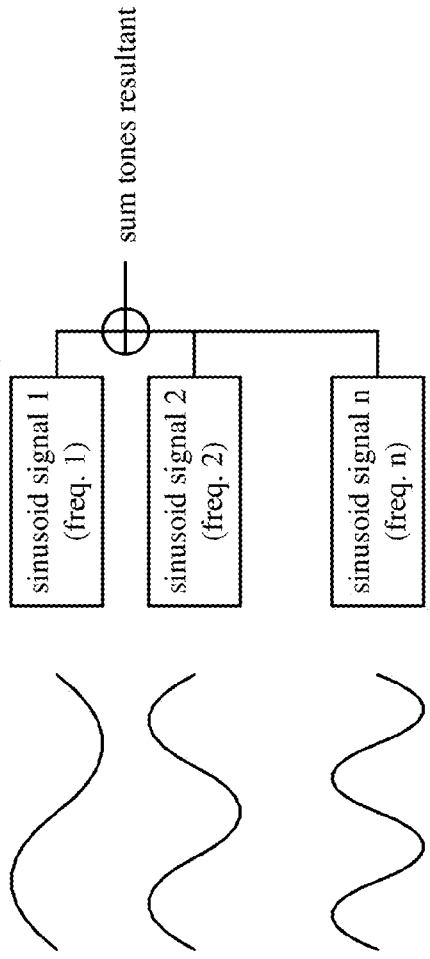
FIG. 27A is a schematic block diagram of an embodiment of generating a sum tones resultant in accordance with the present disclosure.

FIG. 27A is a schematic block diagram of an embodiment 2701 of generating a sum tones resultant in accordance with the present disclosure. In this diagram, different respective sinusoidal signals having different respective frequencies may be combined to generate a sum tones resultant. For example, consider a sinusoidal signal 1 having a first unique frequency (e.g., frequency 1), a sinusoidal signal 2 having a second unique frequency (e.g., frequency 2), and up a sinusoidal signal n having an n-th unique frequency (e.g., frequency n), such that N is a positive integer greater than or equal to 3. Generally speaking, any number of respective sinusoidal signals having respective unique frequencies may be combined to generate a sum tones resultant. The one or more sinusoidal signals are added together. In some examples, the amplitude of the sum tones resultant is scaled to be below some threshold value. For example, consider a saturation point within a device, and the amplitude of the sum tones resultant is scaled to ensure the signal is not clipped, saturated, and otherwise distorted.

With the multi-bit frequency capabilities as presented within this disclosure, note that the one or more signals that operate as the source of the data could either be hovering above or be in contact with a touch sensor device (TSD) in accordance with facilitating digital data communications. In certain examples, note that the one or more signals that operate as the source of the data are transmitted to the TSD from an antenna of the TSD that is within sufficient proximity to the TSD as to effectuate coupling of the one or more signals from the source of the data to the TSD.

The basis of the digital data to frequencies is to take the individual bits of the character data being sent and converting to individual frequencies for each of the logic 1's and logic 0's, for each of the respective bits of the multi-bit value. The combination of different respective signals of different respective frequencies to generate a sum tones resultant operates to generate a multi-bit value.

Figure 27B:
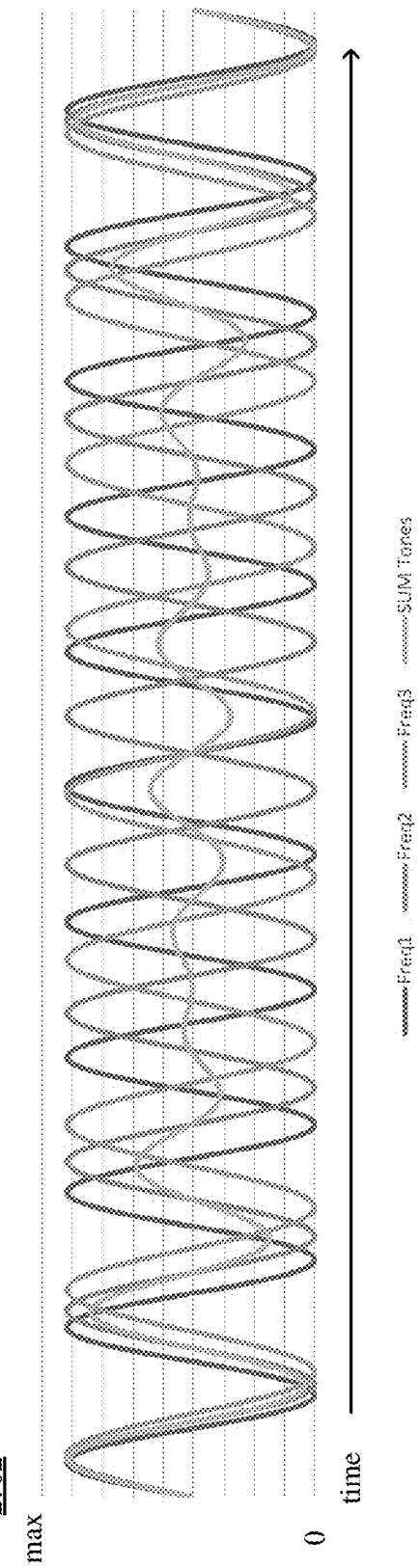
FIG. 27B is a schematic block diagram of an embodiment of a sum tones resultant in accordance with the present disclosure.

FIG. 27B is a schematic block diagram of an embodiment 2702 of a sum tones resultant in accordance with the present disclosure. This diagram shows three pure frequencies added together and amplitude scaled to generate a sum tones resultant. As can be seen, each of the three pure frequencies is unique, and when they are added together and amplitude scaled, the sum tones resultant signal is generated. Note that the combination of the three pure frequencies is performed to generate the sum tones resultant, and it is the sum tones resultant that is transmitted to facilitate digital data communication of the multi-bit value.

Note that various diagrams included within the present disclosure include color. Color is included within various diagrams to assist in the description of the subject matter disclosed herein. For example, in this diagram, a first frequency is depicted using the color blue, a second frequency is depicted using the color orange, and a third frequency is depicted using the color gray. The SUM Tones resultant that is generated based on the three respective signals, shown by the colors blue, orange, and gray, respectively, it is shown in yellow.

As an example, consider a 3-bit value, then the device would be implemented to use 6 unique sine wave frequencies, which can be decoded by a DSC. In an example of operation and implementation, such as when using an external microprocessor (e.g., 32 bit ARM Cortex-M4, with 12-bit DAC output pin for Sinewave), there would be 6 lookup tables with the x-bit data to create each of the pure tone frequencies. By replacing each of the 3-bits with 6 different frequencies, representing each of the Logic 1's and Logic 0's, there would always be 3 frequencies added together that form the sum tones resultant of the 3 frequencies. The sum of the tones would then be the sum of 3 Pure Sine Wave Frequencies. In certain examples, the sum of the tones is also amplitude scaled to form the sum tones resultant. By using two respective unique frequencies, such as a first unique frequency that is provisioned for the first value of the bit (e.g., logical 1), and a second unique frequency that is provisioned a second value of the bit (e.g., logical 0), this approach ensures that all the bits are present before the data is decoded.

The following two diagrams show examples of encoding of data into frequencies.

The basis of the associating the digital data to frequencies is to take the individual bits of the character data being sent and converting to individual frequencies for each of the logic 1's and logic 0's, for each of the respective bits of the multi-bit value. In certain examples, since multiple frequencies would be added together, it is desirable to perform amplitude scaling to limit the frequency amplitude to the limits of the DSC. For example, to ensure no clipping or saturation of the device, amplitude scaling is performed when generating the sum tones resultant. Considering a specific example, with a 12-Bit output DAC (3.3 vdc p-p), the amplitude is scaled so as to be less than 4096

Figure 28A:
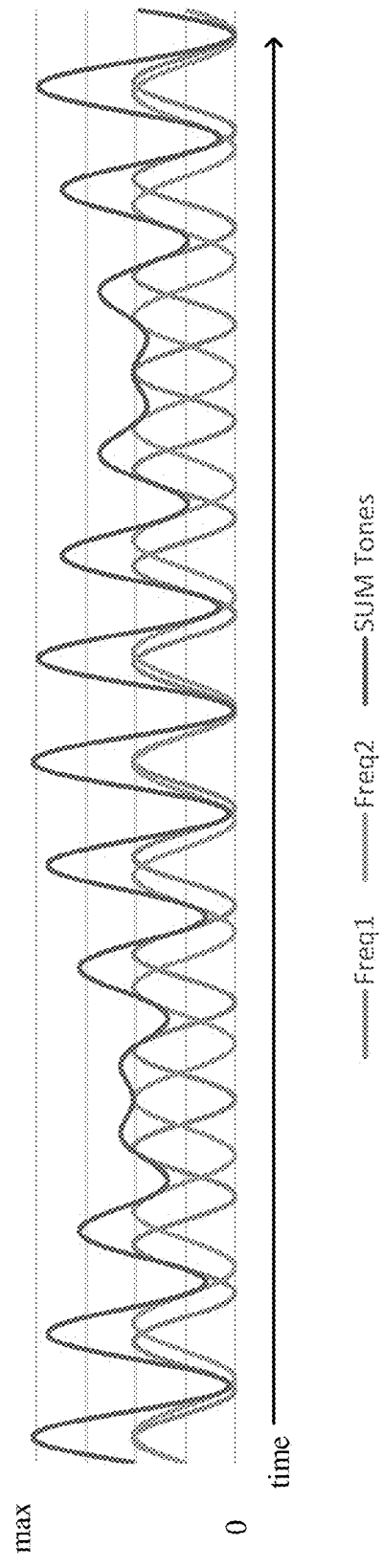
FIG. 28A is a schematic block diagram of an embodiment of a sum tones resultant with added amplitudes and no amplitude scaling in accordance with the present disclosure.

FIG. 28A is a schematic block diagram of an embodiment 2801 of a sum tones resultant with added amplitudes and no amplitude scaling in accordance with the present disclosure.

Figure 28B:
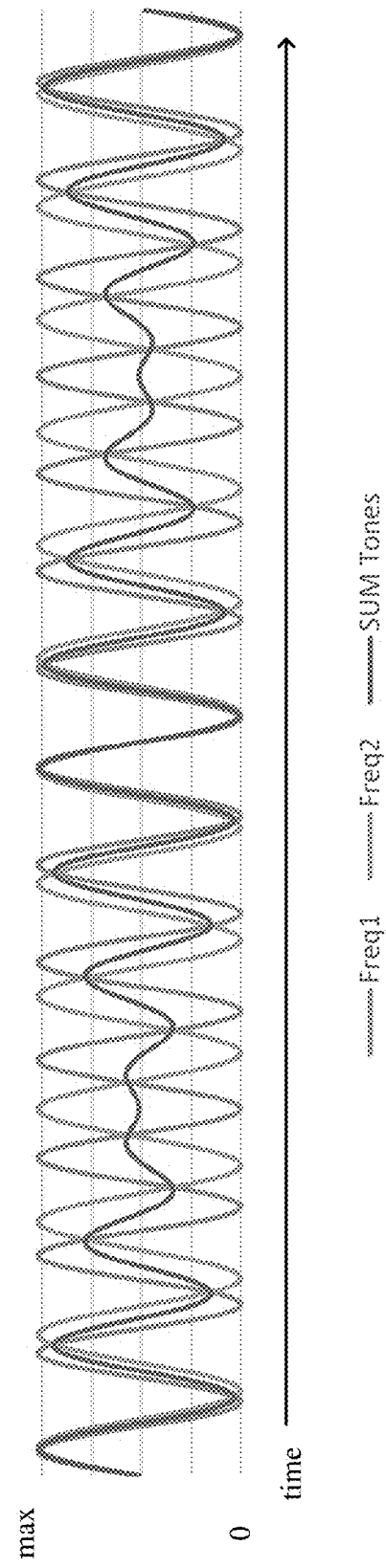
FIG. 28B is a schematic block diagram of an embodiment of a sum tones resultant with added amplitudes and with amplitude scaling in accordance with the present disclosure.

FIG. 28B is a schematic block diagram of an embodiment 2802 of a sum tones resultant with added amplitudes and with amplitude scaling in accordance with the present disclosure. As can be seen, the amplitude of the sum tones resultant is kept below a threshold (e.g., so as to ensure no clipping, saturation, or distortion in accordance with the operation of the device. Without performing such amplitude scaling, the sum tones resultant within FIG. 28A may unfortunately start clipping thereby adversely affecting the operation of the device. The sum tones resultant within FIG. 28B includes the same tones as within FIG. 28A but after having undergone amplitude scaling. For example, the amplitude scaling can be performed by a divide by 5 because when operating using a 5-bit value.

Certain of the following diagrams describe multiple parallel digital data packets being transmitted from a first device to a second device through touch or hover. The following two diagrams show an example for two different 3 bit values. In this example, there are 12 unique frequencies that are employed to generate the two different 3 bit values.

Figure 29A:
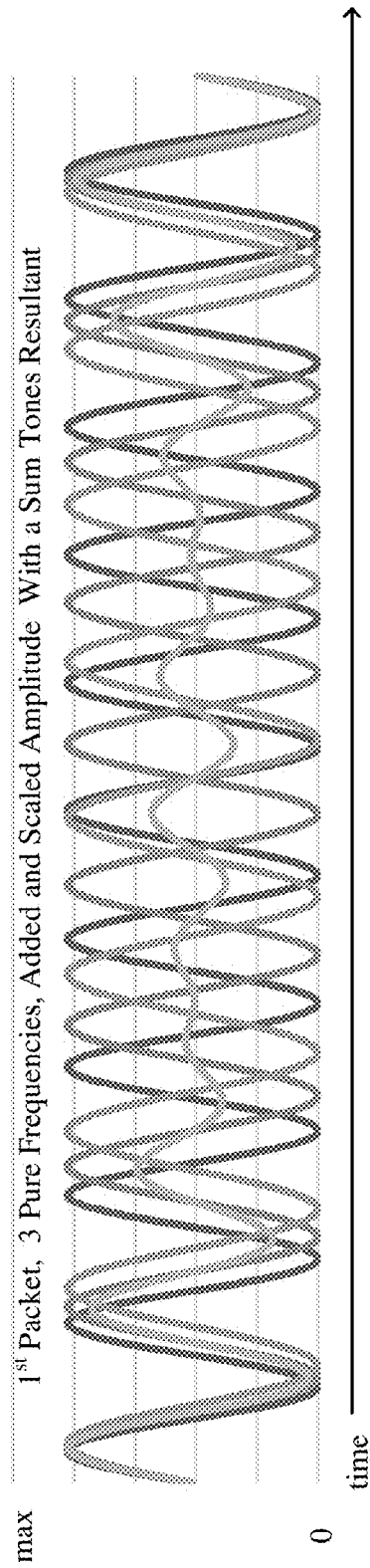
FIG. 29A is a schematic block diagram of an embodiment of a sum tones resultant with added and scaled amplitude corresponding to a first packet in accordance with the present disclosure.

FIG. 29A is a schematic block diagram of an embodiment 2901 of a sum tones resultant with added and scaled amplitude corresponding to a first packet in accordance with the present disclosure. This diagram shows a first packet that is composed of three pure frequencies that are added together and then the final amplitude is scaled to generate a sums tone resultant. The first signal having a first frequency is depicted in blue, the second signal having a second frequency is depicted in orange, and the third signal having a third frequency is depicted in gray. The first sums tone resultant signal is depicted in yellow.

Figure 29B:
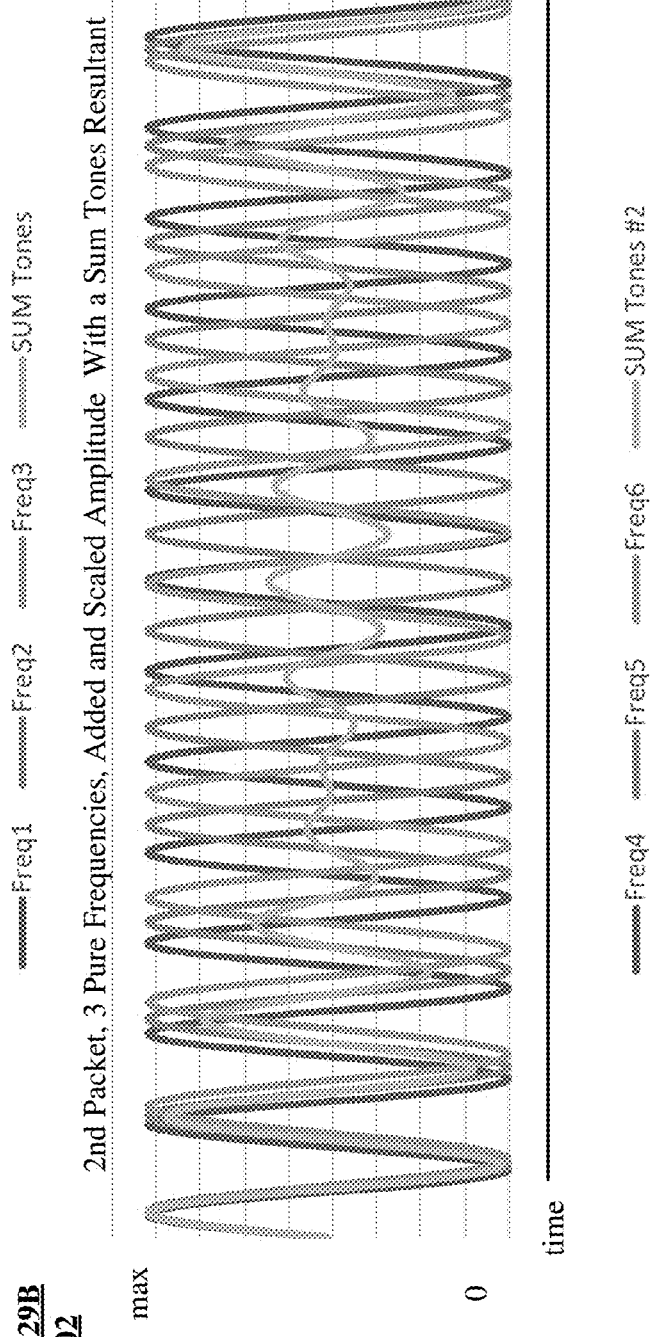
FIG. 29B is a schematic block diagram of another embodiment of a sum tones resultant with added and scaled amplitude corresponding to a second packet in accordance with the present disclosure.

FIG. 29B is a schematic block diagram of another embodiment 2902 of a sum tones resultant with added and scaled amplitude corresponding to a second packet in accordance with the present disclosure. This diagram shows a second packet that is composed of three pure frequencies that are added together and then the final amplitude is scaled to generate a sums tone resultant. The fourth signal having a fourth frequency is depicted in blue, the fifth signal having a fifth frequency is depicted in orange, and the sixth signal having a sixth frequency is depicted in gray. The second sums tone resultant signal is depicted in yellow.

With respect to FIG. 29A and FIG. 29B, these diagrams show multiple parallel digital data packets that may be transmitted via touch or hover with a touch sensor device (TSD). These particularly show an example for two different respective 3-bit values. Each respective 3-bit value is a different respective packets. For example, considered two different components (e.g., game pieces, pucks, etc.), then each respective packet may be associated with a different component. For example, the sum tones resultant of FIG. 29A corresponds to a first component (e.g., a first game piece, a first puck, etc.), and the sum tones resultant of FIG. 29B corresponds to a second component (e.g., a second game piece, a second puck, etc.). In an example, six (6) different unique frequencies are used to facilitate differentiation between the two different components (e.g., game pieces, pucks, etc.). In another example, for two different respective 3-bit values, there would be twelve (12) unique frequencies that can be decoded by the DSC.

In an example of operation and implementation, a touch sensor device (TSD) includes a panel and drive-sense circuits (DSCs). Note that the operation and implementation described with respect to a TSD may alternatively be made within a receiving device that includes DSCs that are configured to facilitate digital data communication from a first device (a transmitting device) to a second device (a receiving device). Certain examples described herein include a TSD that is configured to support touch sensing functionality and also includes one or more extra channels that or configured to support digital data communications.

In an example of operation and implementation, a touch sensor device (TSD) includes a panel that includes electrodes. The electrodes may include first electrodes and second electrodes. In certain examples, the first electrodes are arranged in a first direction and the second electrodes are arranged in a second direction.

A first drive-sense circuit (DSC) is operably coupled via a first single line to a first electrode of the first electrodes The second DSC is operatively coupled via a second single line to a second electrode of the second electrodes. The first DSC configured to generate a first signal based on a first reference signal. Note that the first reference signal may be generated internally by the first DSC or provided from another device, component, circuitry, processing module, etc. The first DSC is configured to provide the first signal via the first single line to the first electrode of the first electrodes and simultaneously to sense the first signal via the first single line. Note that sensing of the first signal includes detection of a first electrical characteristic of the first electrode and/or a first change of the first signal. The first DSC is also configured to generate a first digital signal representative of the first electrical characteristic of the first electrode of the first electrodes and/or the first change of the first signal.

A second DSC is operably coupled via a second single line to the panel. Note that the second DSC is not necessarily coupled via a second single line to an electrode of the panel. In certain examples, the second DSC is alternatively coupled via the second single line to some other element of the panel. For example, an antenna, a metal fixture, or some other component of the panel is implemented to serve as the element to which the second DSC is coupled to the panel via the second single line. For example, the second DSC may be viewed as being implemented as a virtual channel within the TSD That does not specifically operate to facilitate touch sensing functionality.

The second DSC is operably coupled via a second single line to the panel and is configured to generate a second signal based on a second reference signal. Note that the second reference signal may be generated internally by the second DSC or provided from another device, component, circuitry, processing module, etc. The second DSC is also configured to provide the second signal via the second single line to the panel and simultaneously to sense the second signal via the second single line. Note that the sensing of the second signal includes detection of coupling of another signal into the panel in accordance with digital data communication from another device to the TSD. The second DSC is also configured to generate a second digital signal representative of the coupling of the another signal into the panel in accordance with digital data communication from another device to the TSD.

In certain examples, the TSD also includes memory that stores operational instructions and one or more processing modules operably coupled to the first DSC, the second DSC, and the memory. When enabled, the one or more processing modules configured to execute the operational instructions to process the second digital signal to interpret the digital data communication from another device to the TSD.

Insert in other examples, note that the sensing of the second signal also includes detection of a second electrical characteristic of the panel and/or a second change of the second signal.

In a particular example, consider that the another signal is a first other signal and that the TSD also includes a third DSC. The third DSC is operably coupled via a third single line to the panel. The third DSC is configured to generate a third signal based on a third reference signal. The third DSC is also configured to provide the third signal via the third single line to the panel and simultaneously to sense the third signal via the third single line. Note that the sensing of the third signal includes detection of coupling of a second other signal into the panel in accordance with the digital data communication from another device to the TSD. The third DSC is also configured to generate a third digital signal representative of the coupling of the second other signal into the panel in accordance with the digital data communication from another device to the TSD.

In one particular implementation, note that the first other signal facilitates communication of a first bit of the digital data communication from the another device to the TSD, and the second other signal facilitates communication of a second bit of the digital data communication from the another device to the TSD. For example, consider that the first other signal and the second other signal each correspond to different respective bits of digital data communication from the another device to the TSD. For example, consider digital data communication that includes 2 bit characters, then each of the first other signal in the second other signal each correspond to the different respective bits of the 2 bit characters. Generally speaking, any of a number of different other signals (e.g., first other signal, second other signal, third other signal, etc.) may be used to facilitate digital data communication of different respective bits of multi bit characters from the another device to the TSD.

In another particular implementation, note that the first other signal facilitates communication of a bit of the digital data communication from the another device to the TSD, and the second other signal facilitates complementary communication of the bit of the digital data communication from the another device to the TSD. For example, consider that the first other signal corresponds to a bit value corresponding to a logical 1, then the second other signal corresponds to a bit value corresponding to a logical 0. Alternatively, consider that the first other signal corresponds to a bit value corresponding to a logical 0, then the second other signal corresponds to a bit value corresponding to a logical 1.

In addition, in certain examples, the another signal that is coupled into the panel is a sum tones resultant that is based on summation of a plurality of sinusoidal signals. For example, consider the combination of two or more sinusoidal signals as described with reference to FIG. 27A to effectuate the generation of a sum tones resultant.

In some instances, the sum tones resultant is amplitude scaled. For example, the another signal that is coupled into the panel is a sum tones resultant that is amplitude scaled and based on summation of a plurality of sinusoidal signals.

In certain instances, the another signal that is coupled into the panel corresponds to bit within a multi-bit value of the digital data communication from another device to the TSD.

Also, in an example of operation and implementation, the another signal is a first other signal that is coupled into the panel at or during a first time, and a second other signal is coupled into the panel at or during a second time.

Note that different respective DSC may be implemented to facilitate different respective operations. For example, a TSD includes multiple DSCs such that a first DSC is configured to facilitate at least one of touch or hover detection within the TSD, and a second DSC is configured to facilitate the digital data communication from another device to the TSD.

The various DSCs as described herein may be implemented in a variety of different ways. In an example of operation and implementation, a DSC includes a power source circuit operably coupled to the first electrode via the first single line. When enabled, the power source circuit is configured to provide the first signal that includes an analog signal via the first single line, and wherein the analog signal includes a DC (direct current) component and/or an oscillating component. The DSC also includes a power source change detection circuit operably coupled to the power source circuit. When enabled, the power source change detection circuit is configured to detect an effect on the analog signal that is based on the first electrical characteristic of the first electrode of the first plurality of electrodes and/or a first change of the first signal. The power source change detection circuit is also configured to generate the first digital signal representative of the at least one of the first electrical characteristic of the first electrode of the first plurality of electrodes or the first change of the first signal.

In certain particular examples, the power source circuit includes a power source to source at least one of a voltage or a current to the first electrode via the first single line. The power source change detection circuit including a power source reference circuit configured to provide a voltage reference and/or a current reference and a comparator configured to compare the voltage and/or the current provided to the first electrode via the first single line to the voltage reference and/or the current reference in accordance with producing the analog signal.

In another example of operation and implementation, a touch sensor device (TSD) includes a panel that includes electrodes. The electrodes may include first electrodes and second electrodes. In certain examples, the first electrodes are arranged in a first direction and the second electrodes are arranged in a second direction.

A first DSC is operably coupled via a first single line to a first electrode of the first electrodes. The first DSC configured to generate a first signal based on a first reference signal. As described above in other examples, the first reference signal may be generated in a variety of ways. The first DSC is also configured to provide the first signal via the first single line to the first electrode of the first electrodes and simultaneously to sense the first signal via the first single line. Note that sensing of the first signal includes detection of a first electrical characteristic of the first electrode and/or a first change of the first signal. The first DSC is also configured to generate a first digital signal representative of the first electrical characteristic of the first electrode of the first plurality of electrodes and/or the first change of the first signal.

A second DSC is operably coupled via a second single line to the panel. Note that the second DSC is not necessarily coupled via a second single line to an electrode of the panel. In certain examples, the second DSC is alternatively coupled via the second single line to some other element of the panel. For example, an antenna, a metal fixture, or some other component of the panel is implemented to serve as the element to which the second DSC is coupled to the panel via the second single line. For example, the second DSC may be viewed as being implemented as a virtual channel within the TSD That does not specifically operate to facilitate touch sensing functionality.

The second DSC is operable coupled to the panel and is configured to generate a second signal based on a second reference signal. As described above in other examples, the second reference signal may be generated in a variety of ways. The second DSC is configured to provide the second signal via the second single line to the panel and simultaneously to sense the second signal via the second single line. Note that sensing of the second signal includes detection of coupling of a first other signal into the panel in accordance with digital data communication from another device to the TSD. The second DSC is also configured to generate a second digital signal representative of the coupling of the first other signal into the panel in accordance with digital data communication from another device to the TSD.

A third DSC is operably coupled via a third single line to the panel. Note that the third DSC is not necessarily coupled via a third single line to an electrode of the panel. In certain examples, the third DSC is alternatively coupled via the third single line to some other element of the panel. For example, an antenna, a metal fixture, or some other component of the panel is implemented to serve as the element to which the third DSC is coupled to the panel via the third single line. For example, the third DSC may be viewed as being implemented as a virtual channel within the TSD That does not specifically operate to facilitate touch sensing functionality.

The third DSC is operable coupled to the panel and is configured to generate a third signal based on a third reference signal. As described above in other examples, the third reference signal may be generated in a variety of ways. The third DSC is configured to provide the third signal via the third single line to the panel and simultaneously to sense the third signal via the third single line. Note that the sensing of the third signal includes detection of coupling of a second other signal into the panel in accordance with the digital data communication from another device to the TSD. The third DSC is also configured to generate a third digital signal representative of the coupling of the second other signal into the panel in accordance with the digital data communication from another device to the TSD.

The TSD also includes memory that stores operational instructions and one or more processing modules operably coupled to the first DSC, the second DSC, and the memory. When enabled, the one or more processing modules configured to execute the operational instructions to process the second digital signal and the third digital signal to interpret the digital data communication from another device to the TSD.

FIG. 30 is a schematic block diagram of an embodiment 3000 of touch sensor device (TSD) data facilitating discrimination between finger touch and external data in accordance with the present disclosure. When the user interacts with a touch sensor device (TSD), whether via touch or hover, the user interaction causes a change of capacitance (e.g., a reduction of capacitance) at the location of the TSD with which the user is interacting that subsequently causes a reduction in current that is flowing in the electrode with which the user is interacting. In certain examples, this reduction in current is inverted so that it may be represented as an increase in value thereby generating a positive value (as shown in green). For example, when showing data associated with a touch sensor device (TSD), it is sometimes preferable to show user interaction as an increase in value within the data as opposed to a reduction in value.

This diagram shows data in the graph below that shows the difference between user interaction, such as a finger touch on a TSD, and an external data value frequency transmitted to the TSD. The externality the value frequency, such as provided via a sum tones resultant, is transmitted and causes an increase in mutual frequency current magnitude within the TSD due to an increase of mutual capacitance. When this increase is inverted, it is rendered as a negative value. Conversely, when a user interacts with the TSD, user interaction causes a decrease in the mutual frequency current magnitude within the TSD due to a decrease of mutual capacitance. When this decrease is inverted, it is rendered as a positive value (as shown in red).

Note that the variation of the specific values shown within the graph are reflected in the color and intensity of the color as shown in the graph as well. For example, a larger positive number is depicted as a darker shade of green while a smaller positive number is depicted as a lighter shade of green. Also, a larger negative number is depicted as a darker shade of red while a smaller negative number is depicted as a lighter shade of red.

In this diagram, the top rows correspond to TSD operation, and the bottom rows correspond external data value signals having one or more frequencies that may be transmitted to facilitate digital data communication. For example, consider the bottom 10 rows of the graph within the lower right-hand portion of the diagram corresponding to external data value frequencies that may be transmitted to facilitate digital data communication.

Referring to the data on the lower left hand side of the diagram, which corresponds to the lower left hand portion of the TSD that is shown on the lower right-hand portion of the diagram, where there are bright values of red that are very large in negative value, this corresponds to a change in capacitance (e.g., an increase of capacitance) which subsequently causes an increase in current and generates a positive value. In some examples, this increase in current is inverted so that it may be represented as a decrease in value thereby generating a negative value. When there is an external data value frequency present, this causes an increase in the mutual frequency current magnitude due to an increase of the mutual capacitance, and this is graphed as a negative value in red.

Referring to the data on the upper right hand side of the diagram, which corresponds to the middle right hand portion of the TSD that is shown on the lower right-hand portion of the diagram, consider when a user interacts with a touch sensor of the TSD, there is a decrease in mutual frequency current magnitude due to a reduction of mutual capacitance caused by the user interaction with the touch sensor of the TSD, and this is graphed as a positive value in green.

Figure 31:
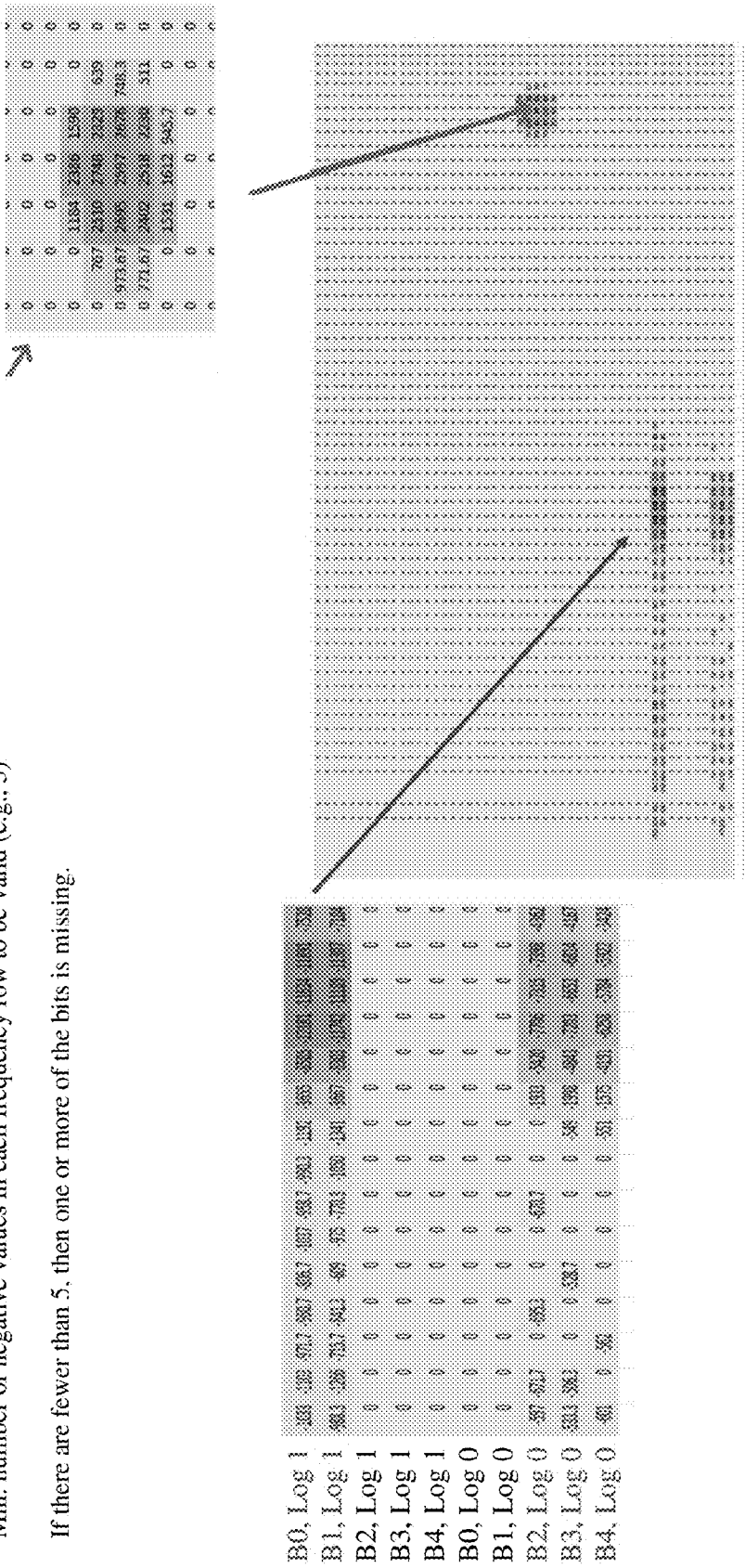
FIG. 31 is a schematic block diagram of an embodiment of data decoding of touch sensor device (TSD) data based on two frequencies per bit in accordance with the present disclosure.

FIG. 31 is a schematic block diagram of an embodiment 3100 of data decoding of touch sensor device (TSD) data based on two frequencies per bit in accordance with the present disclosure. In this diagram, to facilitate communication of a 5-bit value, 10 unique sinewave frequencies are used. Five frequencies are used for a first value of the 5 respective bits (e.g., logical 1), and five other frequencies are used for a second value of the 5 respective bits (e.g., logical 0). Each respective bit is implemented by two unique frequencies, a first frequency for a first value (e.g., logical 1), and a second frequency for a first value (e.g., logical 0). Each respective bits two frequencies are decoded by all of the received column channels closed the source of the external frequencies.

In an example of operation and implementation, consider a lookup table (LUT) where a=1, b=2, and c=3, then the letter "c" would be implemented in binary as 00011, which is decoded below as can be seen in the data on the lower left hand portion of the diagram.

In some examples, a minimum number of negative values must be reported in each of the frequency rows to qualify as valid decoded data. For example, consider that a minimum of five values within each of the frequency rows must be reported to qualify as valid decoded data. When fewer than five negative values are reported, that row would not qualify as valid decoded data. Since there are fewer than five negative values reported, then one of the bits would be deemed as missing and that would not qualify as valid decoded data. For example, an insufficient number of negative values is reported thereby failing to qualify has valid decoded data.

Note that the negative values that reported need not adjacent to one another. So long as a requisite number of very large and negative values are reported within a row, then that particular row is labeled as including valid decoded data. If there is no noise in the system, then several very large and negative reported values would correspond to the frequency associated with that row being received.

FIG. 32 is a schematic block diagram of another embodiment 3200 of data decoding of touch sensor device (TSD) data based on two frequencies per bit in accordance with the present disclosure.

Consider a TSD that includes 40 physical rows and 70 physical columns (e.g., electrodes corresponding to 40 physical rows and 70 physical columns). However, consider that the TSD has extra rows that may be used to facilitate digital data communication. For example, consider there are 10 extra rows that are provisioned to facilitate digital data communication. There is no physical connection from the DSC chip (e.g., integrated circuitry, chip, etc. that includes DSCs, one or more processing modules, etc.) to the TSD with respect to these extra rows (e.g., these extra rows may be viewed as being virtual channels). However, the TSD operates nonetheless by using these extra rows to facilitate digital data communication by receiving some tones resultant from another device.

Consider a specific example in which a DSC chip includes 128 total channels. However, consider that DSC chip implemented within an application in which only 110 of those 120 total channels are used for TSD operation regarding user or device interaction. Then those remaining 18 channels could be used for any other desired function. In one example, a certain number of these remaining 18 channels are used to facilitate digital data communication. In the specific example shown in this diagram, 10 of those remaining 18 channels are used to facilitate digital data communication.

This diagram shows an approach by which more consistent reliable data may be achieved. Consider that a minimum threshold value is set for the external data value frequency. For example, consider any value less than −500 as being less than the minimum value threshold, then any value reported that is less than −500 would be mapped to some very large negative value. In an example, consider this very large negative value to be −32761. Note that this very large negative value may be any desired value. Then, any value that is reported that is greater than −500 would then be mapped to a value of zero.

Considering the implementation as described above that operates by requiring a minimum number of reported values, consider when more than that minimum number of reported values of the very large negative value (e.g., −32761) are in fact reported within a row, then that it rows labeled as valid. Note that there necessarily need to be five valid bit rows to be deemed a valid data character (e.g., a 5-bit digital word, 5-bit byte, etc.).

However, when data is transferred through a user, such as via a finger touch or hover, the number value for invalid touch may be less than five. Note that this implementation can handle a hover, and does provide for improved validation of the data.

Generally speaking, the operation of such a TSD may be viewed in a two-step process. Within a first step, when a value is reported as being less than some minimum threshold (e.g., −500), then that value is mapped to a very large negative value (e.g., −32761). In some examples, this very large negative value is selected as corresponding to a reported value that would not correspond to user interaction with the TSD. In a second step, it is determined whether a sufficient number of reported values are included within a particular row. For example, consider this minimum number of reported values required being 5, then a minimum of 5 reported values of that very large negative number would need to be within a given row for that bit row to be labeled as valid. In another example, consider this minimum number of reported values required being 10, then a minimum of 10 reported values of that very large negative number would need to be within a given row for that bit row to be labeled as valid. Generally speaking, the minimum number of reported values required for a bit row to be labeled as valid may be any desired number. The higher the minimum number of reported values required, then the more reliable the data may be deemed to be.

In this diagram, there are 10 unique frequencies for each of the five respective bit positions, and only 5 of the frequencies shown in red are sent. The operation of the TSD requires five of the 10 frequencies being sent to make a valid number. The bottom left and right-hand side of the diagram show two examples of transmitting 5-bit data characters (e.g., 5-bit digital words, 5-bit bytes, etc.). The lower left hand side corresponds to the letter "a" that is 00001 in binary, and the lower right-hand side corresponds to the letter "b" that is 00010 in binary. Within each of these examples on the lower left-hand side in the lower right-hand side of the diagram, note that the bottom five (5) rows are complementary to the upper five (5) rows. The upper five rows correspond to those frequencies that are used to transmit a first value for each of the five bit positions (e.g., Bit 4 Logical 1, Bit 3 Logical 1, Bit 2 Logical 1, Bit 1 Logical 1, Bit 0 Logical 1), and the bottom five rows correspond to those frequencies that are used to transmit a second value for each of the five bit positions (e.g., Bit 4 Logical 0, Bit 3 Logical 0, Bit 2 Logical 0, Bit 1 Logical 0, Bit 0 Logical 0).

Considering a specific example of the data on the lower right-hand portion of the diagram, the very bottom row would not meet the criteria of having a minimum number of reported values required being more than 10. As can be seen in the bottom row, only 6 very large negative values are reported along that row, and if the minimum number of reported values required was any number more than 7, then that bit row would not be labeled as valid.

FIG. 33 is a schematic block diagram of an embodiment 3300 of touch sensor device (TSD) data based on a single frequency per bit in accordance with the present disclosure. With a single frequency per bit instead of two frequencies per bit, an example for a 5-bit value would need only 5 unique sine wave frequencies, which can be decoded by the DSC chip. The basis of the digital data to frequencies is to take the individual bits of the character data being sent and converting to individual frequencies for each of the logic 1's bits. For example, this technique could be used when one or more data sources (e.g., a game piece, mouse, puck, etc.) is in contact with the surface of the TSD (e.g., a touchscreen, a touch panel with no display functionality, a gaming table, etc.) when decoded. This technique will transmit from none, each, all or some combination of the 5 frequencies. With this version, at least 1 receive (RX) channel operates to pick up the signal. When there are more RX channels, then the higher is the confidence of the correct data.

When comparing this diagram to the prior example, only the top half of the bottom 10 frequencies are used to transmit a first value for each of the five bit positions (e.g., Bit 4 Logical 1, Bit 3 Logical 1, Bit 2 Logical 1, Bit 1 Logical 1, Bit 0 Logical 1). In the specific example here, a digital value of 00011 is being transmitted. Those rows that report values of zero all across correspond to no external data value frequency being received within those rows (e.g., the bottom three rows).

FIG. 34 is a schematic block diagram of an embodiment 3400 of multiple game pieces interacting with a touch sensor device (TSD) with bi-directional data transmission in accordance with the present disclosure. In this example, active components (e.g., game pieces, pucks, etc.) are able to communicate with a TSD directly into a panel of the TSD from data that was either wirelessly sent (e.g., Bluetooth, WiFi, etc.) or through the point of contact of the TSD (e.g., a touchscreen, a touch panel with no display functionality, a gaming table, etc.) or a perimeter transmitting beacon. With 2 components (e.g., game pieces, pucks, etc.), each component could have multiple different frequencies. The content would not be displayed graphically on the blue screen of the TSD in this diagram. Digital data in the green area (off-screen) is a representation of two (2), 5-bit values.

FIG. 35 is a schematic block diagram of an embodiment 3500 of multiple game pieces interacting with a touch sensor device (TSD) with bi-directional data transmission using ring detector and retransmission in accordance with the present disclosure. In this diagram, by using a frequency pickup detector at the cross-point on the TSD (e.g., a touchscreen, a touch panel with no display functionality, a gaming table, etc.) facilitates the device to synchronize with the system clock by using the zero-crossing of the frequency picked up from the individual panel rows in contact. In certain examples, this is achieved by resending this frequency with embedded data back to TSD by altering the frequency by phase and/or by adding an extra frequency.

At least one difference between this diagram in the prior diagram is a pickup coil included within one of the components. This allows the component to know which column and/or row it is sitting on with respect to the TSD. For example, consider that the TSD uses 40 frequencies such that each row has its own frequency, then the component can talk back to the TSD indicating on which row it is located. The TSD will already have detected that something is at that spot, and that particular component can communicate its identity to the TSD.

FIG. 36 is a schematic block diagram of an embodiment 3600 of a touch sensor device (TSD) configured to perform user identification through touch in accordance with the present disclosure. When using an external microprocessor (e.g., 32 bit ARM Cortex-M4, with 12-bit DAC) to generate the frequencies, a key FOB identifier (ID) can be generated from a device that is associated with a user (e.g., from a device in the user's pocket, a user's watch, a user's phone, etc.) to create an unique user ID. This set of Sum Tones unique to the holder would be coupled to the user's body and when the user touches the TSD, all points of contact would be registered as that user.

FIG. 37 is a schematic block diagram of an embodiment 3700 of a touch sensor device (TSD) configured to perform user identification through touch and game pieces in accordance with the present disclosure. When using an external microprocessor (e.g., 32 bit ARM Cortex-M4, with 12-bit DAC) to generate the frequencies, a custom code can be generated from a device that is associated with a user (e.g., from a device in the user's pocket, a user's watch, a user's phone, etc.) to create an unique user ID with a mix of frequencies. This set of Sum Tones unique to the holder would be coupled to the users body and when the user touches the TSD, all points of contact would be registered as from the user touch. The game pieces also would have unique frequency IDs. When a user touches a game piece, the two unique IDs would both be sent.

This diagram shows both the user and one or more game components (e.g., game pieces, pucks, etc.) that interact with the TSD. Both a signal from one of the components and a user signal are passed through to the TSD.

FIG. 38 is a schematic block diagram of an embodiment 3800 of a touch sensor device (TSD) configured to perform user identification and presence/proximity detection in accordance with the present disclosure. With a Presence/Proximity Detection System added to a TSD (e.g., by 4 respective sensors implemented around the panel of a TSD, which may be a touchscreen or a touch panel without display functionality), the TSD is then configured to discriminate the direction that multiple users are crossing the panel edge to interact with the panel of the TSD.

Considering a specific example, 4 respective sensors are implemented around the perimeter of a panel of a TSD. Consider the TSD includes 20 rows and 36 columns, and these 4 respective sensors are implemented as 4 conductive external perimeter sensors, represented by Left, Right, Top and Bottom.

However, note that certain implementations of this particular system do not track the individual respective users as the go around the panel of the TSD. Note that this implementation works with one touch per user. By adding Digital Data Through Touch, multiple users can move around the touch screen and be identified from any side that they reach across the panel, at all touch points. In this diagram, 10 extra frequencies are added across the bottom. Of the bottom 10 rows, the very bottom five (5) rows are complementary to the five (5) rows above them. By adding in the unique ID frequencies to the user body, this will produce very large negative values on the frequency channels decoded.

Figure 39A:
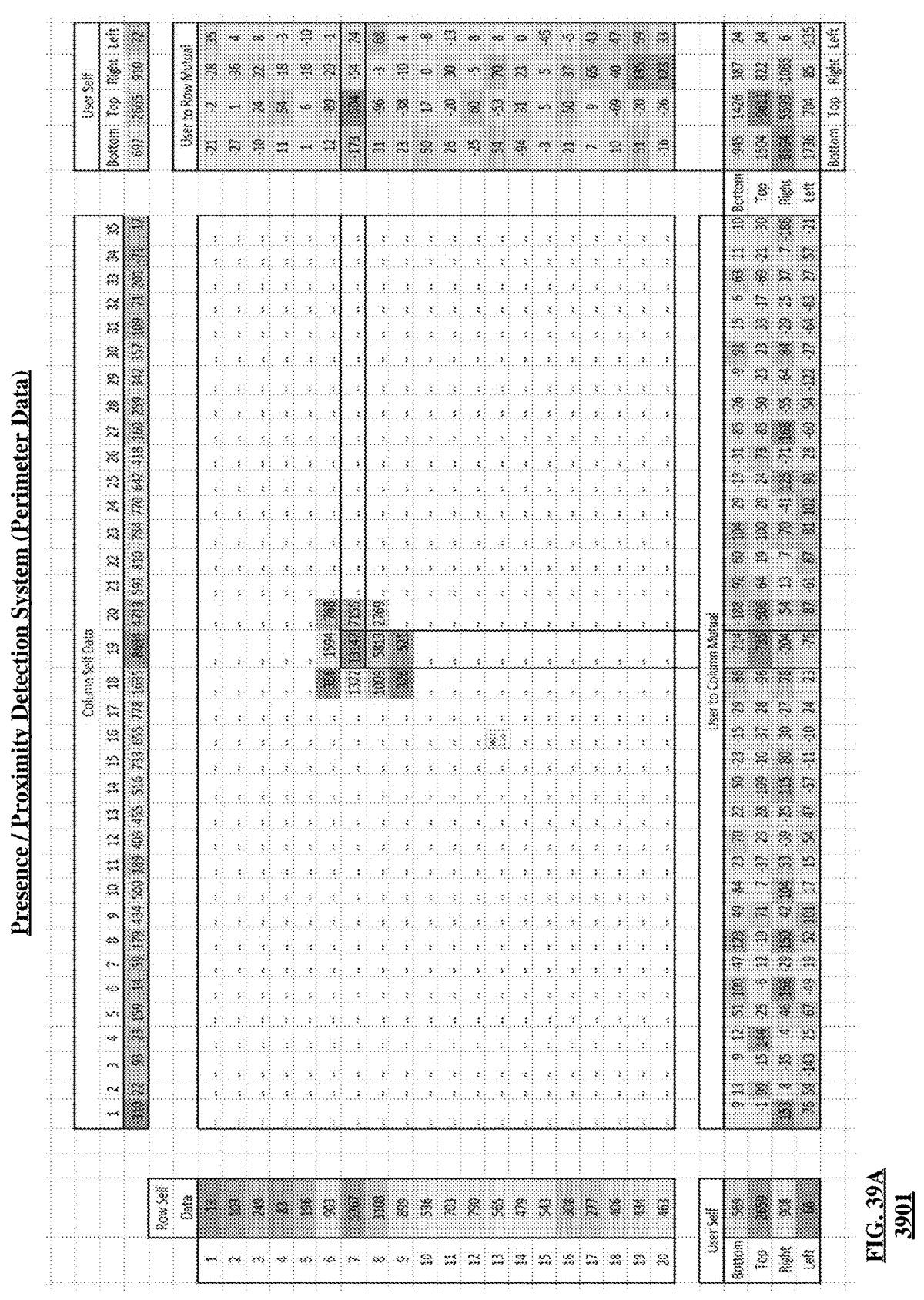
Figure 39B:
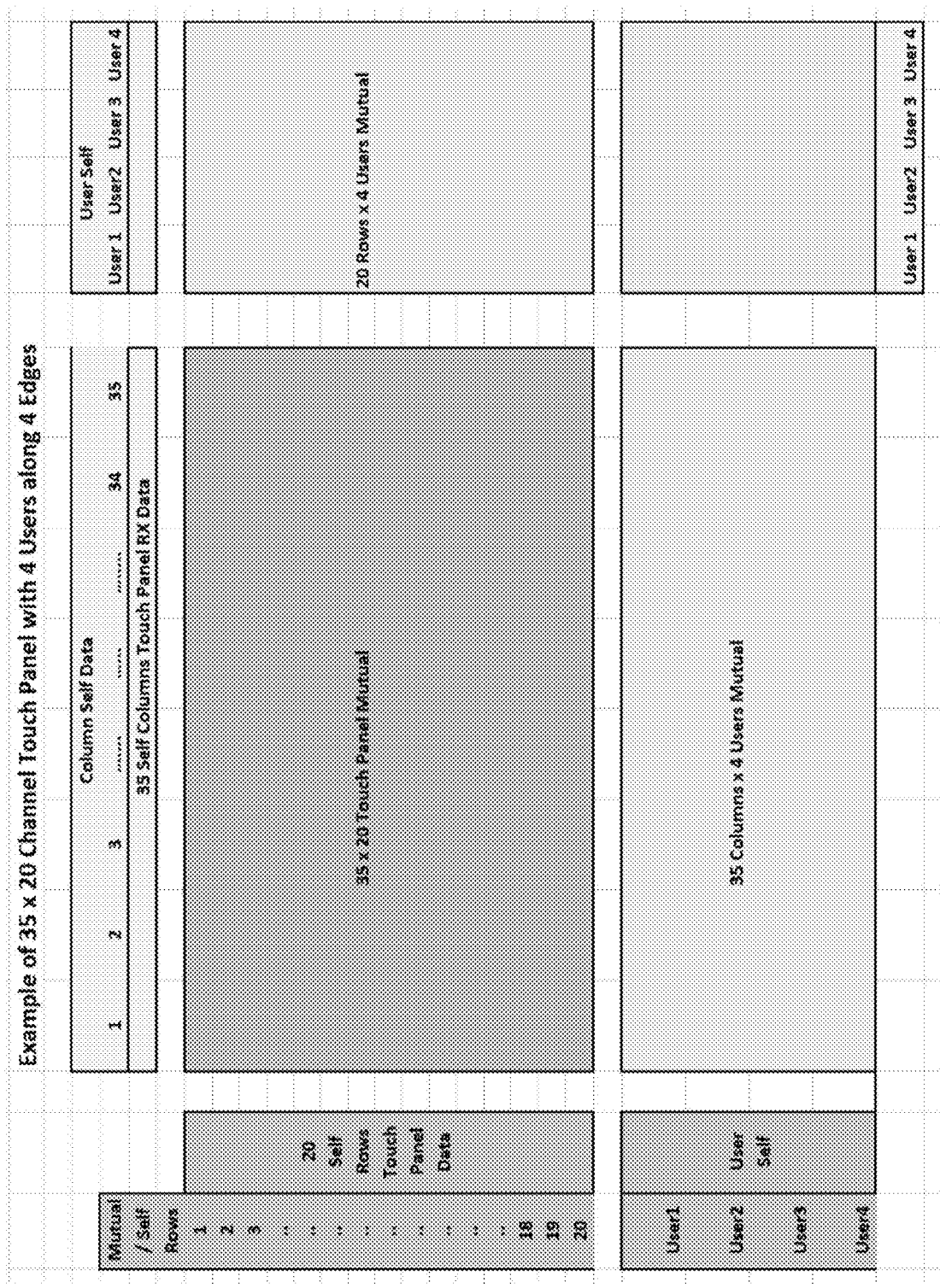

FIG. 39A and FIG. 39B are schematic block diagrams of embodiments 3901 and 3902 of touch sensor device (TSD) data of a touch sensor device (TSD) configured to perform presence/proximity detection in accordance with the present disclosure. Note that the touch sensor panel has transmit (TX) rows with unique Mutual frequencies & a common Self frequency and receive (RX) columns with a common Self frequency, with 4 external sensors represented by Left, Right, Top and Bottom, that are driven as both as a RX and a TX channel.

Figure 40B:
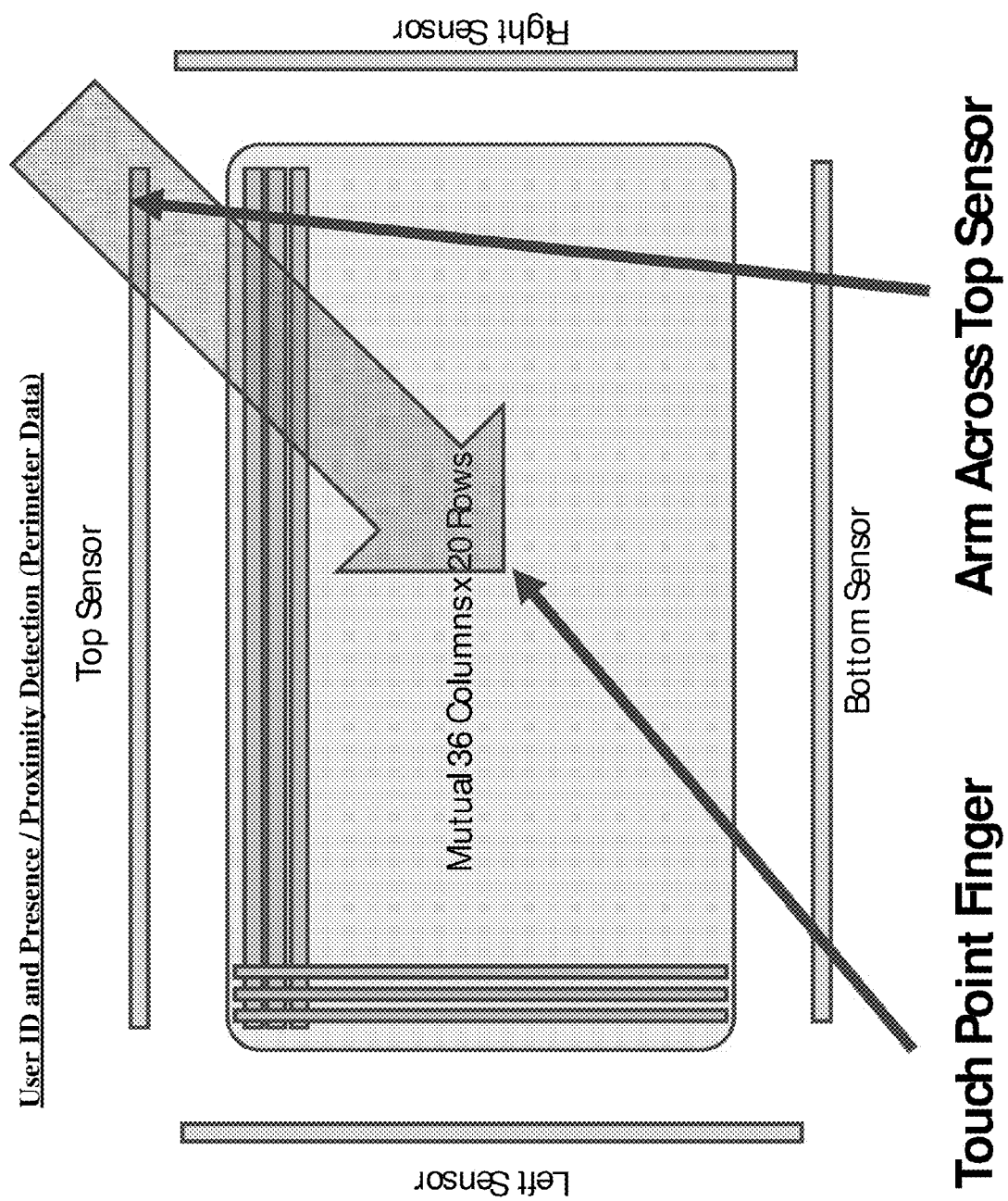

FIG. 40A and FIG. 40B are schematic block diagrams of embodiments 4001 and 4002, respectively, of touch sensor device (TSD) data of a touch sensor device (TSD) configured to perform user identification and presence/proximity detection in accordance with the present disclosure. The touch sensor panel has TX rows with unique Mutual frequencies & a common Self frequency and RX columns with a common Self frequency, with 4 external sensors represented by Left, Right, Top and Bottom, that are driven as both as a RX and a TX channel. A mutual touch on the touch panel will produce a very positive value compared to when the row/column intersecting was baselined. However, an external sensor when capacitively couple (to an arm) then a touch is made on the touch panel, the result will go negative verses the baseline value.

Figure 41A:
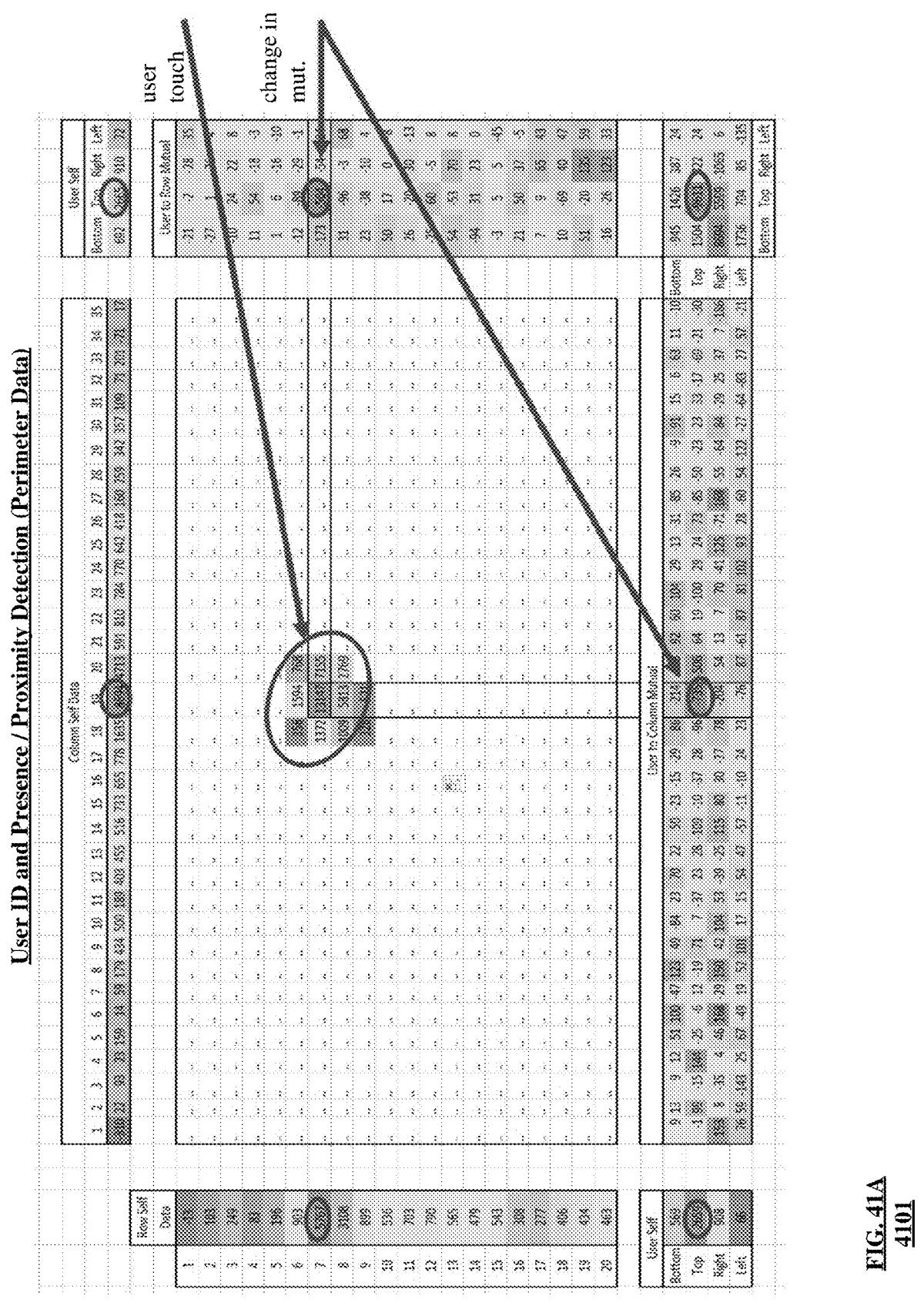
Figure 41B:
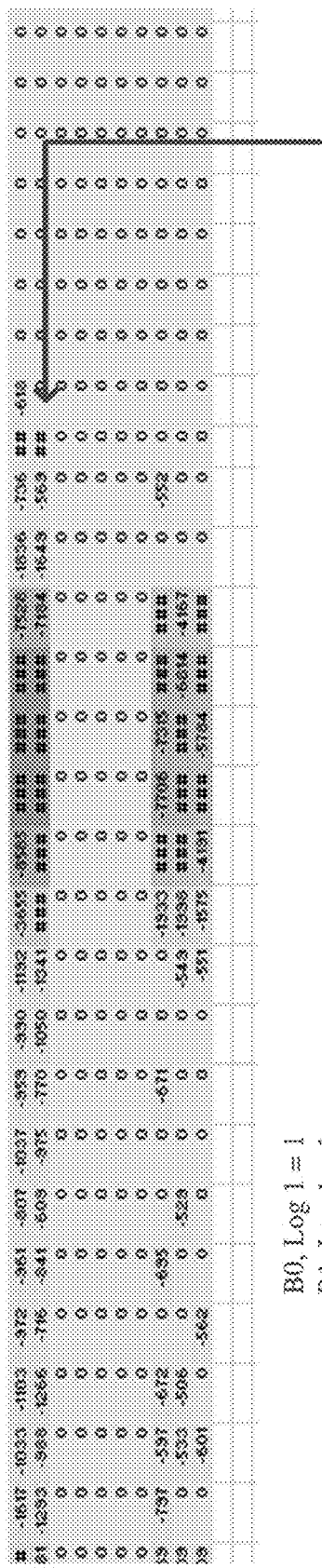

FIG. 41A and FIG. 41B are schematic block diagrams of embodiments 4101 and 4102 of touch sensor device (TSD) data of a touch sensor device (TSD) configured to perform user identification and presence/proximity detection in accordance with the present disclosure.

In these diagrams, there are 10 extra frequencies that are added at the bottom of the panel of the TSD. Of the bottom 10 rows, note that the very bottom five (5) rows are complementary to the five (5) rows above them. By adding in the unique ID frequencies to the user body, this will produce very large negative values on the frequency channels decoded as shown in FIG. 41B. When a user is in the proximity of the panel of the TSD, there is a change in mutual capacitance that is measured at the corresponding external promoter sensors. When a touch is made on the panel of the TSD, the result will go negative versus the baseline value as shown by the change in mutual (mut.) in FIG. 41A.

FIG. 42 is a schematic block diagram of an embodiment 4200 of touch sensor device (TSD) data of a touch sensor device (TSD) including user identification detected on each touch point in accordance with the present disclosure.

When using an external microprocessor (e.g., 32 bit ARM Cortex-M4, with 12-bit DAC) to generate the frequencies, a custom code can be generated from a device that is associated with a user (e.g., from a device in the user's pocket, a user's watch, a user's phone, etc.) to create an unique user ID with a mix of frequencies. This set of Sum Tones unique to the holder would be coupled to the user's body and when the user touches the panel of the TSD, all points of contact would be registered as from the user touch. Note that these extra "rows" shown at the bottom of the orange portion of the device do not correspond to physical rows on the panel of the device. These extra rows use extra frequencies.

FIG. 43 is a schematic block diagram of an embodiment 4300 of data, from a device that is associated with a user, transmitted through the user to a touch sensor device (TSD) in accordance with the present disclosure. In this diagram, each of the conductive pads in an insole of a shoe are transmitting unique sinewave frequencies, (e.g. 90.0 kHz, 90.3 kHz, 90.6 kHz . . . considering an implementation in which a DAC chip is configured to detect frequencies separated by 300 Hz), which would be defined as a TX Transmit Channel.

A flexible, compressible, higher durometer material (e.g., rubber) may also be implemented above the conductive pads and below the user's foot in certain examples. As the user changes pressure on their foot such as by walking, standing, sitting, etc., the change of capacitance would be transmitted to the body. A RX receiver Channel (e.g., which may be attached anywhere on the body) would capture all of the transmitted frequencies and convert the changes to Digital Data. This same concept can be incorporated into a glove, so the movement and compression of the hand is transmitted to the body and received. Generally speaking, this implementation may be extended to any of a variety of applications that include a number of conductive elements implemented in or around at least a part of a user or any other thing such that the movement, compression, expansion, etc. and/or other property of that user or thing may be monitored.

This implementation shows yet another example of capturing real data such that the TSD still reports these extra rows even though there is no physical connection to these rows (e.g., they are virtual rows that are implemented to facilitate digital data communication).

In certain examples, a firmware modification is performed for perimeter data with user identification and presence/proximity detection in accordance with the present disclosure.

Consider the graphs of FIG. 40A and/or 41A. In an example of operation and implementation, with respect to firmware that is implemented within a DSC chip, both the User ID and the Presence/Proximity Detection data (Perimeter Data) are being processed through the same code and processing parameters that is being measured for the Mutual and Self capacitance changes from user interaction with a TSD (e.g., user touch with a panel of a TSD). With the extra Perimeter Data mixed into the present Mutual and Self data packet, this causes it to be displayed in the touch-only mutual and self-graphics data.

This limits the amount of Perimeter Data around the actual touch panel, before the graphs no longer shows where the user is touching the panel.

However, with a dedicated unique processing core, the parameters for the Perimeter Data, would be decoded differently and come in a separate data packet for processing of the screen graphics and decoding.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While various components may be implemented using transistors in one or more of the above-described figure(s) as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

As applicable, one or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e., machine/non-human intelligence.

As applicable, one or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

As applicable, one or more functions associated with the methods and/or processes described herein can be implemented in a system that is operable to electronically store digital data in a memory device. Such storage cannot practically be performed by the human mind because the human mind is not equipped to electronically store digital data.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A touch sensor device (TSD) comprising:
  a panel that includes a first plurality of electrodes arranged in a first direction and a second plurality of electrodes arranged in a second direction;
  a first drive-sense circuit (DSC) operably coupled via a first single line to a first electrode of the first plurality of electrodes, the first DSC configured to:
    generate a first signal based on a first reference signal;
    provide the first signal via the first single line to the first electrode of the first plurality of electrodes and simultaneously to sense the first signal via the first single line, wherein sensing of the first signal includes detection of at least one of a first electrical characteristic of the first electrode or a first change of the first signal; and
    generate a first digital signal representative of the at least one of the first electrical characteristic of the first electrode of the first plurality of electrodes or the first change of the first signal; and
  a second DSC operably coupled via a second single line to a channel of the panel that is not implemented for touch sensing functionality, the second DSC configured to:
    generate a second signal based on a second reference signal;
    provide the second signal via the second single line to the channel of the panel that is not implemented for touch sensing functionality and simultaneously to sense the second signal via the second single line, wherein sensing of the second signal includes detection of coupling of another signal into the channel of the panel that is not implemented for touch sensing functionality in accordance with digital data communication from another device to the TSD; and generate a second digital signal representative of the coupling of the another signal into the channel of the panel that is not implemented for touch sensing functionality in accordance with digital data communication from the another device to the TSD.

2. The TSD of claim 1 further comprising:
memory that stores operational instructions; and
one or more processing modules operably coupled to the first DSC, the second DSC, and the memory, wherein, when enabled, the one or more processing modules configured to execute the operational instructions to process the second digital signal to interpret the digital data communication from the another device to the TSD.

3. The TSD of claim 1, wherein the sensing of the second signal also includes detection of at least one of a second electrical characteristic of the panel or a second change of the second signal.

4. The TSD of claim 1, wherein the another signal is a first other signal; and further comprising:
a third DSC operably coupled via a third single line to the panel, the third DSC configured to:
generate a third signal based on a third reference signal;
provide the third signal via the third single line to the panel and simultaneously to sense the third signal via the third single line, wherein sensing of the third signal includes detection of coupling of a second other signal into the panel in accordance with the digital data communication from the another device to the TSD; and
generate a third digital signal representative of the coupling of the second other signal into the panel in accordance with the digital data communication from the another device to the TSD.

5. The TSD of claim 4, wherein:
the first other signal facilitates communication of a first bit of the digital data communication from the another device to the TSD; and
the second other signal facilitates communication of a second bit of the digital data communication from the another device to the TSD.

6. The TSD of claim 4, wherein:
the first other signal facilitates communication of a bit of the digital data communication from the another device to the TSD; and
the second other signal facilitates complementary communication of the bit of the digital data communication from the another device to the TSD.

7. The TSD of claim 1, wherein the another signal that is coupled into the panel is a sum tones resultant that is based on summation of a plurality of sinusoidal signals.

8. The TSD of claim 1, wherein the another signal that is coupled into the panel is a sum tones resultant that is amplitude scaled and based on summation of a plurality of sinusoidal signals.

9. The TSD of claim 1, wherein the another signal that is coupled into the panel corresponds to bit within a multi-bit value of the digital data communication from the another device to the TSD.

10. The TSD of claim 1, wherein:
the another signal is a first other signal that is coupled into the panel at or during a first time; and
a second other signal is coupled into the panel at or during a second time.

11. The TSD of claim 1, wherein:
the first DSC is configured to facilitate at least one of touch or hover detection within the TSD; and the second DSC is configured to facilitate the digital data communication from the another device to the TSD.

12. The TSD of claim 1, wherein the first DSC further comprises:
a power source circuit operably coupled to the first electrode via the first single line, wherein, when enabled, the power source circuit is configured to provide the first signal that includes an analog signal via the first single line, and wherein the analog signal includes at least one of a DC (direct current) component or an oscillating component; and
a power source change detection circuit operably coupled to the power source circuit, wherein, when enabled, the power source change detection circuit is configured to:
detect an effect on the analog signal that is based on the at least one of the first electrical characteristic of the first electrode of the first plurality of electrodes or a first change of the first signal; and
generate the first digital signal representative of the at least one of the first electrical characteristic of the first electrode of the first plurality of electrodes or the first change of the first signal.

13. The TSD of claim 12 further comprising:
the power source circuit including a power source to source at least one of a voltage or a current to the first electrode via the first single line; and
the power source change detection circuit including:
a power source reference circuit configured to provide at least one of a voltage reference or a current reference; and
a comparator configured to compare the at least one of the voltage or the current provided to the first electrode via the first single line to the at least one of the voltage reference or the current reference in accordance with producing the analog signal.

14. A touch sensor device (TSD) comprising:
a panel that includes a first plurality of electrodes arranged in a first direction and a second plurality of electrodes arranged in a second direction;
a first drive-sense circuit (DSC) operably coupled via a first single line to a first electrode of the first plurality of electrodes, the first DSC configured to:
generate a first signal based on a first reference signal;
provide the first signal via the first single line to the first electrode of the first plurality of electrodes and simultaneously to sense the first signal via the first single line, wherein sensing of the first signal includes detection of at least one of a first electrical characteristic of the first electrode or a first change of the first signal; and
generate a first digital signal representative of the at least one of the first electrical characteristic of the first electrode of the first plurality of electrodes or the first change of the first signal;
a second DSC operably coupled via a second single line to a channel of the panel that is not implemented for touch sensing functionality, the second DSC configured to:
generate a second signal based on a second reference signal;
provide the second signal via the second single line to the channel of the panel that is not implemented for touch sensing functionality and simultaneously to sense the second signal via the second single line, wherein sensing of the second signal includes detection of coupling of a first other signal into the channel of the panel that is not implemented for touch sensing functionality in accordance with digital data communication from another device to the TSD; and generate a second digital signal representative of the coupling of the first other signal into the channel of the panel that is not implemented for touch sensing functionality in accordance with digital data communication from the another device to the TSD;

a third DSC operably coupled via a third single line to the panel, the third DSC configured to:

generate a third signal based on a third reference signal;

provide the third signal via the third single line to the panel and simultaneously to sense the third signal via the third single line, wherein sensing of the third signal includes detection of coupling of a second other signal into the panel in accordance with the digital data communication from the another device to the TSD; and generate a third digital signal representative of the coupling of the second other signal into the panel in accordance with the digital data communication from the another device to the TSD;

memory that stores operational instructions; and one or more processing modules operably coupled to the first DSC, the second DSC, and the memory, wherein, when enabled, the one or more processing modules configured to execute the operational instructions to process the second digital signal and the third digital signal to interpret the digital data communication from the another device to the TSD.

15. The TSD of claim 14, wherein:

the first other signal facilitates communication of a first bit of the digital data communication from the another device to the TSD; and the second other signal facilitates communication of a second bit of the digital data communication from the another device to the TSD.

16. The TSD of claim 14, wherein:

the first other signal facilitates communication of a bit of the digital data communication from the another device to the TSD; and the second other signal facilitates complementary communication of the bit of the digital data communication from the another device to the TSD.

17. The TSD of claim 14, wherein the first other signal or the second other signal that is coupled into the panel is a sum tones resultant that is based on summation of a plurality of sinusoidal signals.

18. The TSD of claim 14, wherein the first other signal or the second other signal that is coupled into the panel is a sum tones resultant that is amplitude scaled and based on summation of a plurality of sinusoidal signals.

19. The TSD of claim 14, wherein the first DSC further comprises:

a power source circuit operably coupled to the first electrode via the first single line, wherein, when enabled, the power source circuit is configured to provide the first signal that includes an analog signal via the first single line, and wherein the analog signal includes at least one of a DC (direct current) component or an oscillating component; and a power source change detection circuit operably coupled to the power source circuit, wherein, when enabled, the power source change detection circuit is configured to:

detect an effect on the analog signal that is based on the at least one of the first electrical characteristic of the first electrode of the first plurality of electrodes or a first change of the first signal; and generate the first digital signal representative of the at least one of the first electrical characteristic of the first electrode of the first plurality of electrodes or the first change of the first signal.

20. The TSD of claim 19 further comprising:

the power source circuit including a power source to source at least one of a voltage or a current to the first electrode via the first single line; and the power source change detection circuit including:

a power source reference circuit configured to provide at least one of a voltage reference or a current reference; and a comparator configured to compare the at least one of the voltage or the current provided to the first electrode via the first single line to the at least one of the voltage reference or the current reference in accordance with producing the analog signal.

\* \* \* \* \*